US007739705B2

(12) United States Patent
Lee et al.

(10) Patent No.: US 7,739,705 B2
(45) Date of Patent: Jun. 15, 2010

(54) METHODS AND APPARATUS FOR USING LOCATION INFORMATION TO MANAGE SPILLOVER IN AN AUDIENCE MONITORING SYSTEM

(75) Inventors: Morris Lee, Palm Harbor, FL (US); Daniel Nelson, Tampa, FL (US); Weston Headley, Battle Ground, WA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 259 days.

(21) Appl. No.: 11/692,087

(22) Filed: Mar. 27, 2007

(65) Prior Publication Data
US 2007/0266395 A1 Nov. 15, 2007

Related U.S. Application Data

(63) Continuation of application No. PCT/US2005/034743, filed on Sep. 27, 2005.

(60) Provisional application No. 60/613,646, filed on Sep. 27, 2004, provisional application No. 60/614,939, filed on Sep. 29, 2004, provisional application No. 60/670,936, filed on Apr. 13, 2005.

(51) Int. Cl.
*H04H 60/33* (2008.01)
*H04H 60/32* (2008.01)
(52) U.S. Cl. .............................. 725/10; 725/9; 725/11; 725/14
(58) Field of Classification Search .................. 725/10, 725/12, 18, 19, 9, 11, 14; 340/539.13
See application file for complete search history.

(56) References Cited

U.S. PATENT DOCUMENTS 3,056,135 A 9/1962 Currey et al.

(Continued)

FOREIGN PATENT DOCUMENTS

GB 2260246 7/1993

(Continued)

OTHER PUBLICATIONS

Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).

(Continued)

*Primary Examiner*—Christopher Kelley
*Assistant Examiner*—Michael Van Handel
(74) *Attorney, Agent, or Firm*—Hanley, Flight and Zimmerman, LLC

(57) ABSTRACT

Methods, apparatus, and articles of manufacture for using location information to manage spillover in an audience monitoring system are disclosed. In particular, the example methods, apparatus, and articles of manufacture detect spillover to generate media monitoring information. Initially, a first sensor located in a first location and a second sensor located in a second location receive a portable metering device signal. First location information is associated with receiving the portable metering device signal via the first sensor and second location information is associated with receiving the portable metering device signal via the second sensor. Media monitoring information is generated based on one of the first location information or the second location information.

29 Claims, 29 Drawing Sheets

U.S. PATENT DOCUMENTS

| | | | |
|---|---|---|---|
| 4,107,734 A | 8/1978 | Percy et al. | |
| 4,382,291 A | 5/1983 | Nakauchi | |
| 4,626,904 A | 12/1986 | Lurie | |
| 4,644,509 A * | 2/1987 | Kiewit et al. | 367/87 |
| 4,695,879 A | 9/1987 | Weinblatt | |
| 4,718,106 A | 1/1988 | Weinblatt | |
| 4,769,697 A | 9/1988 | Gilley et al. | |
| 4,779,198 A * | 10/1988 | Lurie | 725/12 |
| 4,930,011 A | 5/1990 | Kiewit | |
| 4,955,000 A | 9/1990 | Nastrom | |
| 4,972,471 A | 11/1990 | Gross et al. | |
| 4,972,503 A | 11/1990 | Zurlinden | |
| 4,990,892 A | 2/1991 | Guest et al. | |
| 5,119,104 A | 6/1992 | Heller | |
| 5,146,231 A | 9/1992 | Ghaem et al. | |
| 5,226,090 A * | 7/1993 | Kimura | 381/110 |
| 5,226,177 A | 7/1993 | Nickerson | |
| 5,285,498 A | 2/1994 | Johnston | |
| 5,382,970 A | 1/1995 | Kiefl | |
| 5,387,993 A | 2/1995 | Heller et al. | |
| 5,404,377 A | 4/1995 | Moses | |
| 5,442,343 A | 8/1995 | Cato et al. | |
| 5,457,807 A | 10/1995 | Weinblatt | |
| 5,473,631 A | 12/1995 | Moses | |
| 5,481,294 A * | 1/1996 | Thomas et al. | 725/20 |
| 5,483,276 A * | 1/1996 | Brooks et al. | 725/10 |
| 5,550,928 A | 8/1996 | Lu et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,629,739 A | 5/1997 | Dougherty | |
| 5,630,203 A | 5/1997 | Weinblatt | |
| 5,640,144 A | 6/1997 | Russo et al. | |
| 5,646,675 A | 7/1997 | Copriviza et al. | |
| 5,692,215 A | 11/1997 | Kutzik et al. | |
| 5,774,876 A | 6/1998 | Woolley et al. | |
| 5,787,334 A | 7/1998 | Fardeau et al. | |
| 5,793,409 A | 8/1998 | Tetsumura | |
| 5,812,930 A | 9/1998 | Zavrel | |
| 5,815,114 A | 9/1998 | Speasl et al. | |
| 5,872,588 A | 2/1999 | Aras et al. | |
| 5,884,278 A | 3/1999 | Powell | |
| 5,893,093 A | 4/1999 | Wills | |
| 5,982,808 A | 11/1999 | Otto | |
| 6,002,918 A | 12/1999 | Heiman et al. | |
| 6,035,177 A * | 3/2000 | Moses et al. | 725/22 |
| 6,091,956 A | 7/2000 | Hollenberg | |
| 6,098,048 A | 8/2000 | Dashefsky et al. | |
| 6,243,739 B1 | 6/2001 | Schwartz et al. | |
| 6,252,522 B1 | 6/2001 | Hampton et al. | |
| 6,359,557 B2 | 3/2002 | Bilder | |
| 6,396,413 B2 | 5/2002 | Hines et al. | |
| 6,424,264 B1 | 7/2002 | Giraldin et al. | |
| 6,430,498 B1 | 8/2002 | Maruyama et al. | |
| 6,433,689 B1 | 8/2002 | Hovind et al. | |
| 6,467,089 B1 | 10/2002 | Aust et al. | |
| 6,470,264 B2 | 10/2002 | Bide | |
| 6,493,649 B1 | 12/2002 | Jones et al. | |
| 6,497,658 B2 | 12/2002 | Roizen et al. | |
| 6,563,423 B2 | 5/2003 | Smith | |
| 6,577,238 B1 | 6/2003 | Whitesmith et al. | |
| 6,647,548 B1 | 11/2003 | Lu et al. | |
| 6,654,800 B1 | 11/2003 | Rieger, III | |
| 6,731,942 B1 | 5/2004 | Nageli | |
| 6,748,317 B2 | 6/2004 | Maruyama et al. | |
| 6,766,524 B1 | 7/2004 | Matheny et al. | |
| 6,842,877 B2 * | 1/2005 | Robarts et al. | 715/708 |
| 6,882,837 B2 | 4/2005 | Fernandez et al. | |
| 6,888,457 B2 | 5/2005 | Wilkinson et al. | |
| 6,898,434 B2 | 5/2005 | Pradhan et al. | |
| 6,919,803 B2 | 7/2005 | Breed | |
| 6,928,280 B1 | 8/2005 | Xanthos et al. | |
| 6,934,508 B2 | 8/2005 | Ceresoli et al. | |
| 6,940,403 B2 | 9/2005 | Kail, IV | |
| 6,958,710 B2 | 10/2005 | Zhang et al. | |
| 6,967,674 B1 | 11/2005 | Lausch | |
| 6,970,131 B2 | 11/2005 | Percy et al. | |
| 7,038,619 B2 | 5/2006 | Percy et al. | |
| 7,046,162 B2 | 5/2006 | Dunstan | |
| 7,076,441 B2 | 7/2006 | Hind et al. | |
| 7,080,061 B2 | 7/2006 | Kabala | |
| 7,099,676 B2 | 8/2006 | Law et al. | |
| 7,126,454 B2 | 10/2006 | Bulmer | |
| 7,148,803 B2 | 12/2006 | Bandy et al. | |
| 7,155,159 B1 | 12/2006 | Weinblatt et al. | |
| 7,171,331 B2 | 1/2007 | Vock et al. | |
| 7,222,071 B2 | 5/2007 | Neuhauser et al. | |
| 7,295,108 B2 | 11/2007 | Corrado et al. | |
| 7,460,827 B2 * | 12/2008 | Schuster et al. | 455/2.01 |
| 7,463,143 B2 * | 12/2008 | Forr et al. | 340/539.13 |
| 7,471,987 B2 * | 12/2008 | Crystal et al. | 700/94 |
| 7,483,975 B2 * | 1/2009 | Kolessar et al. | 709/224 |
| 2002/0068556 A1 | 6/2002 | Brown | |
| 2002/0144259 A1 | 10/2002 | Gutta et al. | |
| 2002/0150387 A1 | 10/2002 | Kunii et al. | |
| 2002/0174425 A1 | 11/2002 | Markel et al. | |
| 2002/0198762 A1 | 12/2002 | Donato | |
| 2003/0033600 A1 | 2/2003 | Cliff et al. | |
| 2003/0070182 A1 | 4/2003 | Pierre et al. | |
| 2003/0093784 A1 | 5/2003 | Dimitrova et al. | |
| 2003/0097302 A1 * | 5/2003 | Overhultz et al. | 705/14 |
| 2003/0122708 A1 | 7/2003 | Percy et al. | |
| 2003/0126593 A1 | 7/2003 | Mault | |
| 2003/0136827 A1 * | 7/2003 | Kaneko et al. | 235/375 |
| 2003/0146871 A1 | 8/2003 | Karr et al. | |
| 2003/0171833 A1 | 9/2003 | Crystal et al. | |
| 2003/0177488 A1 | 9/2003 | Smith et al. | |
| 2003/0194004 A1 | 10/2003 | Srinivasan | |
| 2003/0208754 A1 | 11/2003 | Sridhar et al. | |
| 2003/0222819 A1 | 12/2003 | Karr et al. | |
| 2003/0222820 A1 | 12/2003 | Karr et al. | |
| 2004/0019675 A1 | 1/2004 | Hebeler, Jr. et al. | |
| 2004/0025174 A1 | 2/2004 | Cerrato | |
| 2004/0027271 A1 | 2/2004 | Schuster et al. | |
| 2004/0122679 A1 | 6/2004 | Neuhauser et al. | |
| 2004/0198386 A1 | 10/2004 | Dupray | |
| 2004/0266457 A1 | 12/2004 | Dupray | |
| 2005/0035857 A1 | 2/2005 | Zhang et al. | |
| 2005/0141345 A1 | 6/2005 | Holm et al. | |
| 2005/0144632 A1 | 6/2005 | Mears et al. | |
| 2005/0172311 A1 | 8/2005 | Hjelt et al. | |
| 2005/0200476 A1 | 9/2005 | Forr et al. | |
| 2005/0201826 A1 | 9/2005 | Zhang et al. | |
| 2005/0203798 A1 | 9/2005 | Jensen et al. | |
| 2005/0204379 A1 | 9/2005 | Yamamori | |
| 2005/0207592 A1 | 9/2005 | Sporer et al. | |
| 2005/0216509 A1 | 9/2005 | Kolessar et al. | |
| 2005/0234774 A1 | 10/2005 | Dupree | |
| 2005/0243784 A1 | 11/2005 | Fitzgerald et al. | |
| 2005/0264430 A1 | 12/2005 | Zhang et al. | |
| 2006/0053110 A1 | 3/2006 | McDonald et al. | |
| 2006/0075421 A1 | 4/2006 | Roberts et al. | |
| 2006/0168613 A1 | 7/2006 | Wood et al. | |
| 2007/0011040 A1 | 1/2007 | Wright et al. | |
| 2007/0288277 A1 | 12/2007 | Neuhauser et al. | |
| 2007/0288476 A1 | 12/2007 | Flanagan, III et al. | |
| 2007/0294057 A1 | 12/2007 | Crystal et al. | |
| 2007/0294132 A1 | 12/2007 | Zhang et al. | |
| 2007/0294705 A1 | 12/2007 | Gopalakrishnan et al. | |
| 2007/0294706 A1 | 12/2007 | Neuhauser et al. | |
| 2008/0101454 A1 | 5/2008 | Luff et al. | |

| | | |
|---|---|---|
| 2008/0204273 A1 | 8/2008 | Crystal et al. |

FOREIGN PATENT DOCUMENTS

| | | |
|---|---|---|
| GB | 2292506 | 2/1996 |
| JP | 2000307530 | 11/2000 |
| WO | 9111062 | 7/1991 |
| WO | 9411989 | 5/1994 |
| WO | 9731440 | 8/1997 |
| WO | WO 99/55057 | 10/1999 |
| WO | 0131816 | 5/2001 |
| WO | WO03/087871 | 10/2003 |
| WO | WO 2004/051303 | 6/2004 |
| WO | WO 2004/051304 | 6/2004 |
| WO | WO2006/037014 | 4/2006 |
| WO | 2006096177 | 9/2006 |

OTHER PUBLICATIONS

Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (pp. 7).

Biatti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons", Technical Report MSR-TR-2000-12 Microsoft Research, [retrieved from internet, http://research.microsoft.com/~bahl/Papers/Pdf/radar.pdf], Feb. 2000 (13 Pages).

Wagner, David P. Battelle. Report: Lexington Area Travel Data Collection Test; GPS for Personal Travel Surveys. Final Report for Office of Highway Information Management, Office of Technology Application, and Federal Highway Administration, Sep. 1997, (92 pages).

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

Bernstein et al., "An Introduction to Map Matching for Personal Navigation Assistants," New Jersey Tide Center, New Jersey Institute of Technology, Aug. 1996 (17 pages).

Kerschbaumer, Ken, "Who's Really Watching? How Cable's Digital Box Will Rock the Ratings World," Reed Business Information, a Division of Reed Elsevier, Inc., May 16, 2005 (4 pages).

McCarthy et al., "RF Free Ultrasonic Positioning," Department of Computer Science, University of Bristol, U.K., 2003 (7 pages).

McCartiiy et al., "RF Free Ultrasonic Positioning (Presentation)," 7th International Symposiom on Wearable Computers, Oct. 2003 (12 pages).

Gentile et al., "Robust Location using System Dynamics and Motion Constraints," National Institute of Standards and Technology, Wireless Communication Technologies Group, Jun. 24, 2004 (5 pages).

Cricket Project, "Cricket v2 User Manual," MIT Computer Science and Artificial Intelligence Lab, Cambridge, U.S.A., Jan. 2005 (57 pages).

Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).

"The Nibble Location System," [online]. UCLA, May 21, 2001 [retrieved on Nov. 2, 2004]. Retrieved from the Internet: <URL: http://mmsl.cs.ucla.edu/nibble/>. (13 pages).

"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).

"NIST Location System," [online]. Wireless Communication Technologies Group, National Institute of Standards and Technology, Mar. 12, 2004 [retrieved in Nov. 1, 2004]. Retrieved from the Internet: <URL: www.antd.nist.gov>. (2 pages).

Ferguson, Michael. "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html>. (9 pages).

"FM Wireless Microphone Module Kits," [online]. Horizon Industries, 2004 [retrieved on Sep. 30, 2004]. Retrieved from the Internet: <URL: www.horizonindustries.com/fm.htm>. (1 page).

"Arkon Sound Feeder II FM Transmitter," [online]. Yahoo Shopping, 2002 [retrieved on Sep. 29, 2004]. Retrieved from the Internet: <URL: http://store.yahoo.com/semsons-inc/arsoundfeedii.html>. (2 pages).

"Dust Networks —SmartMesh," [online]. Dust Networks Inc., 2002 [retrieved on Sep. 29, 2004]. Retrieved from the Internet:<URL: www.dustnetworks.com>. (2 pages).

Kanellos, Michael. "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).

"Uhf Radio Data Logging System —GenII Data Logger," [online]. Amplicon, 2004 [retrieved on Sep. 29, 2004]. Retrieved from the Internet: <URL: www.amplicon.co.uk/drprod3.cfm/subsecid/10037/secid/1/groupid/11809.htm>. (3 pages).

"Eltek GenII Radio Data Logging System," [online]. Eltek Ltd., 2004 [retrieved on Sep. 29, 2004]. Retrieved from the Internet: <URL: www.elteckdataloggers.co.uk>. (4 pages).

"World's Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).

"American Technology Corporation—Retailer Ads—AM & FM Sounds," [online]. Woody Norris, May 4, 2004 [retrieved on Sep. 29, 2004]. Retrieved from the Internet: <URL: www.woodynorris.com>. (3 pages).

"X1 Button Radio —The World's Smallest Radio," [online]. Exxun, 2004 [retrieved on Sep. 29, 2004]. Retrieved from the Internet: <URL: www.exxun.com>. (2 pages).

"Discovery Spy Motion Tracking System," [online]. Discovery Communications Inc., 2004 [retrieved on Sep. 14, 2004]. Retrieved from the Internet: <URL: http://shopping.discovery.com/stores/servlet/ProductDisplay?catalogId=10000&storeId=10000&lanlan=-1&productId=53867&partnumber=689638>. (3 pages).

Schuman, Evan. "Smarter Smart Cart?" [online]. Storefront Backtalk, Feb. 16, 2005 [retrieved on Nov. 20, 2006]. Retrieved from the Internet: <URL: www. storefrontbacktalk com>. (5 pages).

"Arbitron & Scarborough Unveil New Mall Shopper Audience Measurement," [online]. Streamline Media Inc., Jun. 22, 2007 [retrieved in 2007]. Retrieved from the Internet: <URL: www.radioink.com>. (2 pages).

"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php?duty=Show&id=7276&trv=1>. (3 pages).

Patent Cooperation Treaty Search Report mailed Oct. 31, 2006 in corresponding PCT application No. PCT/US05/34743, filed Sep. 27, 2005, 4 pages.

Patent Cooperation Treaty Search Opinion mailed Oct. 31, 2006 in corresponding PCT application No. PCT/US05/34743, filed Sep. 27, 2005, 9 pages.

\* cited by examiner

METHODS AND APPARATUS FOR USING LOCATION INFORMATION TO MANAGE SPILLOVER IN AN AUDIENCE MONITORING SYSTEM

RELATED APPLICATIONS

This patent is a continuation of International Patent Application Serial No. PCT/US2005/034743, filed Sep. 27, 2005, which claims the benefit of U.S. Provisional Application 60/613,646, filed on Sep. 27, 2004, U.S. Provisional Application 60/614,939, filed on Sep. 29, 2004, and U.S. Provisional Application 60/670,936, filed on Apr. 13, 2005, all of which are hereby incorporated herein by reference in their entireties.

FIELD OF THE DISCLOSURE

The present disclosure relates generally to media monitoring and, more particularly, to methods and apparatus for using audience member location information to monitor media consumption.

BACKGROUND

Consuming media presentations generally involves listening to audio information and/or viewing video information such as, for example, radio programs, music, television programs, movies, still images, etc. Media-centric companies such as, for example, advertising companies, broadcasting networks, etc. are often interested in the viewing and listening interests of their audience to better market their products. A well-known technique often used to measure the exposure and/or number of audience members exposed to media involves awarding media exposure credit to a media presentation each time an audience member is exposed to the media presentation.

The awarding of media exposure credit is often determined by monitoring the media consumption of audience members. The media consumption activities of audience members are often monitored using personal portable metering devices (PPMs), which are also known as portable metering devices and portable personal meters. A PPM is an electronic device that is typically worn (e.g., clipped to a belt or other apparel) or carried by an audience member. In general, PPMs are configured to use a variety of techniques to monitor the media consumption (e.g., viewing and/or listening activities) of a person. For example, one technique for monitoring media consumption involves detecting or collecting information (e.g., ancillary codes, signatures, etc.) from audio and/or video signals that are emitted or presented by media delivery devices (e.g., televisions, stereos, speakers, computers, etc.)

While wearing a PPM, an audience member or monitored individual performs their usual daily routine, which may include listening to the radio and/or other sources of audio media and/or watching television programs and/or other sources of visual media. As the audience member consumes (e.g., views, listens to, etc.) media, a PPM associated with (e.g., assigned to and carried by) that audience member may detect audio and/or video information associated with the media and generate monitoring data. In general, monitoring data may include any information that is representative of (or associated with) and/or that may be used to identify a particular media presentation (e.g., a song, a television program, a movie, a video game, etc.) For example, the monitoring data may include signatures that are collected or generated by the PPM based on the media, audio codes that are broadcast simultaneously with (e.g., embedded in) the media, etc.

As a person wearing a PPM travels throughout their household, the PPM receives audio and/or video content information provided by media delivery devices (e.g., televisions, radios, etc.) distributed throughout the household. The audio/video content may be encoded to facilitate subsequent identification of the audio/video content and/or the PPMs may be configured to use signature generation techniques to identify audio/video content received by the PPMs. In any case, each person's PPM may receive different audio/video content based on the person's unique location (e.g., within their household, at another location outside their household, etc.) and their location relative to the one or more media delivery devices to which they and their PPM are exposed.

Unfortunately, the typical household presents unique monitoring challenges to the PPM. For example, a typical household includes multiple media delivery devices, each configured to deliver media content to specific viewing and/or listening areas located within the home. A PPM, carried by a person who is located in one of the viewing and/or listening areas, is configured to detect any media content being delivered in the viewing and/or listening area and to credit the programming associated with the media content as having been consumed. Thus, the PPM operates on the premise that any media content detected by the PPM is associated with programming that was consumed by the person carrying the PPM. However, in some cases, a person's PPM may detect media content that is emitted by a media delivery device that is not located within the viewing or listening proximity of the person carrying the PPM thereby causing the detected programming to be improperly credited. The ability of the PPM to detect audio/video content being delivered outside of the viewing and/or listening proximity of the person carrying the PPM is an effect referred to as "spillover" because the media content being delivered outside of the viewing and/or listening proximity of the person carrying the PPM is described as "spilling over" into the area occupied by the person carrying the PPM. Spillover may occur, for example, in a case where a monitored individual in a bedroom is reading a book, but their PPM detects audio/video content delivered by a television in an adjacent living room, i.e., outside of their viewing/listening proximity, causing the audio/video content to be improperly credited as having been consumed.

Another effect, referred to as "hijacking" occurs when a person's PPM detects audio/video content being emitted from multiple media delivery devices at the same time. For example, an adult watching a television news program in a household kitchen may be located near a household family room in which children are watching a television cartoon program on a different television. Yet, the cartoon programming delivered by the family room television may, in some cases, have signals that overpower or "hijack" the signals associated with the news programming being emitted by the kitchen television. As a result, the adult's PPM may inaccurately credit the cartoon program as having been viewed by the adult and fail to credit the news program with any viewing. Still further, other common difficulties such as varying volume levels, varying audio/video content type (e.g., sparse, medium, rich, etc.), varying household transmission characteristics due to open/closed doors, movement and/or placement of furniture, acoustic characteristics of room layouts, wall construction, floor coverings, ceiling heights, etc. often lead to inaccurate audio/video content consumption detection by PPMs.

DETAILED DESCRIPTION

Figure 1A:
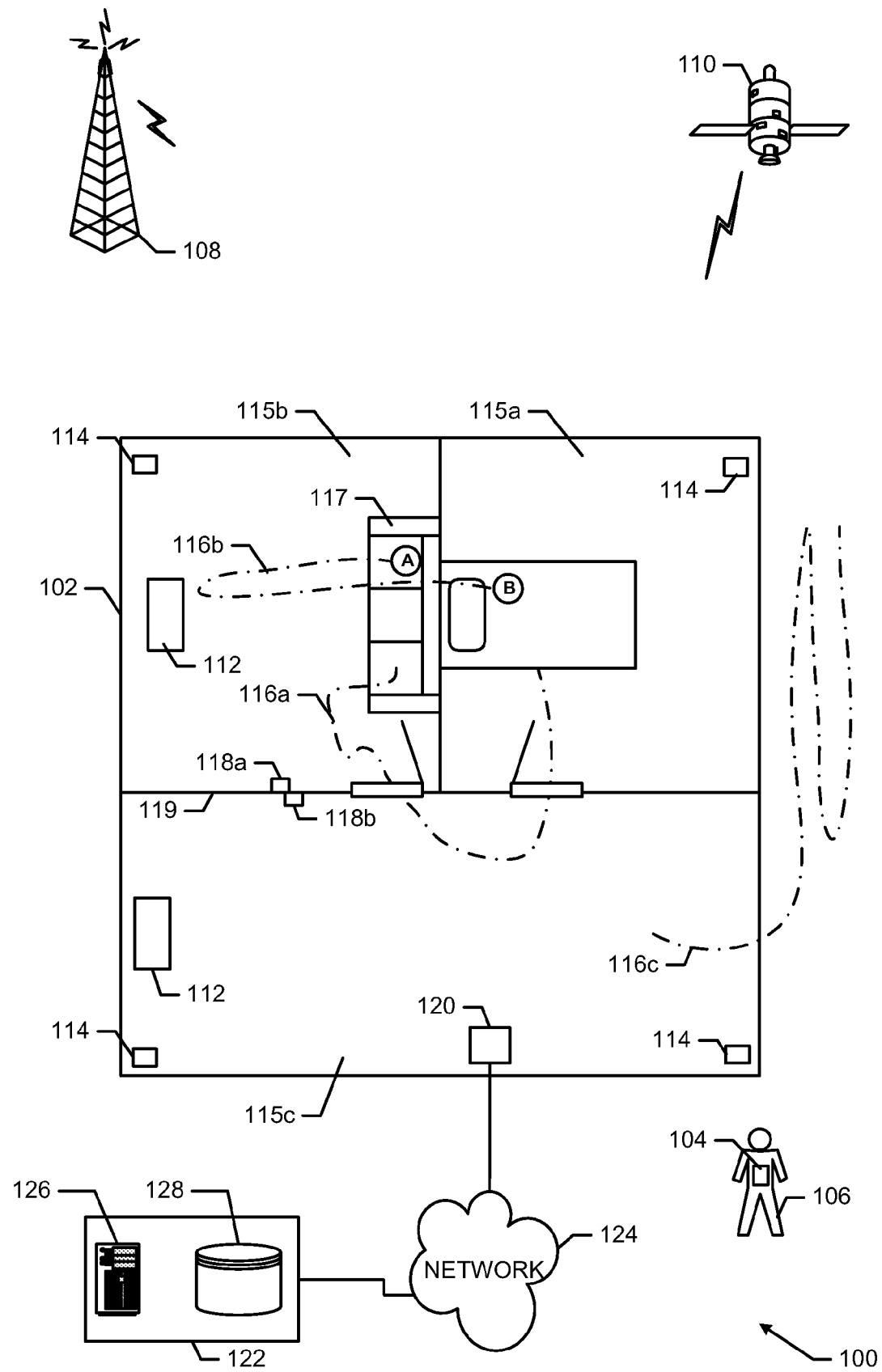
FIG. 1A illustrates an example area in which audience member location information may be collected and used to monitor media consumption.

Although the following discloses example systems including, among other components, software executed on hardware, it should be noted that such systems are merely illustrative and should not be considered as limiting. For example, it is contemplated that any or all of these hardware and software components could be embodied exclusively in hardware, exclusively in software, or in any combination of hardware and software. Accordingly, while the following describes example systems, persons having ordinary skill in the art will readily appreciate that the examples provided are not the only way to implement such systems.

In general, the example methods and apparatus described herein may be used to manage signal spillover and/or other sources of media monitoring inaccuracies in the course of an audience member's exposure to media sources or media presentations to more accurately assess the consumption of those media sources or presentations. As described in greater detail below, example methods and apparatus may be used to prevent signal spillover from adversely affecting results of media monitoring. In general, some of the example methods and apparatus for managing (e.g., preventing) signal spillover include using location detection technologies, placing media code interference apparatus throughout spaces and/or rooms in which media delivery devices are not placed, and using heuristic-based algorithms to more accurately determine the location of audience members and/or the locations of the media presentation devices via which media is consumed.

Although some of the example systems and methods are described below as monitoring media consumption by using location information to detect spillover in an audience monitoring system. The example systems and methods may also be implemented as described below to use location information to detect the location of a person in a home and to better understand media consumption habits of audience members. In some example implementations, the example methods and systems described below may use location information to determine the location of an audience member within a particular room or space of a household and to determine whether the audience member is sufficiently exposed to media presentations (e.g., radio programs, television programs, movies, computer information, etc.). An example implementation involves collecting location information associated with the location of an audience member to determine if the audience member is actively or effectively consuming a proximate or otherwise consumable media source. For example, if an audience member is within a room, space, or location that has a readily visible or audible media delivery device, the audience member is likely consuming any media presented by the media delivery device.

Although some example implementations may be used to determine that a person is generally located within a room or area of a household, other example implementations may be used to determine relatively more precise locations of a person within a particular room using, for example, X-Y location coordinates corresponding to a particular room or a particular household. Relatively more precise location coordinates provide an even better understanding of audience members' viewing habits. For example, although an audience member is located within a room having a television that is presenting or delivering a television program, the relatively more precise location information may indicate that the audience member is not facing the television, but is instead, for example, working on a computer and is not sufficiently exposed to the television to consume the television media. Of course, the example systems and methods described herein may use location information in any number of other ways to generate media monitoring information to better understand the viewing habits of consumers.

The example methods and apparatus described herein may be implemented using, for example, a PPM worn or carried by an audience member, location information systems (e.g., the global positioning system (GPS), radio frequency towers for triangulation, etc.), media code emitters, and media delivery devices, all of which may be used to collect and analyze audience member location information and/or media monitoring information. In this manner, media presentations (e.g., audio, video, still images, Internet information, computer information, etc.) may be given appropriate media exposure credit.

For purposes of clarity, the example methods and apparatus are described herein with respect to an example geographic area 100 shown in FIG. 1A. Although the example geographic area 100 is shown by way of example as indoor and outdoor areas associated with a household 102, the example methods and apparatus described herein may be used in any other area(s) or environment(s).

Location information is generally collected to determine rooms or locations of the household 102 within which an audience member is located while consuming or being exposed to media information. Location information may include, for example, a plurality of geographic, global, or position coordinates that may be used to analyze the movements of a person or an audience member from one location to another. As described in greater detail below, location information may be collected, obtained, generated, etc. using any suitable location detection devices, location detection systems, and/or location detection techniques. Specifically, the location detection devices described below may be worn or otherwise carried by a person or audience member.

Location information may be continuously collected in indoor environments and/or outdoor environments via, for example, an example PPM 104 that may be carried or worn by an audience member 106 as shown in FIG. 1A. In particular, the example PPM 104 may be configured to monitor the audience member 106 via one or more location detection devices and/or motion detection devices described below in connection with FIG. 2. The location detection devices and motion detection devices may be configured to enable the example PPM 104 to collect audience member location information and/or motion information in indoor environments and/or outdoor environments. In this manner, when an audience member moves among indoor areas and outdoor areas a substantially continuous location history may be tracked or logged for each audience member to develop movement information.

Media monitoring information may include any information associated with media that is consumed (e.g., viewed, listened to, interacted with, etc.) by an audience member. Media presentations may include, for example, television programming, radio programming, movies, songs, advertisements, Internet information, and/or any other video information, audio information, still image information, and computer information to which a person may be exposed. Media monitoring information may be generated based on, for example, audio codes, signatures, radio frequency (RF) codes, and/or any other codes, information, or identifiers that may be extracted from or otherwise associated with a media presentation to which an audience member is exposed. As described in greater detail below, media monitoring information may be collected generated, obtained, etc. using any suitable media consumption detection device and/or any suitable media consumption detection technique.

In one implementation, the PPM 104 may tag media monitoring information with respective media location information to generate movement-annotated media monitoring information. In other words, in a substantially real-time process, the PPM 104 may substantially continuously combine time-stamped media monitoring information with time-stamped location information that corresponds to the locations at which the PPM 104 collected the time-stamped media monitoring information. In this manner, subsequent analyses can be used to determine the locations at which the audience member 106 was exposed to particular media. Alternatively, time-stamped media monitoring information may be combined with time-stamped location information in a post process. For example, time-stamped media monitoring information and time stamped location information may be stored within a memory (e.g., the memory 204 of FIG. 2) of the PPM 104 or may be stored in a storage device that is separate from the storage device (e.g., another information processing system) and may then be combined, joined, or otherwise interrelated in a subsequent process to generate location-annotated media monitoring information. Other information with which the collected information may be annotated includes, for example, audience identification information and PPM identification information.

Traditional methods for measuring media consumption typically track or log the media presentations to which an audience member is exposed and award a media exposure credit to a media source or presentation any time an audience member is in the vicinity of that media presentation or, more generally, within a distance of the media delivery device from which it is likely the audience member is consuming the media or from which it is likely a PPM will detect a media code associated with the media presentation. However, these traditional methods may produce inconsistent or inaccurate results due to spillover that occurs when the audience member 106 is in the vicinity of a media presentation, but is not adequately exposed to the media presentation. For example, within the household 102, spillover may occur when the audience member 106 is located within a room having no media delivery device, but the PPM 104 detects media codes emanating from a media delivery device in another room. Logging the media codes that have spilled over from a space that is outside of the listening/viewing proximity of the audience member 106 results in an inaccurate representation of the media programs consumed by the audience member 106.

As shown in FIG. 1A, the household 102 and the audience member 106 wearing the PPM 104 are located within the example geographic area 100. As described below, the PPM 104 may be used to collect location information, motion information, and media monitoring information within the household 102, outside of the household 102, and within structures other than the household 102.

The PPM 104 may be configured to substantially continuously generate, obtain, and/or collect media monitoring information, location information, and motion information. As described in greater detail below in connection with FIG. 2, the PPM 104 may include one or more media detection devices used to detect presented media and generate or collect media monitoring information or media-related data based on, for example, audio signals, visual signals, radio frequency signals, etc. In addition, the PPM 104 may include one or more location or positioning devices that enable the PPM 104 to collect location or position information from one or more location information systems and/or to send location information to one or more location information systems. The example geographic area 100 includes one or more location information systems that may be used to communicate location information to/from the PPM 104.

The location information systems may be implemented using, for example, one or more radio frequency (RF) transceiver towers represented in FIG. 1A by a RF transceiver tower 108 and/or one or more satellites represented in FIG. 1A by a satellite 110. In addition, the interior environment of the household 102 may include one or more location information systems described below.

The PPM 104 may collect media monitoring information (e.g., ancillary codes, signatures, etc.) associated with any media (e.g., video, audio, movies, music, still pictures, advertising, computer information, etc.) to which the audience member 106 is exposed. For example, the PPM 104 may be configured to obtain audio codes, generate or collect signatures, etc. that may be used to identify video programs (e.g., DVD movies, television programming, etc.), audio programs (e.g., CD audio, radio programming, etc.), etc. In particular, the household 102 includes a plurality of media delivery centers 112, each of which may include one or more media delivery devices such as, for example, a television, a radio, etc. as well as one or more media playback devices such as, for example, a DVD player, VCR, etc. Using one or more media detection devices described below in connection with FIG. 2, the PPM 104 may collect media monitoring information associated with media presented or delivered by one or more of the media delivery centers 112 and to which the audience member 106 may be exposed.

Location information collected by the PPM 104 may be used to generate movement information and/or to analyze the movements of the audience member 106. For example, movement information may be stored as a plurality of location coordinates or location information that may be converted to movement information during subsequent processing by generating movement paths that indicate or track the movements of an audience member. The PPM 104 may also include motion detection devices as described below in connection with FIG. 2. Motion detection devices may be used in combination with location detection devices to more accurately determine the locations of the audience member 106. For example, the motion detection devices may provide motion information such as, for example, acceleration, direction of travel, etc., which may be used to supplement location information and more accurately determine the locations of the audience member 106.

The RF transceiver tower 108 may be used in combination with any RF communication technology such as, for example, a cellular communication technology (e.g., GSM, CDMA, TDMA, AMPS, etc.) In one example configuration, the RF transceiver tower 108 may be configured to transmit or broadcast position information and/or any type of signal that may be used by the PPM 104 to generate location information. For example, the RF transceiver tower 108 may transmit information having geographic location information and time codes. More specifically, the RF transceiver tower 108 may be associated with a particular or unique set of geographic location coordinates (i.e., geographic location information), that define or indicate the location of the RF transceiver tower 108 within a global positioning grid. The time codes may be associated with a time at which a particular signal is transmitted by the RF transceiver tower 108.

The geographic location information and the time codes received from a plurality of RF transceiver towers may be used by the PPM 104 to perform triangulation processes to determine the location(s) of the PPM 104. Triangulation processes are well known in the art and, thus, are not described further herein. Although the RF transceiver tower 108 is depicted as being located in an outdoor environment, the PPM 104 may include location technologies that communicate with the RF transceiver tower 108 when the PPM 104 is located within indoor environments (e.g., within the household 102) or outdoor environments.

The satellite 110 may also be used to communicate location information to/from the PPM 104. For example, the satellite 110 may be used to implement any satellite positioning system (SPS) such as, for example, the global positioning system (GPS) that continuously broadcasts position-related information. In this manner, the PPM 104 may receive the position-related information from the satellite 110 to determine the location(s) and movement of the PPM 104.

One or more location information systems may also be located within the household 102. As shown in FIG. 1A, an example location information system includes a plurality of base units 114. The base units 114 may include one or more location detection technologies, some of which are described below in connection with FIG. 3. The base units 114 may be configured to work cooperatively with the PPM 104 to substantially continuously generate location information associated with the location of the PPM 104 as the audience member 106 moves among various areas within or around the household 102. While the location detection technologies and capabilities are described as being integrated within the base units 114, such technologies and capabilities could instead be incorporated within other devices or systems separate from the base units 114.

The base units 114 may also be configured to detect media codes and/or deliver or emit media codes. For example, the base units 114 may be communicatively coupled to the media delivery centers 112 via audio and/or video communication paths and configured to obtain audio and/or video codes associated with media presentations delivered by the media delivery centers 112. In this manner, the base units 114 may log time-stamped media monitoring information that indicates the media to which the audience member 106 may be exposed. As described in greater detail below in connection with example methods of FIGS. 11A-11C, the time-stamped media monitoring information may be compared and/or combined with time-stamped location information collected by the PPM 104 to determine the locations of the audience member 106 and the media presentations to which the audience member 106 was exposed.

The base units 114 may also generate media codes via media code generators as described in greater detail below in connection with FIG. 3. The media code generators may be used to generate interference or disrupter media codes in areas proximate to base units 114 located within rooms or areas (e.g., hallways) having no media delivery centers. For example, a room 115a of the household 102 has no media delivery centers while rooms 115b and 115c each includes the media delivery centers 112. The base unit 114 located in the room 115a may be configured to emit an interference media code that substantially disrupts or blocks media codes from the media delivery centers 112 that could otherwise spillover into the room 115a. In this manner, when the PPM 104 is in the room 115a, any media codes that spillover from the rooms 115b and 115c are overpowered, disrupted, blocked or otherwise obfuscated by the interference media codes broadcast by the base unit 114 in the room 115a so that the PPM 104 only detects the interference media codes.

The interference media codes may be blank values or key values that, during subsequent analyses of the information, are used to discard or disregard information collected within rooms (e.g., the room 115a) or spaces (e.g., hallways) having no media delivery devices. The base unit 114 may emit the interference codes at various frequencies. For example, the frequencies at which the base units 114 emit interference codes may be selected to ensure that media codes that spill over from other rooms are disrupted (i.e., not detectable to a PPM located in the same room as the code disrupter) but allow the media codes of the room within which the PPM 104 is located to be detected by the PPM 104. Alternatively, the base unit 114 may emit interference media codes at all of the frequencies at which the television/media audio codes of other rooms or spaces are transmitted. Additionally, the base unit 114 may include a microphone for sensing ambient noise/sound and may increase the strength at which the interference media codes are emitted when the ambient noise in the room increases. Thus, the interference media codes would have limited impact on (e.g., would not be perceptible by) people located within the vicinity of the base units 114.

In an alternative or additional implementation, the base units 114 located in rooms or spaces having none of the media delivery centers 112 may be configured to emit a white noise or other type of interfering or masking noise or signal to prevent the PPM 104 from detecting any media codes that would otherwise spill over into the room or space having none of the media delivery centers 112. The white noise or other type of interfering or masking noise may be delivered at a power level, strength, or volume that the human brain can tune out or easily disregard without causing annoyance (or at least minimizing the level of annoyance caused) to humans.

The base units 114 may be implemented using consoles that are placed anywhere within the rooms or spaces of a household. Alternatively or additionally, the base units 114 may be implemented as wall-mountable devices that can, for example, be plugged directly into an alternating current (AC) electrical outlet.

For cases in which the base units 114 are installed or placed only in rooms or spaces having media delivery centers (e.g., the media delivery centers 112), the base units 114 may be configured to emit location information associated only with their respective rooms. In this case, transmission fields of each of the base units 114 may be shaped using a shielding material to prevent, eliminate, or reduce spillover of the location information into adjacent rooms. For example, shielding materials may be operatively coupled to the base units 114 to shape RF emission fields to prevent the base units 114 from spilling RF information into adjacent rooms or spaces by positioning the shielding material to block the transmission of signals toward any walls shared by adjacent rooms. For example, the shielding material may be applied to the base units 114 to direct the emitted RF energy in a direction toward the center of the room or space corresponding to the base unit 114. The metal shield may also be positioned to block the transmission of signals toward any walls shared by adjacent rooms. Using such a shield, a location code signal propagates away from the walls shared by adjacent rooms so that spillover of the location codes into the adjacent room is limited or substantially eliminated. Although the location codes and/or other information emitted by the base units 114 may reflect off of one or more surfaces in the room, the reflected signal would be substantially weakened to significantly degrade or minimize the ability of the reflected signal to travel through the wall. In this manner, if the PPM 104 detects audio codes and the location codes, then the corresponding programming is associated with actual viewing. If instead the audio codes are detected but the location codes are not detected, then the detected audio codes may be disregarded as being caused by spillover.

Example movement information is shown in FIG. 1A as a first movement path 116a, a second movement path 116b, and a third movement path 116c. The first movement path 116a indicates that the audience member 106 moved from one room to another. The second movement path 116b indicates that the audience member 106 moved from a couch 117 to the media delivery center 112 and back. The third movement path 116c indicates that the audience member 106 moved from the inside of the household 102 to a location outside of the household 102. The example movement paths 116a-c may be generated using location information collected by the PPM 104 in combination with any one or more suitable location information systems (e.g., the RF transceiver tower 108, the satellite 110, the base units 114, etc.). For example, the location information used to generate the movement paths 116a and 116b may be generated using information received from the RF transceiver towers 108, the base units 114, or a combination thereof.

The location information used to generate the movement path 116c may include location information generated using location information systems that function for indoor use and/or outdoor use. One such location information system may be, for example, the RF transceiver tower 108. Alternatively, location information associated with the movement path 116c may be generated using a combination of location information systems such as, for example, a first location information system that functions primarily or only in indoor environments and a second location information system that functions primarily or only in outdoor environments. In that case, the first location information system for indoor use may be, for example, the base units 114 and the second location information system may be, for example, the satellite 110. Using two location information systems (e.g., the base units 114 and the satellite 110) in combination may require a handoff process to ensure that the PPM 104 transitions substantially seamlessly from working with one location information system to working with another. An example handoff process may include a software routine that continuously searches for the signals from both location information systems and works with the location information system providing the strongest signal. Other software and/or circuitry may provide hysteresis to enable minimum/maximum threshold levels of signal strength to be used to prevent the PPM 104 from continuously switching between location information systems.

The household 102 may also include a plurality of room differentiators 118a and 118b. The room differentiators 118a and 118b may be placed in rooms and/or areas within rooms or spaces that are prone to spillover. For example, the room differentiators 118a and 118b may be placed on or adjacent to opposing surfaces of a wall (e.g., a wall 119) separating two rooms or spaces. Each of the room differentiators 118a and 118b is configured to emit a code (e.g., an ancillary location code) or a signal at a particular frequency uniquely associated with a respective room. The room differentiators 118a and 118b may include a short range signal broadcasting or signal emitting technology that is easily attenuated by walls. In this manner, if the audience member 106 is close to the wall 119 and the PPM 104 detects media codes from two different media delivery centers 112, the short range codes emitted by the room differentiators may be used by the PPM 104 to determine in which room the PPM 104 is located and, thus, to which media delivery center 112 the audience member 106 is exposed. The PPM 104 will only detect the short range code from the room differentiator located within the same room as the audience member 106 because the short range codes are configured to be substantially attenuated by walls. One such technology that can be tuned to be easily attenuated by walls includes ultrasound emitters. In such a configuration, the PPM 104 will include an ultrasound receiver. Of course, any other suitable technology could be used instead. For example, the room differentiators 118a and 118b could be implemented using 802.11 emitters that are set to a low enough signal strength to be substantially attenuated by the wall 119.

In an example implementation in which the room differentiators 118a and 118b are implemented using 802.11 emitters, each of the room differentiators 118a and 118b may be configured to emit signals at a low power (i.e., weak signals), at a different frequency, and/or having different location codes. The differentiators 118a and 118b may be placed near or on the wall 119 in each room such that the audience member 106 carrying the PPM 104 in the room 115c will be closer to the differentiator 118b because the differentiator 118b is located in the same room (e.g., the room 115c) in which the PPM 104 is located. If the PPM 104 detects signals from both of the differentiators 118a and 118b at substantially the same time, then the stronger signal is used to identify the one of the differentiators 118a and 118b that is in the same room as the PPM 104. In this manner, the PPM 104 may log the room within which it is located and use this information in combination with location information and media monitoring information to determine a media presentation consumed by the audience member 106.

The information received from one of the differentiators 118a and 118b that is within the same room as the PPM 104 may be logged by the PPM 104 and used during subsequent analyses to determine the room in which the PPM 104 was collecting audio codes from media programs. If it is determined during subsequent analyses that the room within which the PPM 104 is located contains a television or other media delivery device (e.g., the media delivery centers 112), any audio codes detected by the PPM 104 are associated with actual viewing. On the other hand, if the identified room does not contain a television or other media delivery device, then any audio codes detected by the PPM 104 are identified as spillover codes and are disregarded.

The room differentiators 118a and 118b may be implemented using a wall-mountable device that plugs directly into AC electrical outlets. Alternatively, the room differentiators 118a and 118b may be implemented using a console mounted to a wall or stored on the floor. A broadcasting transducer (e.g., a speaker) may be operatively coupled to and mounted within each of the room differentiators 118a and 118b. Alternatively, one or more broadcasting transducers may be tethered to each of the room differentiators 118a and 118b and distributed evenly along opposing sides of a wall (e.g., the wall 119).

A home processing system 120 may be configured to communicate with the PPM 104 and/or the base units 114. In particular, the home processing system 120 may be communicatively coupled to one or more docking stations (not shown) configured to receive the PPM 104 and communicatively couple the PPM 104 to the home processing system 120. The audience member 106 may periodically (e.g., nightly) place the PPM 104 into a docking station to enable the home processing system 120 to obtain collected media monitoring information, location information, motion information, and/or any other information stored in the PPM 104. Alternatively, the PPM 104 may be communicatively coupled with the base units 114 via wireless and/or hardwired communications and may periodically communicate collected information to the home processing system 120 via one or more of the base units 114.

The home processing system 120 is communicatively coupled to a central facility 122 via a network 124. The central facility 122 is remotely located from the household 102 and is communicatively coupled to the household 102 and other monitored sites (e.g., other households) via the network 124. The central facility 122 obtains media consumption data, media monitoring data, location information, motion information, and/or any other monitoring data that is collected by various media monitoring devices such as, for example, the PPM 104. The central facility 122 includes a server 126 (i.e., a central processor system) and a database 128 that may be implemented using any suitable memory and/or data storage apparatus and techniques. The server 126 may be implemented using, for example, a processor system similar or identical to the example processor system 1710 depicted in FIG. 17. The server 126 may be configured to store information collected from the PPM 104 in the database 128 and analyze the information. In addition, the server 126 may be configured to generate calibration information for the PPM 104 and/or other PPMs based on audio information or audio samples collected during an acoustic characterization process or calibration process performed within the household 102.

The network 124 may be used to communicate information between the central facility 122 and devices or apparatus in the monitored household 102. For example, the network 124 may be communicatively coupled to the base units 114, the PPM 104, and/or the home processing system 120. The network 124 may be implemented using any suitable communication interface including, for example, telephone lines, a cable system, a satellite system, a cellular communication system, AC power lines, etc.

Figure 1B:
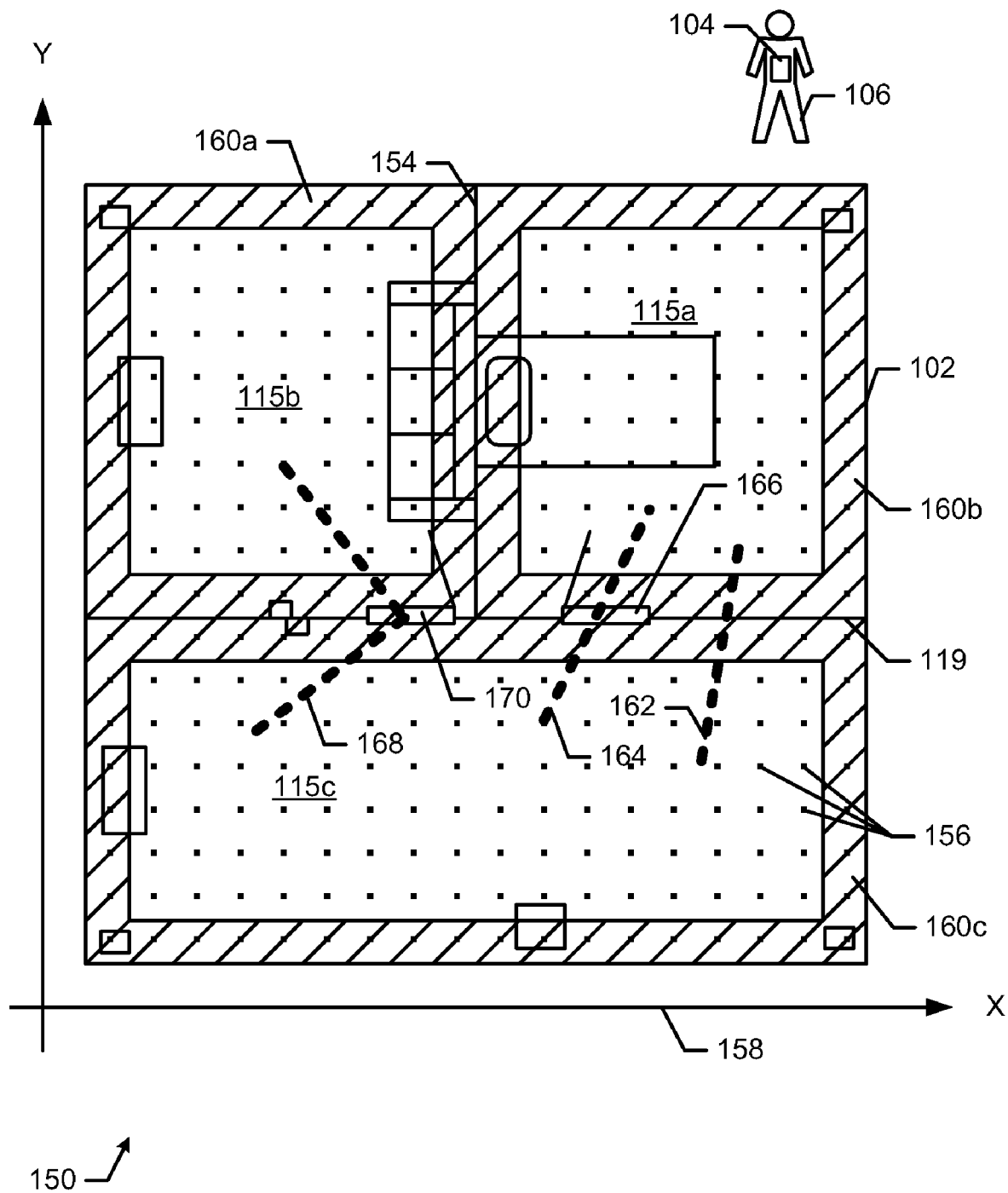
FIG. 1B illustrates location analysis indicia overlaid onto the example household of FIG. 1A.

FIG. 1B illustrates location analysis indicia overlaid onto the example household 102 of FIG. 1A. The household 102 includes the plurality of rooms 115a-115c separated by walls 119 and 154. Each of the rooms 115a-115c is mapped using XY coordinates 156 of an XY grid 158. The XY coordinates 156 are arranged to indicate general locations at which the audience member 106 may reside when moving within the household 102. As described in greater detail below in connection with the example methods of FIGS. 14A-14E, the XY coordinates 156 may be used to determine if the PPM 104 has collected accurate location information.

Additionally, a plurality of boundary zones 160a, 160b, and 160c are each overlaid onto the rooms 115a-115c, respectively. The boundary zones 160a-160c indicate areas within the rooms 115a-115c that may be defined by areas within a predefined distance from every wall of the rooms 115a-115c. The boundary zones 160a-160c indicate areas within which location information collected by the PPM 104 may be erroneously interpreted as being associated with a room different than that within which the PPM 104 is located. Specifically, the boundary zones 160a-160c may be defined according to accuracy limitations of the PPM 104 and/or any of the location information systems (e.g., the RF tower 108, the satellite 110, and the base units 114 of FIG. 1A). For example, if the PPM 104 is capable of collecting and/or generating location information that is accurate to within two feet, the boundary zones 160a-160c may be predefined as extending two feet from each wall. As described in greater detail below in connection with the example method of FIG. 14E, the boundary zones 160a-160c may be used to determine when location information collected by the PPM 104 is likely to give inaccurate results by indicating that the PPM 104 is in a room different from the one within which it is actually located. Path lines 162 and 164 illustrate lines that extend between corresponding sequentially collected location coordinates (e.g., $(X_n, Y_n)$ and $(X_{n+1}, Y_{n+1})$). As shown, the path line 162 is intersected by wall 119 and path line 164 indicates a path through a doorway 166. As described in greater detail below in connection with the example methods of FIGS. 14A-14E, the path lines 162 and 164 may be used to determine if the audience member 106 moved from one room (e.g., the room 115c) to another (e.g., the room 115a). Path line 168 illustrates a path extending between two sequentially collected location coordinates (e.g., $(X_n, Y_n)$ and $(X_{n+1}, Y_{n+1})$). As described in greater detail below in connection with the example method of FIG. 14C, a rate of travel associated with the path line 168 may be used to determine if the audience member 106 could have possibly moved from a first room (e.g., the room 115b) to a second room (e.g., the room 115c) via a doorway 170 in the wall 119.

Figure 1C:
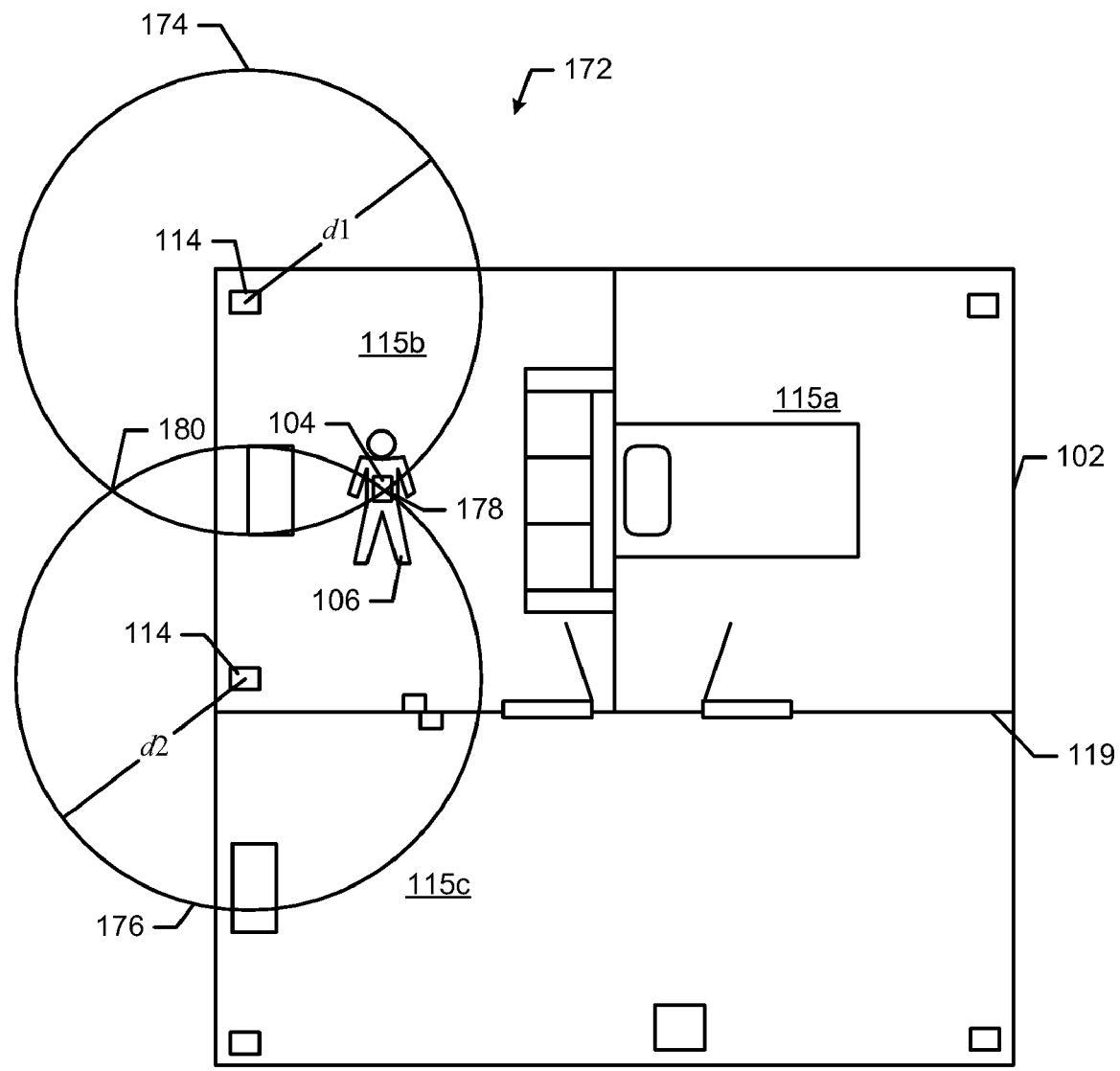
FIG. 1C illustrates an example location detection diagram overlaid onto the example household of FIG. 1A.

FIG. 1C illustrates an example location detection system 172 in the example household 102 of FIG. 1A. The example location detection system 172 may be used to implement a location detection technique that is substantially similar to a triangulation-based location detection technique. The location detection system 172 may include two (or more) audio chirp transmitters (e.g., two of the base units 114) disposed at various locations in, for example, a single room (e.g., the room 115b) of the household 102. The position of each audio chirp transmitter is known and the audio chirp emitted by each of the transmitters may be used to uniquely identify the transmitter from which the audio chirp originated. Referring to FIG. 1C, the PPM 104 may be configured to receive audio chirps emitted from the base units 114 disposed within the same room 115b and determine its location within the room 115b using a location detection algorithm and the audio chirps. An example method that may be used to perform this location detection technique is described in greater detail below in connection with FIG. 13B.

As shown in FIG. 1C, two base units 114 are disposed within the room 115b. Each of the base units 114 may be configured to emit a uniquely identifiable audio chirp that is detectable by the PPM 104. For example, each of the base units 114 may emit an audio chirp at a unique frequency so that the PPM 104 may identify which of the base units 114 emitted a particular audio chirp. Alternatively or additionally, the audio chirps may include codes (e.g., audio codes) that uniquely identify the base unit from which they are emitted.

The PPM 104 and base units 114 may include respective clocks (e.g., the timing device 205 of FIG. 2 and the timing device 309 of FIG. 3) that are synchronized with each other to determine propagation delays or time delays of the audio chirps. The base units 114 may embed timestamps into the audio chirps based on their respective clocks that indicate the time at which the base units 114 emitted the audio chirps. The PPM 104 may use a timestamp to determine the amount of time (e.g., the propagation delay or time delay) that lapsed between the time at which one of the base units 114 emitted an audio chirp and the time at which the PPM 104 received the audio chirp.

As shown in FIG. 1C, the audience member 106 and the PPM 104 are located within the room 115b at a location at which the PPM 104 determines that it is a first distance d1 away from one of the base units 114 based on the audio chirp emitted by that base unit 114 and a second distance d2 away from the other one of the base units 114 based on the audio chirp emitted by the other base unit 114. The PPM 104 may determine the distances d1 and d2 based on the propagation delays of the audio chirps as described in greater detail below in connection with FIG. 13B. The distances d1 and d2 form a first propagation perimeter 174 and a second propagation perimeter 176, respectively. The PPM 104 may determine the location at which the PPM 104 is disposed within the room 115b by determining the location within the room 115b at which the propagation perimeters 174 and 176 intersect each other. The base units 114 may be disposed within the room 115b at locations that cause the propagation perimeters 174 and 176 to intersect at only one location within the room. In this manner, a location detection algorithm or process may distinguish an intersection point 178 of the propagation perimeters 174 and 176 that is within the room 115b from an intersection point 180 that is outside of the room 115b. As described in greater detail below in connection with FIG. 13B, the PPM 104 may determine its location within the room 115b based on the uniquely identifiable audio chirps, the timestamp of each audio chirp, and the known location within the room 115b of each of the base units 114.

Figure 2:
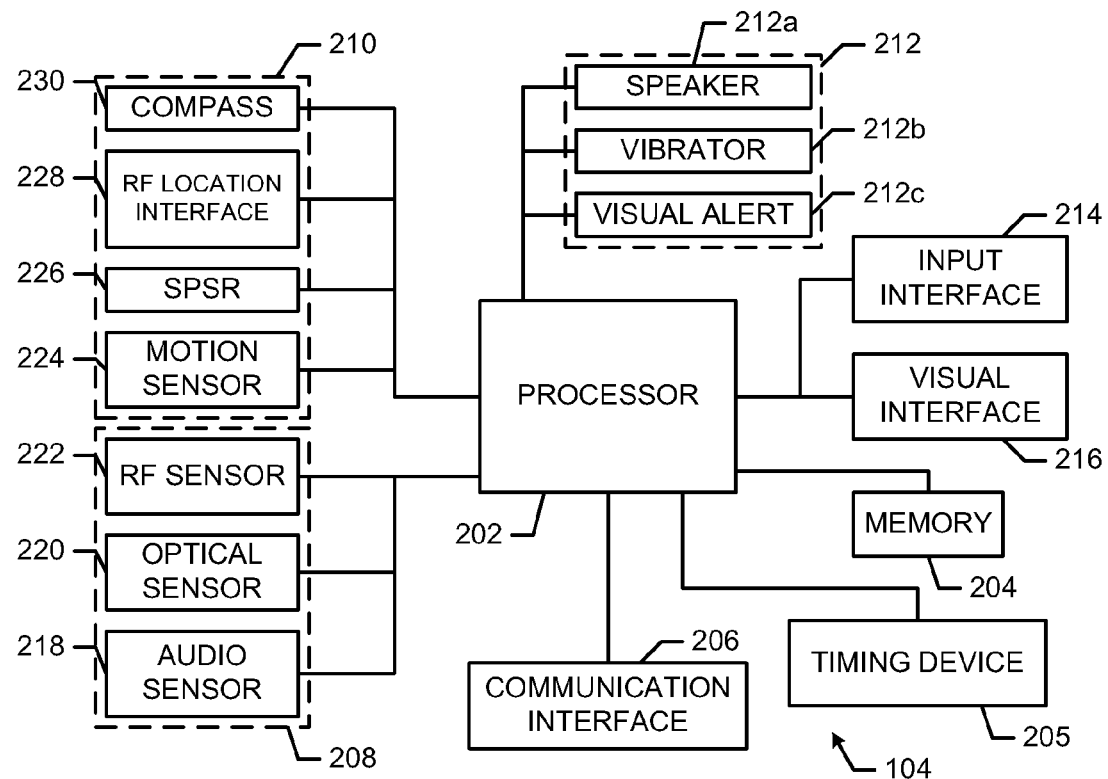
FIG. 2 is a block diagram of the example personal portable metering device of FIG. 1A.

FIG. 2 is a block diagram of the example PPM 104 of FIG. 1A. As described above, the PPM 104 may be used to monitor the media consumption activities of an audience member (e.g., the audience member 106 of FIG. 1A) in addition to location information and motion information associated with those media consumption activities. In general, the PPM 104 includes electronic components configured to detect and collect media monitoring information, location information, and motion information and communicates the information to the home processing system 120 and/or the central facility 122 (FIG. 1A) for subsequent analyses. As shown in FIG. 2, the PPM 104 includes a processor 202, a memory 204, a timing device 205, a communication interface 206, a plurality of media monitoring information sensors 208, a plurality of location and motion sensors 210, a plurality of output devices 212, an input interface 214, and a visual interface 216, all of which are communicatively coupled as shown.

The processor 202 may be any processor suitable for controlling the PPM 104 and managing or processing monitoring data related to detected media consumption or presentation information, location information, and/or motion information. For example, the processor 202 may be implemented using a general purpose processor, a digital signal processor, or any combination thereof. The processor 202 may be configured to perform and control various operations and features of the PPM 104 such as, for example, setting the PPM 104 in different operating modes, controlling a sampling frequency for collecting media monitoring information, location information, and motion information, managing communication operations with other processor systems (e.g., the base units 114, the home processing system 120, the server 126 of FIG. 1A), selecting location information systems (e.g., the RF transceiver tower 108, the satellite 110, and the base units 114), etc.

The memory 204 may be used to store collected media monitoring information, program instructions (e.g., software, firmware, etc.), program data (e.g., location information, motion information, etc.), and/or any other data or information required to operate the PPM 104. For example, after acquiring location information, motion information, and/or media monitoring information, the processor 202 may time stamp the acquired information and store the time stamped information in the memory 204. The memory 204 may be implemented using any suitable volatile and/or non-volatile memory including a random access memory (RAM), a read-only memory (ROM), a flash memory device, a hard drive, an optical storage medium, etc. In addition, the memory 204 may be any removable or non-removable storage medium.

The timing device 205 may be implemented using a clock (e.g., a real-time clock), a timer, a counter, or any combination thereof. The timing device 205 may be used to generate timestamps or used to implement any timing operations. Although the timing device 205 is shown as separate from the processor 202, in some implementations the timing device 205 may be integrated with the processor 202.

The communication interface 206 may be used to communicate information between the PPM 104 and other processor systems including, for example, the base units 114, the home processing system 120, and/or the server 126 of FIG. 1A. The communication interface 206 may be implemented using any type of suitable wired or wireless transmitter, receiver, or transceiver including a Bluetooth transceiver, an 802.11 transceiver, a cellular communications transceiver, an optical communications transceiver, etc.

The media monitoring information sensors 208 include an audio sensor 218, an optical sensor 220, and an RF sensor 222. The example PPM 104, via the audio sensor 218, the optical sensor 220, and/or the RF sensor 222, observes the environment in which the audience member 106 is located and monitors for media presentation and/or signals associated with media presentations. When media presentations are detected via, for example, media codes, the example PPM 104 logs or stores a representation of the media content in the memory 204 and/or identifies the content, along with the time at which the content is detected.

The audio sensor 218 may be, for example, a condenser microphone, a piezoelectric microphone or any other suitable transducer capable of converting audio information into electrical information. The optical sensor 220 may be, for example, a light sensitive diode, an infrared (IR) sensor, a complimentary metal oxide semiconductor (CMOS) sensor array, a charge-coupled diode (CCD) sensor array, etc. The RF sensor 222 may be, for example, a Bluetooth transceiver, an 802.11 transceiver, an ultrawideband RF receiver, and/or any other RF receiver and/or transceiver. While the example PPM 104 of FIG. 1A includes the audio sensor 218, the optical sensor 220, and the RF sensor 222, the example PPM 104 need not include all of the sensors 218, 220, and 222. For example, the audio sensor 218 is sufficient to identify audio/video or program content via program characteristics, such as signatures or, if they are present, audio codes. Additionally, the optical sensor 220 is sufficient to identify program content via program characteristics, such as signatures or, if present, video codes. However, because video monitoring generally requires a line of sight between the PPM 104 and the media delivery device, one particularly advantageous example includes the audio sensor 218 and the optical sensor 220.

The location and motion sensors 210 are configured to detect location-related information and/or motion-related information and to generate corresponding signals that are communicated to the processor 202. More specifically, the location and motion sensors 210 may include a motion sensor 224, a satellite positioning system (SPS) receiver 226, an RF location interface 228, and a compass 230.

Some of the location and motion sensors 210 may be configured to receive location-related information (e.g., encoded information, pluralities of fragmented information, etc.) and to perform any processing necessary to convert the received information to location information that indicates the location at which the PPM 104 is located. For example, location information may be derived using triangulation techniques, whereby the PPM 104 may receive RF signals from three or more RF transmitters (e.g., three or more of the base units 114 of FIG. 1A). In this case, a single RF signal from any one RF transmitter may be useless for generating location information. However, the location information may be generated by triangulating or processing a combination of RF signals from a plurality of RF transmitters. Thus, some of the location and motion sensors 210 may be configured to process received location-related signals to generate location information and others of the location and motion sensors 210 may be configured to process the received location-related signals in combination with software executed on the processor 202 to generate location information. Still others of the location and motion sensors 210 may communicate any received information to the processor 202 for processing.

The motion sensor 224 may be used to detect relatively small body movements of an audience member (e.g., the audience member 106), generate motion information related to the body movements, and communicate the motion information to the processor 202. The motion sensor 224 may be implemented using any suitable motion detection device such as, for example, a mercury switch, a trembler, a piezo-gyroscope integrated circuit (IC), an accelerometer IC, etc.

The motion information generated by the motion sensor 224 may be used to determine if the audience member 106 is wearing or carrying the PPM 104. In addition, the motion information may be used to determine if the audience member 106 is actively consuming (e.g., paying attention to) a media presentation. For example, if the motion information indicates that no movement is generated by the audience member 106, an analysis of such motion information may indicate that the audience member 106 was sleeping and, thus, not actively consuming a media presentation. Alternatively, if the motion information indicates that the audience member 106 is generating an extraordinary amount of information, an analysis of such motion information may indicate that the audience member is either participating with the media presentation or is moving around too much to adequately consume the media presentation. In either case, analyses of the motion information may be used to prompt the audience member 106 via one of the output devices 212 to confirm if the audience member 106 is actively consuming the media presentation.

The SPS receiver (SPSR) 226 may be implemented using, for example, a global position system (GPS) receiver and may be configured to generate location information based on encoded GPS signals received from GPS satellites. In general, the SPS receiver 226 may be used by the PPM 104 to collect location information in outdoor environments.

The RF location interface 228 may be implemented using a receiver or a transceiver and may be used to receive location-related signals or information from location information systems such as, for example, the RF transceiver tower 108 and/or the base units 114. The RF location interface 228 may also be configured to broadcast location-related information such as, for example, time-stamped PPM identification codes. The time-stamped PPM identification codes may be received by, for example, three or more of the base units 114, which may process the codes cooperatively using triangulation techniques to determine the location of the PPM 104. The base units 114 may communicate to the home processing system 120 the received time-stamped PPM identification codes along with information relating to the time at which the codes were received by each of the base units 114. The home processing system 120 may then determine the location of the PPM 104 based on this information.

The RF location interface 228 may be implemented using any suitable RF communication device such as, for example, a cellular communication transceiver, a Bluetooth transceiver, an 802.11 transceiver, an ultrawideband RF transceiver, etc. In addition, the RF location interface 228 may be implemented using only an RF receiver or only an RF transmitter. Examples of known location-based technologies that may be implemented in cooperation with the RF location interface 228 include the Ekahau Positioning Engine™ by Ekahau, Inc. of Saratoga, Calif., United States of America, an ultrawideband positioning system by Ubisense, Ltd. of Cambridge, United Kingdom or any of the ultrawideband positioning systems designed and/or patented by Multispectral Solutions, Inc. of Germantown, Md., United States of America. Ultrawideband positioning systems, depending on the design, offer advantages including longer battery life due to lower power consumption, greater precision and such systems tend to use less of the available signal spectrum.

The Ekahau Positioning Engine™ may be configured to work with a plurality of standard wireless communication protocol base stations (e.g., 802.11, Bluetooth, etc.) to broadcast location-related information. By implementing the RF location interface 228 using a suitable wireless communication protocol device and communicatively coupling the base units 114 to the RF location interface 228 using the same communication protocol, the Ekahau Positioning Engine™ may be used to generate location information. In particular, location-related information may be transmitted from the base units 114, received by the RF location interface 228, and used to generate location information using Ekahau Positioning software offered by Ekahau, Inc.

The Ubisense ultrawideband system may be used by communicatively coupling an ultrawideband transmitter to each of the base units 114 (FIG. 1A) and implementing the RF location interface 228 using an ultrawideband receiver. In this manner, the RF location interface 228 can receive ultrawideband location-related information that is broadcast from the base units 114 so that the PPM 104 can generate location information based on the received ultrawideband signals.

The compass 230 may be implemented using a magnetic field sensor, an electronic compass IC, and/or any other suitable electronic circuit. In general, the compass 230 may be used to generate direction information, which may be useful in determining the direction in which an audience member (e.g., the audience member 106) is facing. The direction information may be used to determine if a person is facing a television to enable consumption of a television program. The direction information may also be used to determine if a person is facing, for example, a billboard advertisement so that when the PPM 104 receives an RF identification signal corresponding to the billboard advertisement and location information indicating that the audience member 106 is in front of the billboard, the direction information from the compass 230 may be used to determine if the audience member 106 is facing the billboard. In this manner, the billboard content may be credited appropriately as having been consumed by the audience member 106.

An example positioning technology that may be used in combination with the compass 230, the motion sensor 224, and the SPS receiver 226 is the Dead-Reckoning Module (DRM®) produced and sold by Point Research Corporation of Santa Ana, Calif. The DRM® is configured to enable generation and/or collection of location information within buildings (e.g., the household 102) and in outdoor environments. In general, when used outdoors, the DRM® uses GPS technology to collect location information. When used indoors, the DRM® uses, among other components, a compass (e.g., the compass 230) and an accelerometer (e.g., the motion sensor 224) to generate location information.

The plurality of output devices 212 may be used to capture the attention of or alert audience members (e.g., the audience member 106 of FIG. 1A) to, for example, provide information to audience members and/or request input. The plurality of output devices 212 includes a speaker 212a, a vibrator 212b, and a visual alert 212c.

The speaker 212a may also be used to communicate with the base units 114. In particular, as described in greater detail below in connection with FIG. 13A, the speaker 212a may be used to inform the base units 114 that the PPM 104 is within proximity of the base units 114. The speaker 212a may be implemented using any type of acoustic emitter. For example, the speaker 212a may be implemented using a speaker capable of emitting audio in the human audible range. Alternatively or additionally, the speaker 212a may be implemented using a speaker or transducer capable of emitting ultrasound audio for use with ultrasound location detection systems. Although one speaker is shown in FIG. 2, the PPM 104 may include any number of speakers, each of which may be configured to suit a particular function (e.g., a speaker to emit acoustic frequencies in the human audible range and a speaker or transducer to emit ultrasound frequencies). Base units 114 that are in rooms without media delivery devices (e.g., the media delivery centers 112) may broadcast blank media codes or interference codes when the base units 114 detect that the PPM 104 is within the room associated with the base units 114. In this manner, the base units 114 may prevent or substantially eliminate the effects of spillover of media codes from media delivery devices in other rooms.

The PPM 104 may also include the input interface 214, which may be used by an operator (e.g., the audience member 106) to input information to the PPM 104. For example, the input interface 214 may include one or more buttons or a touchscreen that may be used to enter information, set operational modes, turn the PPM 104 on and off, etc. In addition, the input interface 214 may be used to enter PPM settings information, audience member identification information, etc.

The PPM 104 may further include the visual interface 216, which may be used in combination with the input interface 214 to enter and retrieve information from the PPM 104. For example, the visual interface 216 may be implemented using a liquid crystal display (LCD) that, for example, displays detailed status information, location information, configuration information, calibration information, etc. In some cases, the visual interface 216 may include light-emitting diodes (LEDs) that convey information including, for example, status information, operational mode information, etc.

Figure 3:
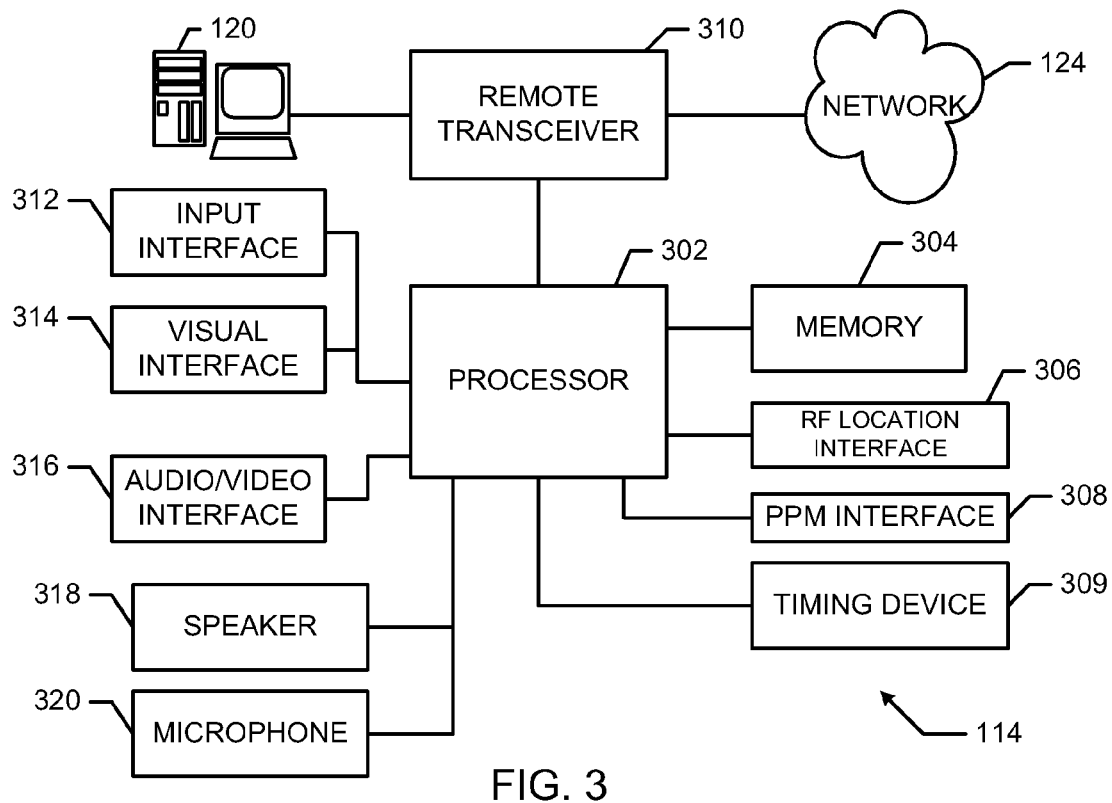
FIG. 3 is a block diagram of one of the example base units of FIG. 1A.

FIG. 3 is a block diagram of one of the example base units 114 of FIG. 1A. As described above, the example base units 114 may be used to communicate information to the PPM 104, the home computer 120, and/or the central facility 122 of FIG. 1A. As shown in FIG. 3, the example base unit 114 includes a processor 302, a memory 304, an RF location interface 306, a PPM interface 308, a timing device 309, a remote transceiver 310, an input interface 312, a visual interface 314, an audio/video interface 316, a speaker 318, and a microphone 320, all of which may be communicatively coupled as shown.

The processor 302 may be used to control and perform various operations or features of the base unit 114 and may be implemented using any suitable processor, including any general purpose processor, digital signal processor, or any combination thereof. For example, the processor 302 may be configured to receive location information, motion information, and/or media monitoring information from the PPM 104. As described above, information collected by the PPM 104 may be stored in the memory 204 (FIG. 2). Alternatively, the collected information may be stored in the memory 304 and communicated to the home processing system 120 and/or the central facility 122.

The processor 302 may also be configured to control communication processes that occur between the base unit 114 and other processing systems (e.g., the PPM 104, the home processing system 120, and the server 126). For example, the processor 302 may provide location-related information to PPMs via the RF location interface 306. In addition, the processor 302 may control the reception of media monitoring information, location information, motion information, etc. from the PPM 104 via the PPM interface 308 and store the information in the memory 304. The processor 302 may then cause the remote transceiver 310 to communicate the monitoring data to, for example, the home processing system 120 (FIG. 1A) and/or the central facility 122 (FIG. 1A) via the remote transceiver 310.

The memory 304 is substantially similar or identical to the memory 204 (FIG. 2) and may be used to store program instructions (e.g., software, firmware, etc.), data (e.g., location information, motion information, media monitoring information, etc.), and/or any other data or information associated with the base unit 114.

The RF location interface 306 may be implemented using a transmitter, a receiver, or a transceiver and configured to transmit and/or receive location-related information. In addition, the RF location interface 306 may be configured to communicate with the RF location interface 228 (FIG. 2) of the PPM 104. For example, the RF location interface 306 may transmit encoded location-related codes to the PPM 104, which may receive encoded location-related codes from several of the base units 114 to determine location coordinates indicative of the location of the PPM 104. Additionally or alternatively, the RF location interface 306 may receive encoded location-related codes from the PPM 104 and, as described above, may work in cooperation with other base units and/or the home processing system 120 to determine the location of the PPM 104.

The RF location interface 306 may be implemented using any suitable RF communication device such as, for example, a cellular communication transceiver, a Bluetooth transceiver, an 802.11 transceiver, an ultrawideband RF transceiver, etc. In addition, the RF location interface 306 may be used in combination with any of the known location-based technologies described above (e.g., the Ekahau Positioning Engine™ by Ekahau, Inc. and/or the ultra-wideband positioning system by Ubisense, Ltd.). Thus, the RF location interface 306 may be configured to receive and/or transmit any form of location-related information including location coordinates and any other information associated with known location-based technologies.

The PPM interface 308 is substantially similar or identical to the communication interface 206 of FIG. 2 and may be configured to communicate information between the base unit 114 and one or more PPMs (e.g., the PPM 104 of FIGS. 1A, 1B, and 2). The PPM interface 308 may be any wired or wireless transceiver such as, for example, a Bluetooth transceiver, an 802.11 transceiver, an Ethernet transceiver, a UART, a cellular communication transceiver, etc.

The base unit 114 may also include the input interface 312 and the visual interface 314, which may be substantially similar or identical to the input interface 214 and the visual interface 216, respectively, of FIG. 2.

The timing device 309 may be substantially similar or identical to the timing device 205 described above in connection with FIG. 2. For example, the timing device 309 may include one or more of a clock (e.g., a real-time clock), a timer, and a counter. In addition, although shown as separate from the processor 302, the timing device 309 may be integrated with the processor 302. The timing device 309 may be used by the base unit 114 to generate timestamps and perform any time/timing-based operations. Further, the timing device 309 may be synchronized with the timing device 205 of the PPM 104. In this manner, the base unit 114 and the PPM 104 may perform synchronized operations or perform operations that require the base unit 114 and the PPM 104 to have synchronized clocks.

The remote transceiver 310 may be used to communicate information between the base unit 114 and, for example, the home processing system 120 (FIG. 1A) and/or the central facility 122 (FIG. 1A). The remote transceiver 310 may be communicatively coupled to the network 124 and may be implemented using any suitable wired or wireless communication transceiver including, for example, a telephone modem, a DSL modem, a cable modem, a cellular communication circuit, an Ethernet communication circuit, an 802.11 communication circuit, etc. The remote transceiver 310 may be used to communicate media monitoring information (e.g., audio samples), location information, and/or motion information to the home processing system 120 and/or the central facility 122 via the network 124.

The audio/video interface 316 may be used to obtain audio and/or video information from media delivery centers (e.g., the media delivery centers 112 of FIG. 1A). The audio/video interface 316 may be implemented using any wired or wireless technology that enables the base unit 114 to receive media information associated with media presentations presented by the media delivery centers 112. For example, the audio/video interface 316 may be implemented using an RF audio/video receiver (e.g., a 2.4 GHZ wireless audio/video receiver), a composite interface, an audio RCA interface, an optical interface, etc. The audio/video interface 316 may be configured to communicate the received audio and/or video to the processor 302, which may execute a media code extraction algorithm to extract and log audio and/or video codes from the received media. The processor 302 may alternatively or additionally execute a signature generation algorithm to generate and store signatures based on the received media.

The speaker 318 may be used to communicate information to the PPM 104. In particular, the speaker 318 may be used to communicate media codes such as, for example, blank media codes or interference codes as described in greater detail below in connection with the example method of FIG. 13A. Interference codes may be broadcast by base units 114 that are located in rooms or spaces having no media delivery centers to prevent the PPM 104 from detecting media codes from the media delivery centers 112 (FIG. 1A) that spill over from other rooms.

The microphone 320 may be used to receive audio information associated with media presented by the media delivery centers 112 (FIG. 1A) and/or PPM codes emitted by the PPM 104. Audio emitted by the media delivery centers 112 may be received by the base unit 114 via the microphone 320 and processed by the processor 302 to extract and log audio codes associated with audience member media consumption. Alternatively or additionally, the base unit 114 may receive PPM codes emitted by the PPM 104 to determine if the PPM 104 is within the same room or space as the base unit 114. For example, the microphone 320 may be implemented using an ultrasound microphone that is configured to detect ultrasonic signals emitted by the PPM 104 to determine the location of the PPM 104. Although one microphone is shown in FIG. 3, the base unit 114 may have any number of microphones, each of which may be configured to be used for a particular function. For example, the base unit 114 may include a first microphone for detecting audio emitted by the media delivery centers 112 and a second microphone for detecting ultrasound signals emitted by the PPM 104.

Figure 5:
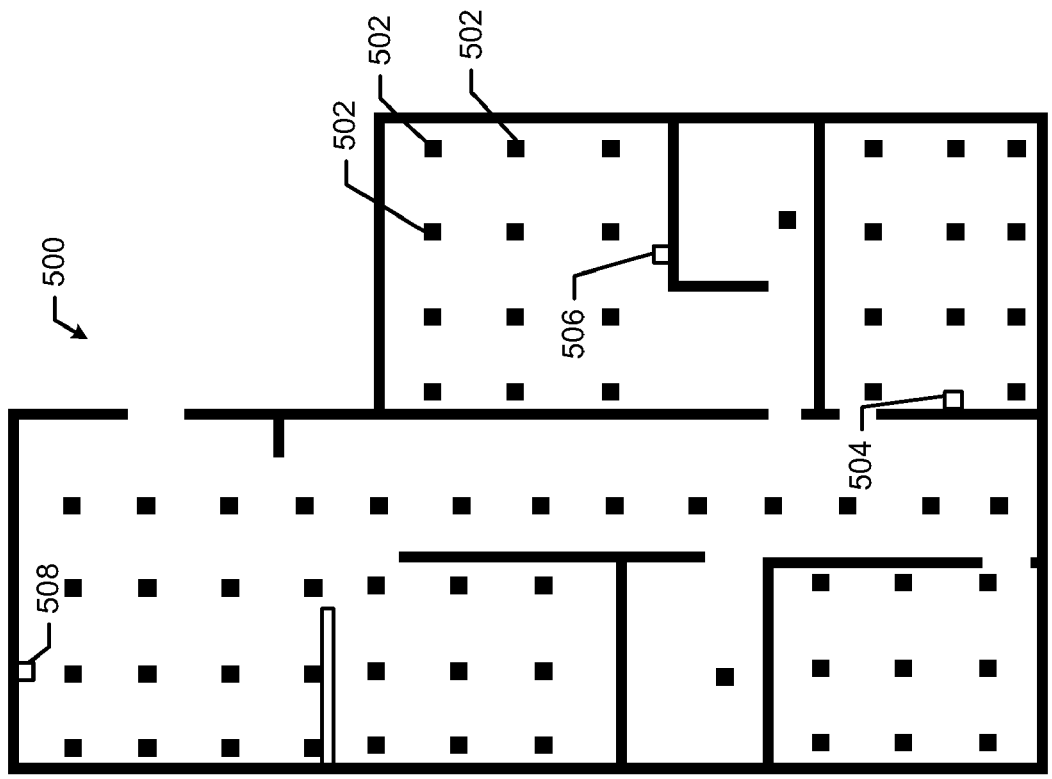
FIGS. 4 and 5 depict example placement square grids overlaid onto example plan views of two different representative households in which the methods, apparatus and articles of manufacture described herein may be implemented.
Figure 4:
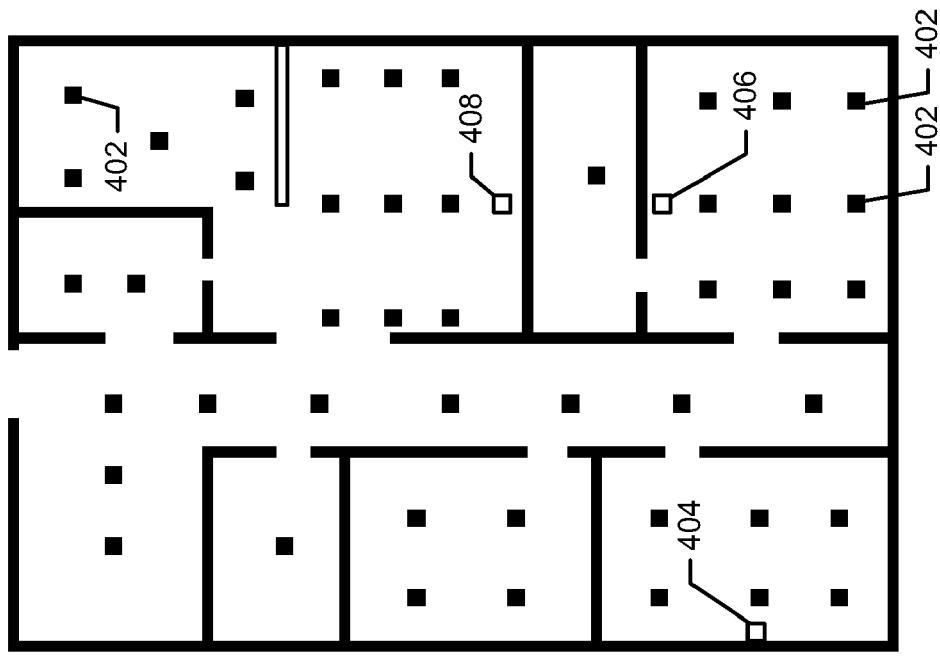

FIGS. 4 and 5 depict example placement square grids overlaid onto example plan views of two different representative households 400 and 500 in which the methods, apparatus and articles of manufacture described herein may be implemented. As depicted in FIGS. 4 and 5, a plurality of grid markers which correspond to known locations within the households 400 and 500 (some of which are indicated by the reference numerals 402 and 502), are positioned in a predetermined pattern or layout. The grid markers 402 and 502 may be used in combination with location detection technologies (e.g., the RF tower 108, the satellite 110, and the base units 114) to determine the positions of PPMs (e.g., the PPM 104) as the PPMs move throughout the households 402 and 502. The grid markers 402 and 502 may be used to generate the movement paths 116a-116c described above in connection with FIG. 1A.

Each of the grid markers 402 and 502 corresponds to a set of coordinates (e.g., geographic coordinates or any other set of information uniquely representing a physical location) that, in turn, are mapped to known locations within the households 400 and 500. For example, the coordinates of each of the grid markers 402 and 502 may correspond to a particular room, hallway, or other space or area within the households 400 and 500. The grid markers 402 and 502 may be embodied in a database in the form of a table, a linked list, or any other suitable data structure accessible by, for example, a processor system within the base units 114 (FIG. 1A), the PPM 104 (FIG. 1A), the central facility 122 (FIG. 1A), etc. In this manner, location data collected by, for example, the PPM 104 can be mapped, matched, or otherwise translated or correlated to particular rooms or other spaces within the households 400 and 500, thereby enabling collected media codes and/or signatures to be associated with particular spaces within which those codes and/or signatures were collected.

Information uniquely associated with each of the grid markers 402 and 502 may be collected using any desired method. For example, one or more PPMs may be configured to detect signals emitted by the one or more access points disposed in the home. Such a process may involve having a technician carry a PPM, move to each of the grid marker positions, and measure/record the signals detected at each grid location and emitted by each of the access points. The sets of location information may then be stored in tables or other suitable data structures to enable mapping, translation, etc. of subsequently collected location data to known positions within the household.

Media delivery centers 404, 406, 408, 504, 506 and 508 may also be located in one or more of the areas (e.g., rooms, hallways, etc.) of the households 400 and 500. Each of the media delivery centers 404, 406, 408, 504, 506 and 508 may be substantially similar or identical to the media delivery centers 112 described above in connection with FIG. 1A. While the PPM 104 is collecting media monitoring information, the media delivery centers 404, 406, 408 and 504, 506, 508 may be used to present or playback media content.

Figure 7:
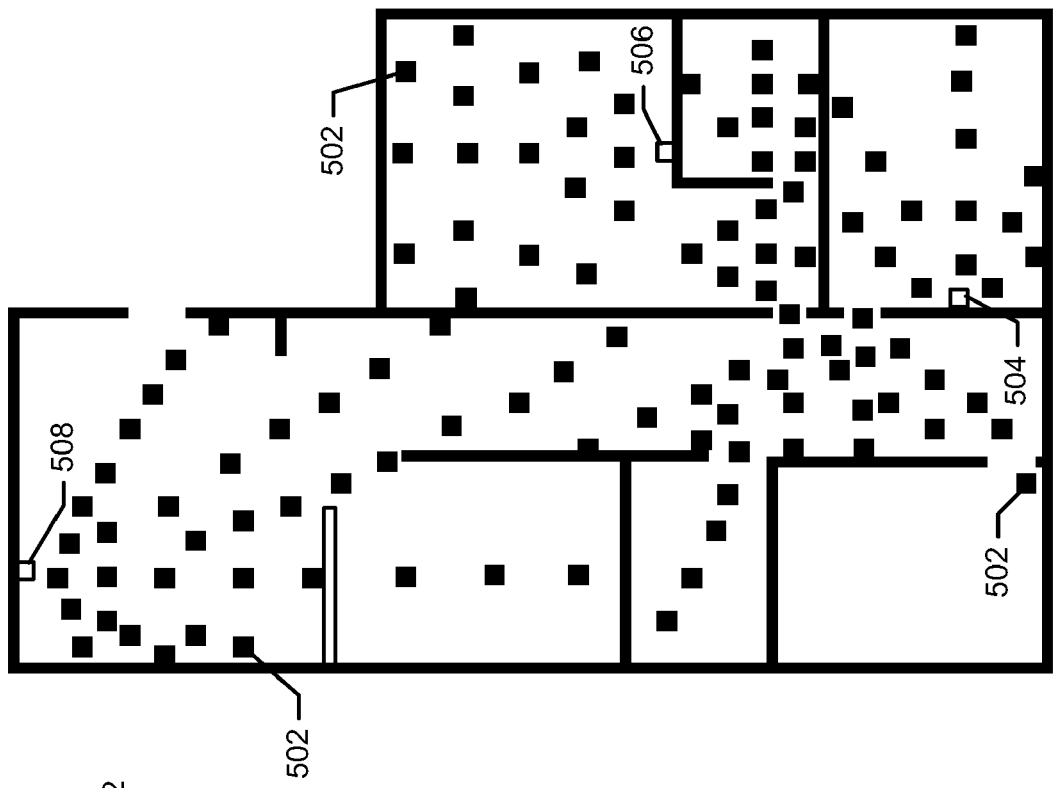
FIGS. 6 and 7 depict example placement radial grids overlaid onto the households of FIGS. 3 and 4.
Figure 6:
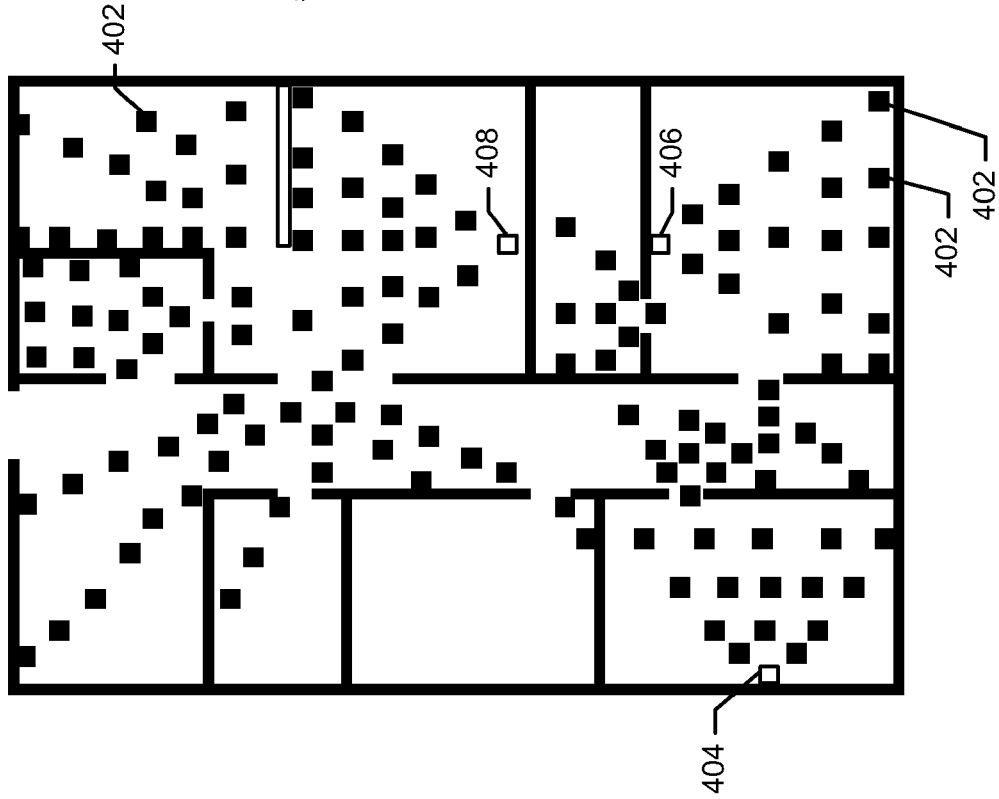

While the grid markers 302 and 402 depicted in FIGS. 3 and 4 form a square grid arrangement (e.g., the grid markers 302 and 402 are located at substantially regular intervals or distances from each other), other grid marker arrangements may be used instead. For example, the grid marker layouts shown in FIGS. 6 and 7 are radial grid arrangements in which the grid markers 302 and 402 are located along radial lines extending within the various spaces (e.g., rooms, hallways, etc.) from the media delivery centers 404, 406, 408 and 504, 506, 508.

Figure 9:
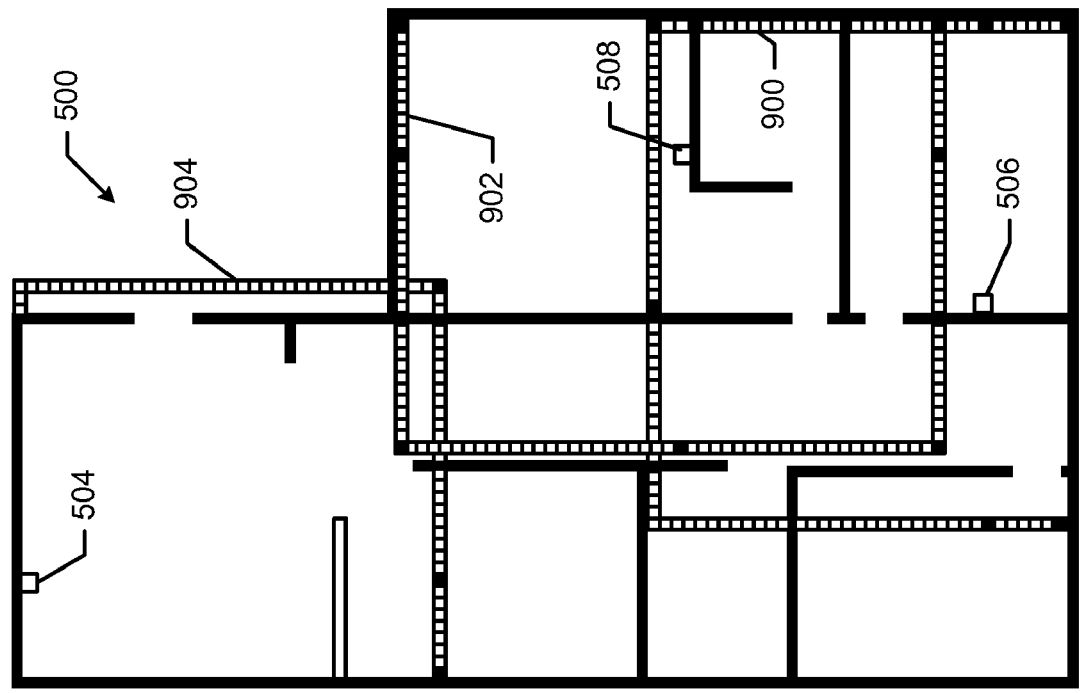
FIGS. 8 and 9 depict media center-centric layouts in which bounded areas are used to illustrate the areas in which media content presented by each media delivery center may be detected by a PPM.
Figure 8:
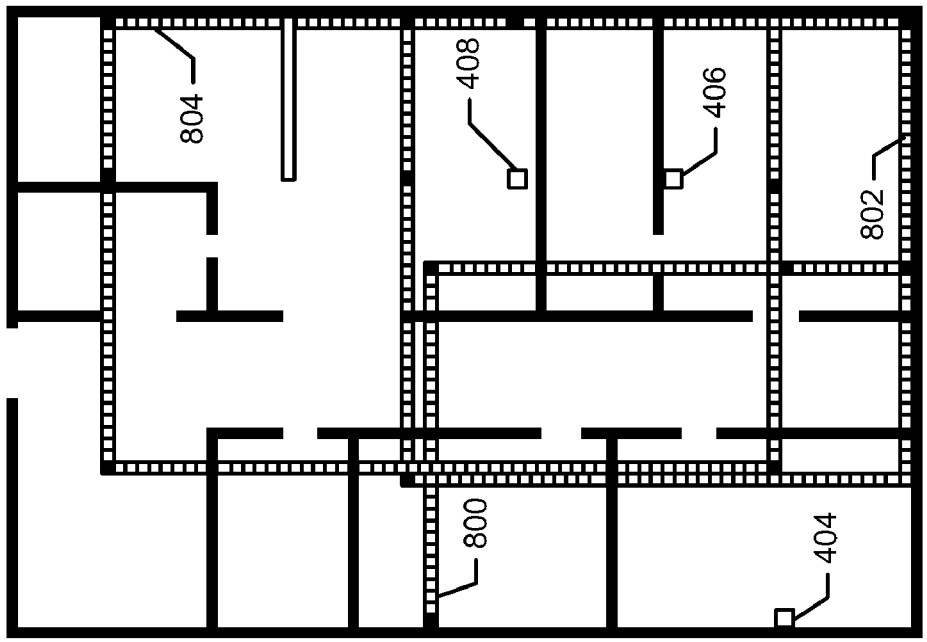

Still further FIGS. 8 and 9 depict a media center-centric PPM layout in which bounded areas 800, 802, 804, 900, 902 and 904 surrounding the respective media delivery centers 404, 406, 408, 504, 506 and 508 are used to define the areas in which media content from each media delivery center may be detected by a PPM, regardless of interior walls and other structures within the households 400 and 500. The bounded areas 800, 802, 804, 900, 902 and 904 may be used to determine locations within the square grid arrangements of FIGS. 4 and 5 and/or the radial grid arrangements of FIGS. 6 and 7 at which PPMs (e.g., the grid markers 402 and 502 of FIGS. 4 and 5, respectively) may be placed during a characterization or mapping process.

Audio associated with media content may often radiate, extend, or otherwise propagate through walls and doors within a building or structure. As shown in FIGS. 8 and 9, the bounded areas 800, 802, 804, 900, 902 and 904 cover portions of two or more rooms or spaces within the respective households 400 and 500. Data or media monitoring information collected by PPMs located within an overlapping region of two of the bounded areas 800, 802, 804, 900, 902 and 904 may correspond to media content presented by the media delivery centers corresponding to those two bounded areas. For example, a PPM located within an overlapping region of the bounded areas 800 and 802 (FIG. 8) may collect audio data or media monitoring information associated with the media delivery centers 404 and/or 406.

In addition, the bounded areas 800, 802, 804, 900, 902 and 904 may be used to determine areas within the households 400 and 500 that are prone to spillover effects. For example, spillover effects may be characterized by placing a PPM in a hallway area of the household 400 within the bounded area 804 (FIG. 8), presenting media content via the media delivery center 408, collecting media monitoring information via the PPM, and analyzing the media monitoring information for audio data corresponding to the media content presented by the media deliver center 408.

Figure 10:
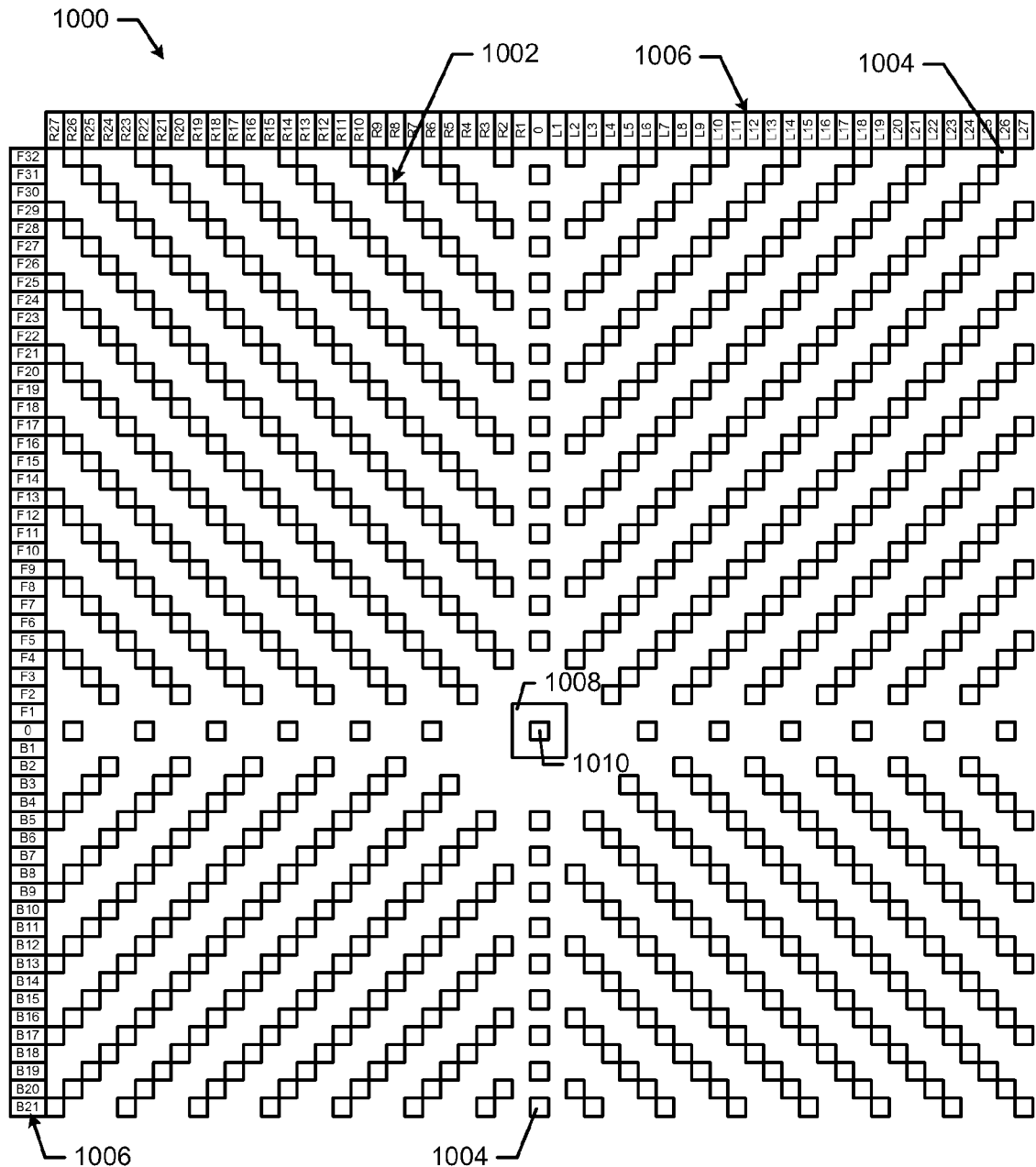
FIG. 10 depicts a detailed view of an example bounded area that may be used to implement the bounded areas of FIGS. 8 and 9.

FIG. 10 depicts a detailed view of an example bounded area 1000 that may be used to implement the bounded areas 800, 802, 804, 900, 902 and 904 of FIGS. 8 and 9. The example bounded area 1000 of FIG. 10 includes an example grid arrangement 1002 that may be used to implement the square and radial grid areas of FIGS. 4-7 and to define a plurality of grid markers 1004. The grid markers 1004 may be substantially similar or identical to the markers 402 and 502 of FIGS. 4-7. The example bounded area 1000 also includes a plurality of coordinate identifiers 1006 that may be used to identify locations within the example grid arrangement 1002 at which the grid markers 1004 are located.

As shown by the example grid arrangement 1002 of FIG. 10, the grid markers 1004 may be distributed in any grid-like arrangement surrounding a media delivery center 1008, which may include, for example, a television 1010. More or fewer grid markers 1004 arranged in any desired pattern may be used instead of the particular number and arrangement of position markers shown in FIG. 10.

The plurality of coordinate identifiers 1006 may be used to tag the media monitoring information or data collected by the PMM 104 with location information identifying the grid markers 1004 at or near the location at which the PMM 104 is located. One advantage of a media center-centric layout approach is that the information provided by using such a layout (as represented by example in FIG. 10) may be used as a template for visually displaying aggregate test results derived from a plurality of test households.

FIGS. 11A through 14E are example methods that may be used to manage signal (e.g., audio code) spillover in an audience monitoring system. The example methods may be implemented in software, hardware, and/or any combination thereof. For example, the example methods may be implemented in software that is executed on the PPM 104 of FIGS. 1A and 2, the base units 114 of FIGS. 1A and 3, and/or the central facility 122 of FIG. 1A. Although, the example methods are described below as a particular sequence of operations, one or more operations may be rearranged, added, and/or removed to achieve the same or similar results as those described herein.

Figures 11A, 11B:
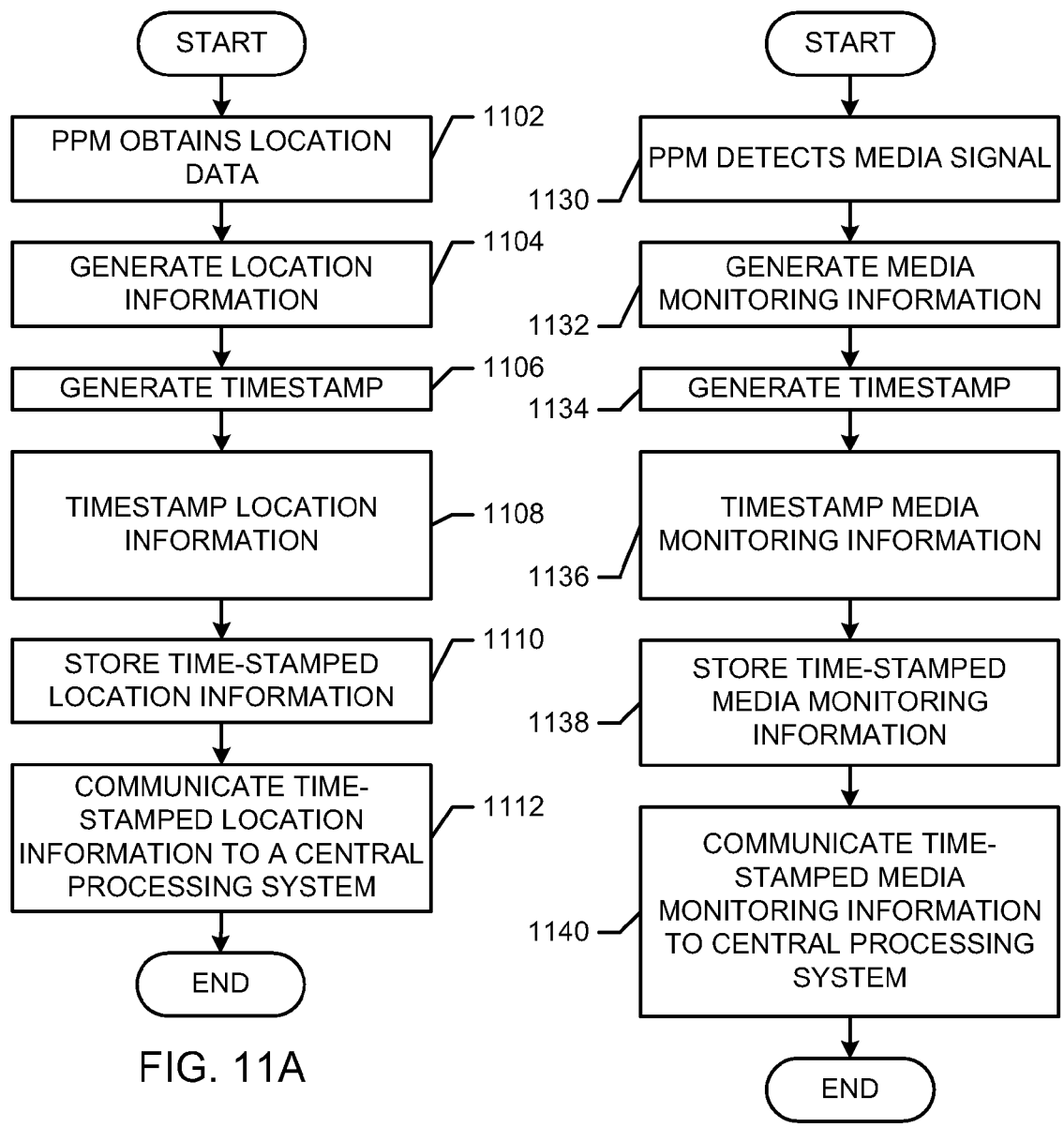
FIG. 11A is a flow diagram of an example method that may be used to collect time-stamped location information associated with the location of a PPM.
FIG. 11B is a flow diagram of an example method that may be used to collect time-stamped media monitoring information associated with media detected by the PPM.
Figure 11C:
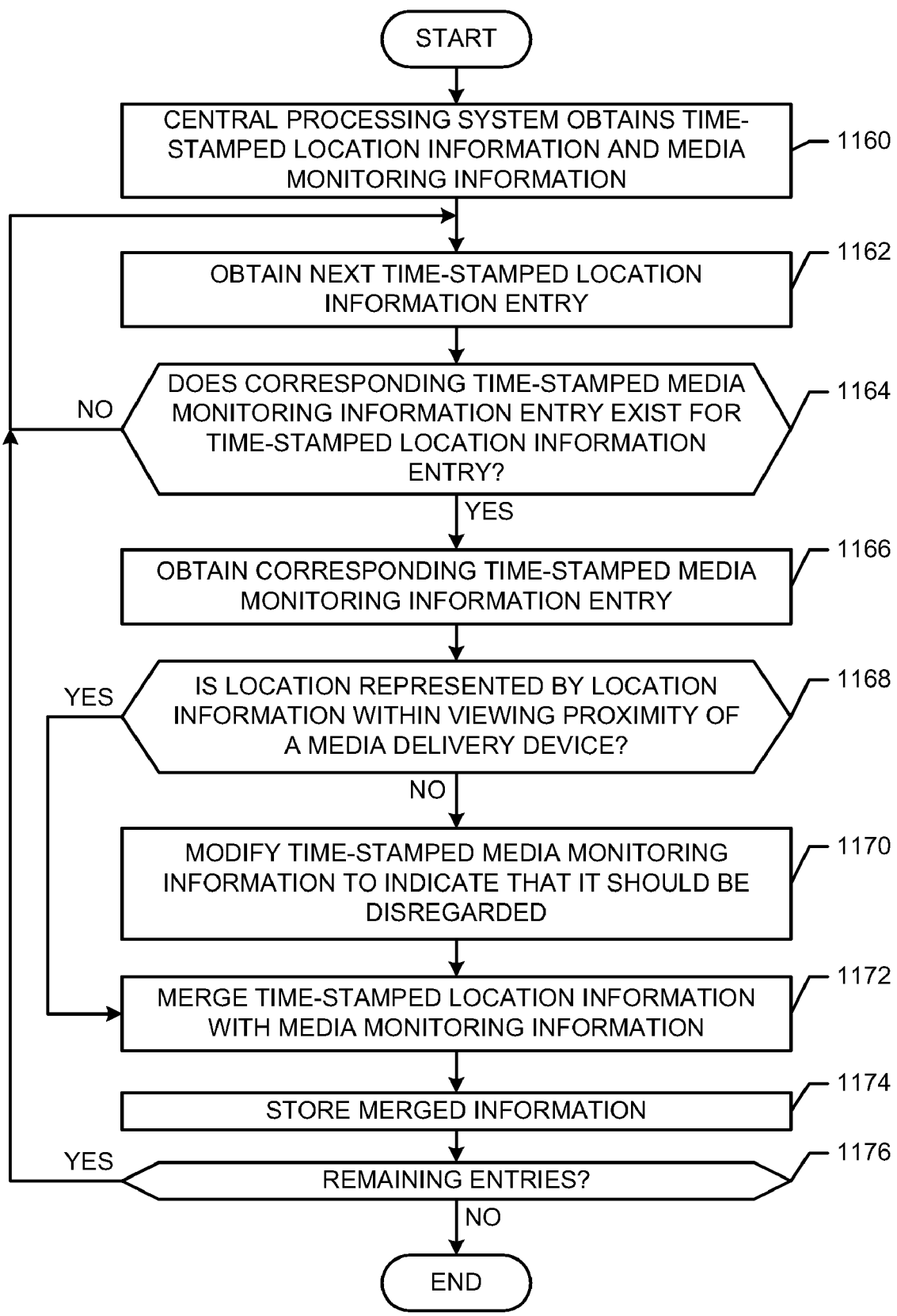
FIG. 11C is a flow diagram of an example method that may be used to analyze the time-stamped location information and the time-stamped media monitoring information collected in connection with the example methods of FIGS. 11A and 11B.

FIGS. 11A-11C are flow diagrams of example methods that may be used to collect time-stamped location information (FIG. 11A) and time-stamped media monitoring information (FIG. 11B) using a PPM (e.g., the PPM 104 of FIGS. 1A and 2), and combine corresponding time-stamped location information and time-stamped media monitoring information (FIG. 11C). More specifically, the example methods of FIGS. 11A and 11B may be performed by a PPM (e.g., the PPM 104 of FIGS. 1A and 2) and the example method of FIG. 11C may be performed by a central processing system (e.g., the home processing system 120 and/or the server 126 of FIG. 1A). Each of the example methods of FIGS. 11A and 11B may be performed by the PPM 104 completely independently of the other or one or more of the blocks that are common to both methods may be performed by the PPM 104 a single time for the benefit of both methods. For example, the PPM 104 may be configured to generate a single set of time stamps that are used in both the method of FIG. 11A and the method of FIG. 11B instead of requiring the generation of two separate sets of time stamps. Alternatively, if media monitoring data is collected (using the method of FIG. 11B) at a frequency that is different from the frequency used to collect location information (via the method of FIG. 11A), then timestamps may be generated at the higher of these two frequencies and have a one to one correspondence with the data collection that occurs at this higher frequency, whereas only a subset of these timestamps need be associated with the data collection that occurs at the lower of the two frequencies. In this, or any other manner, one or more of the blocks associated with the method of FIG. 11A may be synchronized with the performance of one or more of the blocks of FIG. 11B.

Turning in detail to the example method of FIG. 11A, the PPM 104 (FIG. 1A) obtains location data (block 1102). The PPM 104 may obtain the location data from any location information system such as, for example, the RF transceiver tower 108 (FIG. 1A), the satellite 110 (FIG. 1A), and/or the base units 114 (FIG. 1A). Additionally or alternatively, the location data may be received from the motion sensor 224 (FIG. 2) and/or the compass 230 (FIG. 2) for use with, for example, the DRM® described above in connection with FIG. 2 to generate location information.

The PPM 104 then generates location information (block 1104) based on the location data received in connection with block 1102. For example, the location information may be generated using triangulation algorithms, location data decoding algorithms, interpolation algorithms, and/or any other suitable algorithm for generating location information based on the received location data. By way of further example, if a system similar to the Ekahau system is employed, the location data may be obtained by measuring the strengths associated with five different signals, each received from one of five Ekahau signal emitters disposed in the household. The strengths of the five signals can then be used to identify the location of the PPM 104 on the household grid (e.g., grids described in connection with FIGS. 1B, 4, 5, 6, 7, and 10). Specifically, upon generation of the household grid, a set of signal strength readings are taken at each of the marker locations on the grid and each set of signal strengths is unique to the location of the marker location at which the reading was taken. As a result, each unique set of signal strengths either corresponds directly to a marker location, or interpolation can be used to identify a location positioned between one or more grid markers when a set of signal strengths are collected that do not correspond exactly to the signal strength data associated with one of the grid markers.

After generating the location information, the PPM 104 generates a timestamp (block 1106) associated with the time at which the PPM 104 obtained the location data in connection with block 1102 and timestamps the location information (block 1108). The time-stamped location information is then stored (block 1110) in, for example, the memory 204 (FIG. 2).

The PPM 104 then communicates the stored time-stamped location information to a central processing system (e.g., the home processing system 120 or the server 126 of FIG. 1A) (block 1112). For example, the PPM 104 may be configured to communicate the stored time-stamped location information at designated times (e.g., a periodic interval) and/or when a certain number of time-stamped location information entries have been stored. In an alternative configuration, the PPM 104 may be designed to obtain and time stamp location data which may then be transmitted to a central processing system that may be tasked with generating location information corresponding to each of the sets of location data collected by the PPM 104.

FIG. 11B is a flow diagram of an example method that may be used to collect time-stamped media monitoring information associated with media consumed by audience members (e.g., the audience member 106 of FIG. 1A). The example method of FIG. 11B may be implemented using the PPM 104 (FIGS. 1A, 1B, and 2) and/or one or more of the base units 114 (FIGS. 1A and 3). The example method of FIG. 11B may be executed by the PPM 104 which is configured to detect the presence of a media signal (block 1130) emitted by any of the media delivery centers installed in the household (e.g., one of the media delivery centers 112 of FIG. 1A). Of course, if the example method of FIG. 11B is performed by one or more of the base units 114, one of the base units 114 may be configured to detect a media signal at block 1130. Depending on the capabilities of the PPM 104, the media signal detected may be in an audio, a video, or a RF form and may be detected using a decoding technique or a signature generation technique or any other known technique.

The PPM 104 uses the detected media signal to generate media monitoring information (block 1132). For example, the PPM 104 may identify and extract audio codes from the audio portion of a media presentation. Alternatively or additionally, the PPM 104 may generate signatures based on the received audio and/or video signals.

The PPM 104 may generate a timestamp (block 1134) that indicates the time at which the PPM 104 received the audio and/or video signal, associate the media monitoring information with the time stamp (block 1136) and then store the time-stamped media monitoring information (block 1138) in, for example, the memory 204 (FIG. 2).

The PPM 104 may then communicate the stored time-stamped media monitoring information to a central processing system (e.g., the home processing system 120 and/or the server 126 of FIG. 1A) (block 1140). For example, the PPM 104 may be configured to communicate the stored time-stamped media monitoring information at designated times or when a certain number of time-stamped media monitoring entries have been stored. In an alternative configuration, the PPM 104 may be configured to obtain and time stamp media signals (or portions of media signals) which may then be transmitted to the central processing system 122 and/or the server 126 that may be tasked with generating media monitoring information corresponding to each of the collected media signals.

FIG. 11C is a flow diagram of an example method that may be used to analyze the time-stamped location information and the time-stamped media monitoring information collected in connection with the example methods of FIGS. 11A and 11B. The example method of FIG. 11C is described below as being performed by a central processing system (e.g., the home processing system 120 or the server 126 of FIG. 1A). However, the example method may alternatively be performed entirely or in part by the PPM 104 (FIGS. 1A and 2). Additionally or alternatively, the example method of FIG. 14C may be performed in a cooperative manner by a central processing system and the PPM 104.

Initially, a central processing system (e.g., the home processing system 120 or the server 126 of FIG. 1A) obtains the time-stamped location information and the time-stamped media monitoring information (block 1160) from the PPM 104. The information may be stored in a memory such as, for example, the mass storage memory 1725 of FIG. 17. Of course, if the example method of FIG. 14C is performed by the PPM 104, the PPM 104 may be configured to obtain the time-stamped location information and the time-stamped media monitoring information at block 1160 by, for example, retrieving the information from the memory 204 (FIG. 2).

During execution of an information merging routine, the central processing system obtains a next time-stamped location information (block 1162). During a first retrieval of location information, the operation of block 1162 retrieves the first time-stamped location information from a given group of location information entries. The system then determines if corresponding time-stamped media monitoring information exists for the time-stamped location information retrieved at block 1162 (block 1164). The system may determine if corresponding time-stamped media monitoring information exists for the time-stamped location information by extracting or identifying the timestamp from the time-stamped location information, comparing the timestamp with the timestamps of the time-stamped media monitoring information entries, and identifying a time-stamped media monitoring information entry if the timestamp of the time-stamped media monitoring information is within a predetermined time threshold of the timestamp corresponding to the time-stamped location information. Predetermined time thresholds may indicate, for example, that location information and media monitoring information correspond to one another if the location information is collected within, for example, one second of the time at which media monitoring information is collected.

If it is determined at block 1164 that a time-stamped media monitoring information entry does not exist for the time-stamped location information thereby indicating that the PPM 104 was not exposed to any media while positioned at the location represented by the location information, control is passed back to block 1162.

Otherwise, the corresponding time-stamped media monitoring information is obtained (block 1166) and it is determined whether the location represented by the location information is within viewing proximity of a media delivery device (block 1168), such as, for example, a television. The grid layouts described above in connection with FIGS. 1B, 4-7, and FIG. 10 may be used to determine if the location is within viewing proximity of a media delivery device by comparing the time-stamped location information with grid markers (e.g., the grid markers 156, 402, 502, and 1004) and determining if the grid marker corresponding to the time-stamped location information is within a space or area containing a media delivery device.

If the location represented by the location information is not within viewing proximity of a television, then the corresponding media monitoring information is likely associated with media that "spilled over" or emanated from an area in the household that is outside of the viewing proximity of the audience member 106 carrying the PPM 104. As a result, the media monitoring information is likely associated with media that was not viewed by the audience member 106 carrying the PPM 104 and is, therefore, modified to indicate that it should be disregarded (block 1170) (e.g., not credited with viewing). Then the modified media monitoring information is merged with the corresponding time-stamped location information (block 1172). After merging, the data is stored as an entry in, for example, the mass memory storage 1725 (FIG. 17) (block 1174). Alternatively, instead of modifying the media monitoring information deemed to be associated with spillover, the method may instead cause the media monitoring information to be discarded and/or removed from memory such that the merging and storing operations need not be performed. The decision about whether to keep or discard media monitoring information associated with spillover depends on whether spillover data is of interest to those performing the audience measurement process.

If, instead, it is determined at block 1168 that the location represented by the location information is within viewing proximity of a television, then the corresponding media monitoring information is deemed to be associated with media that was actually viewed by the audience member 106 carrying the PPM 104 and, therefore, is not modified (nor discarded) before being merged with the corresponding time stamped location information (block 1172) and stored in the memory 1725 (block 1174).

It is then determined whether there are any remaining entries to be processed (block 1176). If there are remaining entries to be processed, control is passed back to block 1162. Otherwise, the process is ended.

Figure 12A:
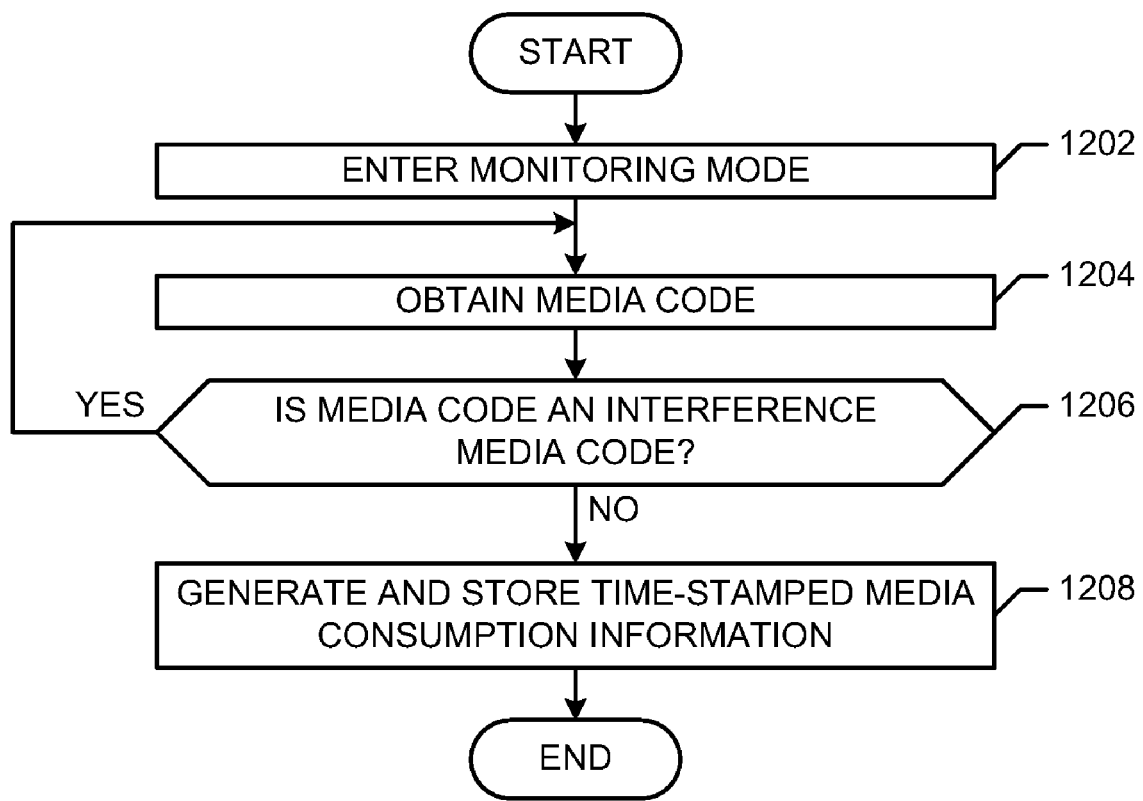
FIG. 12A is a flow diagram of an example method that may be used to determine when a PPM is in a room or space that does not include any media delivery centers.

FIG. 12A is a flow diagram of an example method that may be used to determine when a PPM (e.g., the PPM 104 of FIGS. 1A and 2) is in a room or space void of any media delivery centers (e.g., the media delivery centers 112 of FIG. 1A). The example method of FIG. 12A may be executed on the PPM 104 by, for example, the processor 202 described above in connection with FIG. 2 and may be configured to work in combination with the base units 114 (FIGS. 1A and 3). More specifically, the example method of FIG. 12A is configured to detect media codes and determine if the media codes are associated with media presented by one of the media delivery centers 112. As described in greater detail above, base units 114 located within rooms or spaces having no media delivery centers (e.g., the room 115a of FIG. 1A) may be configured to emit or broadcast interference media codes or blank media codes to prevent spillover of media codes broadcast by the media delivery centers 112 located in other rooms or spaces. For example, the interference media codes or blank media codes can be emitted at a particular frequency, a particular signal strength level, etc. that masks media codes broadcast by the media delivery centers 112 in other locations and that would otherwise produce spillover.

Initially, the PPM 104 enters a monitoring mode (block 1202) and detects a media code (block 1204). Next, the PPM 104 determines whether the media code is an interference media code (block 1206). If it is determined that the media code is an interference media code, the media code is discarded or disregarded and control is passed back to block 1204. If, instead, it is determined at block 1206 that the media code is not an interference media code, time-stamped media monitoring information is generated and stored (block 1208) in, for example, the memory 204 of FIG. 2. Alternatively, interference media codes identified as such at block 1206 may be stored with a corresponding time stamp and information indicating that the codes do not represent monitored media at block 1208.

Figure 12B:
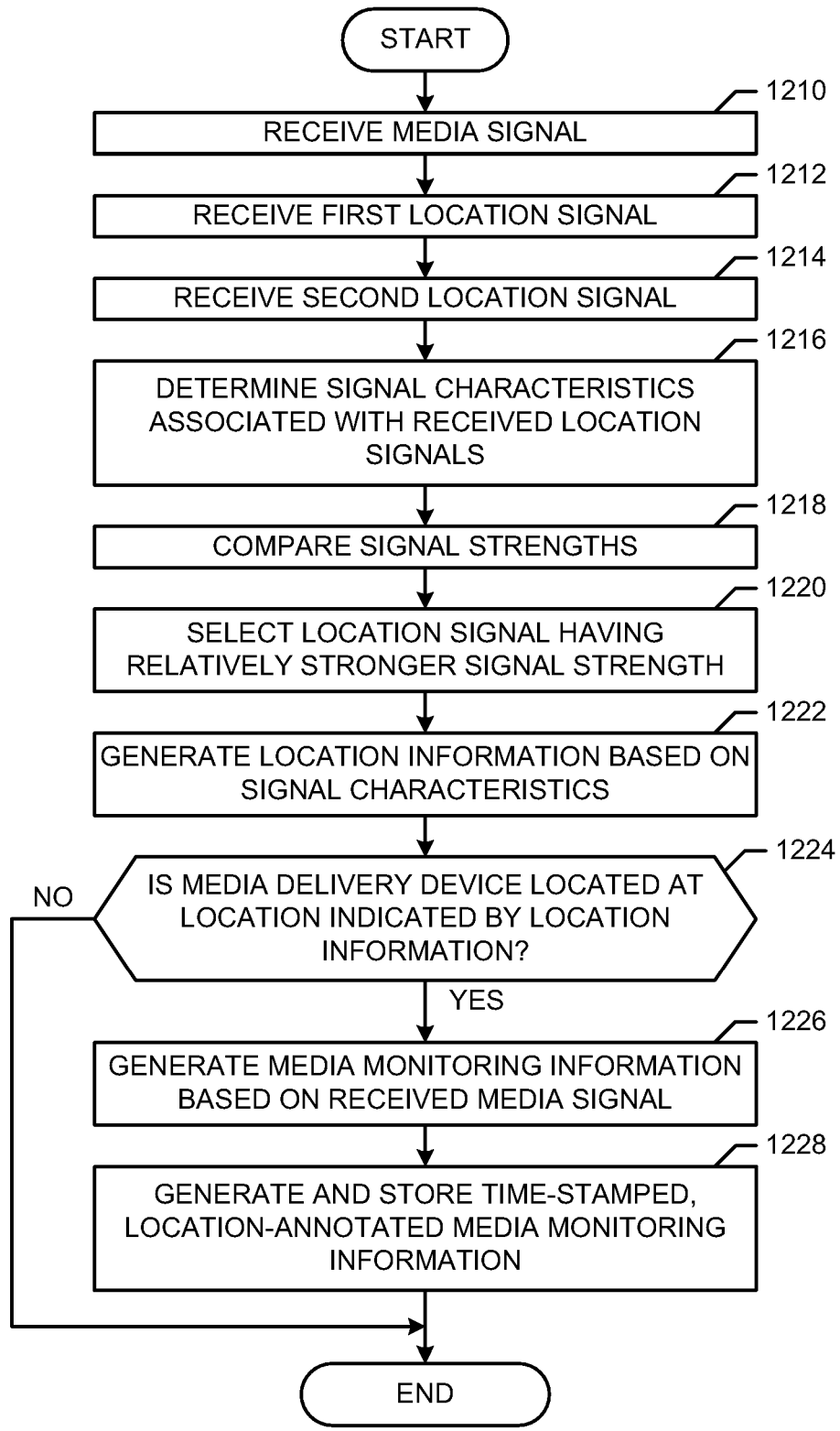
FIG. 12B is a flow diagram of an example method that may be used to generate media monitoring information based on the location of a PPM.

FIG. 12B is a flow diagram of an example method that may be used to generate media monitoring information based on the location of the PPM 104. The example method of FIG. 12B may be implemented using the room differentiators 118a and 118b described above in connection with FIG. 1A, which may emit or broadcast location signals, each having a respective signal characteristic indicative of the room within which each is located. For example, the signal characteristic may be a particular signal frequency or an ancillary location code that can be used to associate each of the location signals to its respective room or location. As the PPM 104 is moved between rooms or locations (e.g., the rooms 115a, 115b, and 115c), the PPM 104 may receive location signals emitted by the room differentiators 118a and 118b (one of which is a spillover location signal) and media signals (e.g., ancillary audio codes) associated with media presentations (some of which are spillover media signals). The PPM 104 may use the location signals to determine in which location or room the PPM 104 is located and may then generate media monitoring information based on the received media signals and the identified location.

Turning in detail to the flow diagram of FIG. 12B, initially the PPM 104 receives a media signal (block 1210). For example, the PPM 104 may detect a media signal associated with an audio portion of a media presentation emitted by one of the media delivery centers 112 (FIG. 1A). If the PPM 104 receives two or more media signals at block 1210, the PPM 104 may compare the signal strengths, amplitudes, or volumes of each of the media signals to one another and discard or disregard the spillover media signals having relatively less signal strength, amplitude, or volume. The PPM 104 may then digitize and store the media signal having the relatively greater signal strength, amplitude, or volume. The PPM 104 then receives a first location signal (block 1212) and a second location signal (block 1214). For example, the first location signal may be emitted by the room differentiator 118a and the second location signal may be emitted by the room differentiator 118b.

The PPM 104 then determines the signal characteristics associated with the location signals received at blocks 1212 and 1214 (block 1216). In particular, the PPM 104 determines a signal strength associated with each of the received location signals. The PPM 104 may also detect a particular frequency or ancillary location code associated with each of the location signals. The PPM 104 then compares the signal strengths of the location signals to one another (block 1218) and selects the location signal having the relatively stronger signal strength (block 1220) by, for example, discarding or disregarding the spillover location signal having relatively less signal strength. Tuning the room differentiators 118a and 118b to emit or broadcast location signals using relatively low power causes the location signals to be substantially attenuated by walls (e.g., the wall 119 of FIG. 1). Accordingly, location signals that do propagate through a wall (e.g., spillover location signals) will have substantially reduced power or signal strength. The PPM 104 may use the operations of blocks 1218 and 1220 and the attenuation effect to determine which of the received location signals is a spillover signal and which is associated with the room or location in which the PPM 104 is located and then discard or disregard the spillover location signal associated with the relatively lower signal strength.

The PPM 104 then generates location information based on the signal characteristics determined at block 1216 (block 1222) that are associated with the location signal having relatively stronger signal strength as determined at block 1218. For example, the PPM 104 may use the frequency or the ancillary location code determined at block 1216 to determine the location identification or room identification of the location or room within which the PPM 104 is located. In an example implementation, the PPM 104 may include a data structure (e.g., a look-up table) stored in memory (e.g., the memory 204 of FIG. 2) having location or room identifications and associated frequency values or ancillary location codes. In this manner, the PPM 104 may retrieve the room or location identification from the memory 204 based on the frequency of the ancillary location code.

The PPM 104 then determines whether a media delivery device (e.g., one of the media delivery centers 112) is located within the room or location indicated by the location information determined at block 1222 (block 1224). For example, the PPM 104 may have another data structure stored in the memory 204 having location or room identifications and information (e.g., flags, bits, etc.) indicative of whether the media delivery centers 112 are located within the rooms or locations associated with the location or room identifications. If the PPM 104 determines that one of the media delivery centers 112 is located within the room or location indicated by the location information, then the PPM 104 generates media monitoring information based on the media signal received at block 1210 (block 1226). For example, the PPM 104 may extract an ancillary audio code from the media signal or may generate an audio signature based on the media signal. The PPM 104 may then generate and store time-stamped, location-annotated media monitoring information (block 1228). For example, the PPM 104 may use the timing device 205 (FIG. 2) to generate a time stamp indicative of the time at which the PPM 104 received the media signal at block 1210, and the PPM 104 may then concatenate or merge the time stamp, the location information, and the media monitoring information to generate the time-stamped, location-annotated media monitoring information. The PPM 104 may then store the time-stamped, location-annotated media monitoring information in the memory 204.

After the PPM 204 has stored the time-stamped, location-annotated media monitoring information at block 1228 or if the PPM 104 determines at block 1224 that one of the media delivery centers 112 is not located within the room or location indicated by the location information, then the process is ended. Of course, control may alternatively be returned to the operation of block 1210 when the PPM 104 receives another media signal, and the PPM 104 may repeat the operations of the example method of FIG. 12*b*.

Although the example method is described above as using the PPM 104 to perform all of the operations depicted in the flow diagram of FIG. 12B, in other example implementations, the example method may be implemented using a combination of the PPM 104 and another processor system (e.g., the home processing system 120 or the server 126 of FIG. 1). For example, the PPM 104 may obtain the media signal at block 1210 and the location signals at blocks 1212 and 1214, store the same in the memory 204 (FIG. 2), and subsequently communicate a plurality of stored media signals (e.g., digitized media signals) and respective location signals to another processor system. The other processor system may then perform the remaining operations depicted in the flow diagram of FIG. 12B to generate and store the time-stamped, location-annotated media monitoring information based on the media signals and location signals as described above.

Figure 13A:
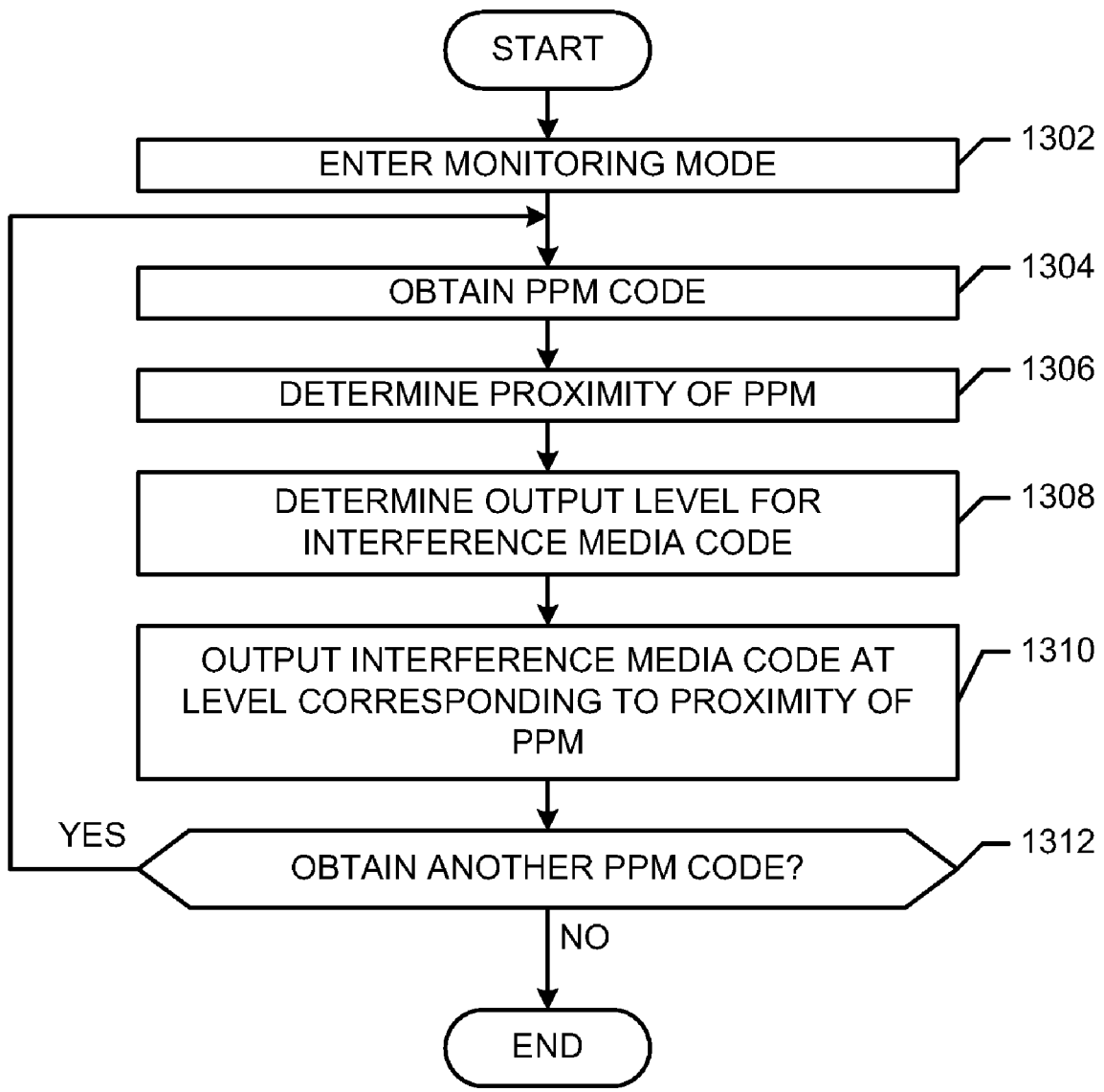
FIG. 13A is a flow diagram of an example method that may be used to output interference media codes.

FIG. 13A is a flow diagram of an example method that may be used to output interference media codes by base units (e.g., the base units 114 of FIGS. 1A and 3). In general, the example method of FIG. 13A may be used in combination with the example method described above in connection with FIG. 12A to prevent the PPM 104 (FIG. 1A) from detecting media codes that spill over into rooms having no media delivery centers (e.g., the media delivery centers 112 of FIG. 1A) when the PPM 104 is located within that room. More specifically, the example method of FIG. 13A may be used to broadcast or emit interference media codes via the base unit 114 based on the proximity of the PPM 104 to the base unit 114. The example method of FIG. 13A described below may be implemented in the base units 114 located in rooms or spaces having none of the media delivery centers 112. For example, the example method may be implemented in the base unit 114 located in the room 115*a* of FIG. 1A.

Initially, the base unit 114 enters a monitoring mode (block 1302). The monitoring mode of the base unit 114 is configured to monitor for the presence of the PPM 104 by, for example, detecting audio chirps from the PPM 104 that may be inaudible to the human ear. The audio chirps may be broadcast by the PPM 104 via, for example, the speaker 212*a* described above in connection with FIG. 2 and may include PPM codes that are used to inform the base unit 114 when the PPM 104 is within the same room or space as the base unit 114.

The base unit 114 then obtains a PPM code (block 1304) via an audio chirp emitted by the PPM 104 and determines the proximity of the PPM 104 (block 1306). The base unit 114 may determine the proximity of the PPM 104 by measuring the volume of the audio chirp. Additionally or alternatively, the PPM 104 and the base unit 114 may include synchronized clocks (e.g., the timing device 205 of FIG. 2 and the timing device 309 of FIG. 3) and the PPM 104 may timestamp the audio chirp so that when the base unit 114 receives the audio chirp the base unit 114 may determine the delay between the transmission of the audio chirp by the PPM 104 and the reception of the audio chirp by the base unit 114 and, thus, determine the proximity of the PPM 104 based on the transmission propagation delay. Another example method for determining the proximity of the PPM 104 to the base units 114 is described below in connection with FIG. 13B and involves configuring the base units 114 to emit the audio chirps and the PPM 104 to detect the audio chirps.

After the base unit 114 has determined the proximity of the PPM 104, the base unit 114 may then determine an output level (e.g., a power level, volume, etc.) at which to output the interference media code (block 1308). If the interference media code is output by the base unit 114 via audio, then the base unit 114 may determine a volume level at which to emit the interference media code. Of course, if the interference media code is output by the base unit 114 via RF, the base unit 114 may determine an RF signal strength level or power level at which to emit the interference media code.

The base unit 114 then emits the interference media code at the determined level (block 1310). The base unit 114 may output interference media codes while monitoring for audio chirps from the PPM 104 in a manner that prevents the PPM 104 from detecting media codes emitted by media delivery centers 112 located in other rooms or spaces.

It is then determined whether the base unit 114 is to obtain another PPM code (block 1312). If another PPM code is to be obtained, control is passed back to block 1304. For example, the base unit 114 may be configured to monitor for the presence of PPM codes for a predefined length of time. If a PPM code is detected in that time period, then that detected PPM code is captured at the block 1304. If, instead, no such PPM code is detected during the predefined length of time, then the base unit 114 may be configured to enter a reduced monitoring mode in which the base unit 114 cycles between periods of monitoring activity and periods of inactivity. The frequency at which the base unit 114 cycles between a monitoring state and a state of inactivity is selected such that the likelihood of not detecting a PPM that has entered the monitoring proximity of the base unit 114 is negligible. The monitoring proximity of the base unit 114 is the area proximate to the base unit 114 within which the presence of a PPM is detectable by the base unit 114 (i.e., the area representing the monitoring reach of the base unit 114).

Figure 13B:
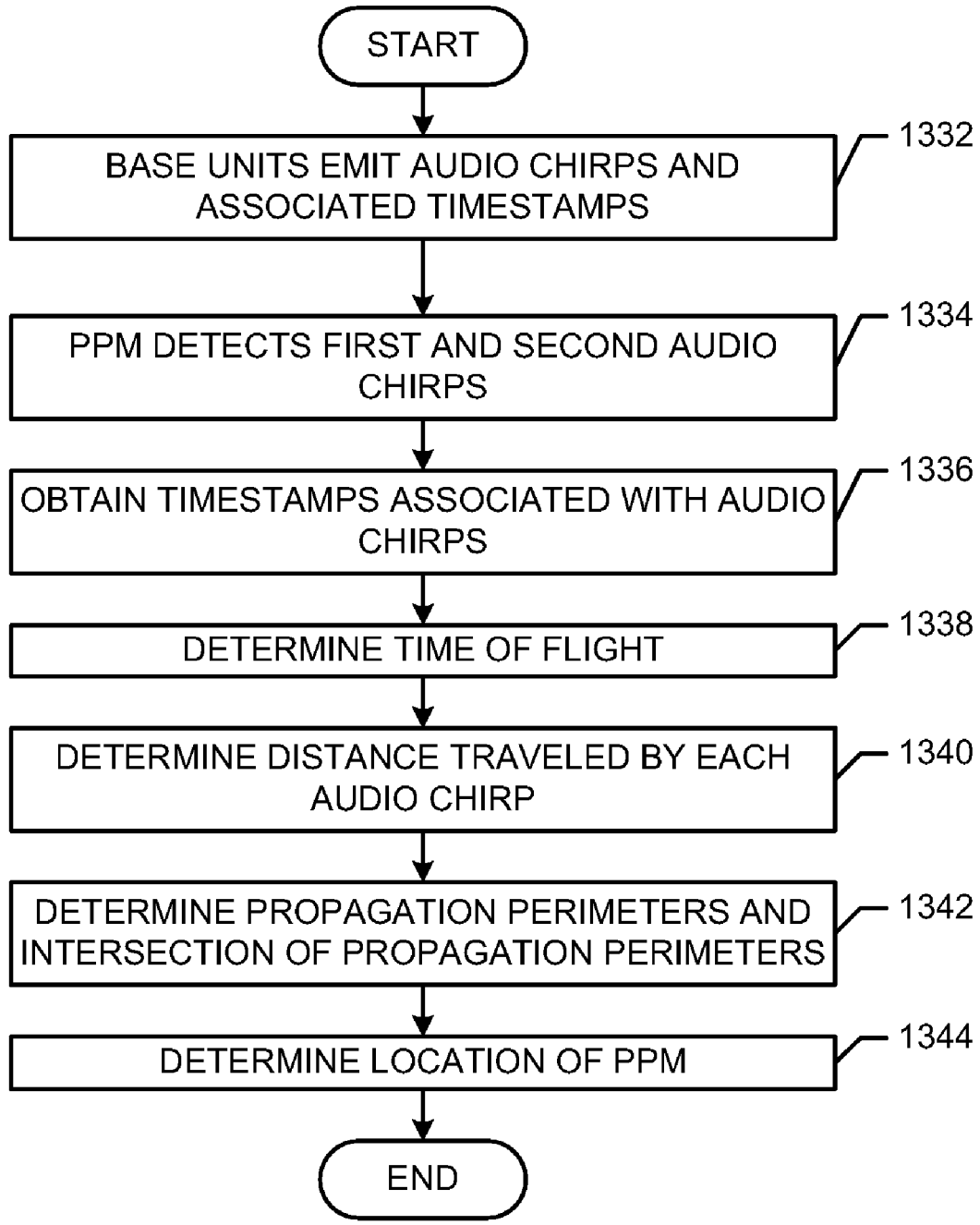
FIG. 13B is a flow diagram of an example method that may be used to determine the location of a PPM within a room.

FIG. 13B is a flow diagram of an example method that may be used to determine the location of a PPM (e.g., the PPM 104 of FIGS. 1A-1C) within a room (e.g., the room 115*b* of FIG. 1C). The location of the PPM 104 may be determined based on the proximity of the PPM 104 to one or more base units (e.g., the base units 114 of FIGS. 1C and 3) as shown in FIG. 1C. The example method of FIG. 13B may be used at least in part to implement the operation of block 1306 described above in connection with FIG. 13A. The example method is described below in connection with the example location detection system 172 of FIG. 1C. Specifically, a propagation delay or time delay is determined by the PPM 104 for each audio chirp received from each base unit 114. Each time delay is then multiplied by the speed of sound to calculate the distance between the PPM 104 and the base units 114. Although the audio chirps are described below as emitted from the base units 114 and received by the PPM 104, in an alternative implementation, the audio chirps may be emitted from the PPM 104 and received by the base units 114 that may then use the resulting information to perform distance calculations (e.g., determine the distances d1 and d2 of FIG. 1C). In yet another alternative implementation, the PPM 104 and the base units 114 may all be adapted to emit audio chirps and detect audio chirps and to use the resulting information to perform distance calculations.

Now turning in detail to FIG. 13B, the base units 114 each emit an audio chirp and associated timestamps in a synchronized manner (block 1332). For example, the first base unit 114 emits a first audio chirp at a time T1 and the second base unit 114 emits a second audio chirp at a time T2. The times T1 and T2 are offset from each other by a substantially short time period spanning, for example, tenths of a second or less. In one example, the base units 114 may generate the timestamps for T1 and T2 using their respective clocks (e.g., the timing device 309 of FIG. 3) and may encoded each timestamp in their respective audio chirps. In another example, the base units 114 may emit audio chirps at predetermined or preprogrammed times and the PPM 104 may be preprogrammed with information about the times of emissions of the audio chirps. For example, clocks of the PPM 104 and the base units 114 (e.g., the timing device 205 of FIG. 2 and the timing device 309 of FIG. 3) may be synchronized with each other, and the base units 114 may be configured to emit the audio chirps at pre-designated times that are known to the PPM 104.

In yet another example, the base units 114 may be configured to generate an RF signal a predefined or predetermined period of time prior to emitting an audio chirp. In this case, the RF signal acts as a pulse signal to synchronize the operation of the PPM 104 and the base units 114. More specifically, each of the base units 114 may be configured to emit an RF signal that is detectable by the PPM 104 and subsequently, after a predetermined period of time has lapsed (e.g., 500 ms, is, 2 s, etc.), emit an audio chirp. A time value representing the predetermined period of time may be stored in the PPM 104 or may be communicated in the RF signal. In any case, the PPM 104 is configured to obtain the predetermined period of time value upon receipt of the RF signal. In this manner, when the PPM 104 obtains an RF signal from the first base unit 114, the PPM 104 may read or otherwise obtain a time value from its clock (e.g., the timing device 205 of FIG. 2) and determine the time T1 by adding the predetermined period of time to the time value. The PPM 104 may then determine the time T2 in a similar manner when it receives an RF signal from the second base unit 114. The times T1 and T2 may then be stored in memory (e.g., the memory 204 of FIG. 2) for subsequent retrieval.

The PPM 104 detects the first audio chirp at a time T3 and the second audio chirp at a time T4 (block 1334). The times T3 and T4 may be determined by generating a timestamp based on the clock (e.g., the timing device 205 of FIG. 2) of the PPM 104 when each of the first and second audio chirps are received. The PPM 104 then obtains the timestamps T1 and T2 associated with each of the audio chirps (block 1336). For example, the timestamps T1 and T2 may be extracted from the audio chirps or retrieved from memory (e.g., the memory 204 of FIG. 2) if, for example, the PPM 104 is preprogrammed with the times at which the base units 114 emit the audio chirps. Regardless of how the timestamps are provided to the PPM 104, the PPM 104 is configured to then determine the time of flight of each of the first and second audio chirps (block 1338). The time of flight is the propagation delay or the time delay between the times at which the audio chirps were emitted by the base units 114 (e.g., times T1 and T2) and the times at which the audio chirps were detected by the PPM 104 (e.g., times T3 and T4). The PPM 104 may determine the time of flight of the first audio chirp by subtracting the time T3 from the time T1 and may determine the time of flight of the second audio chirp by subtracting the time T4 from the time T2.

The PPM 104 may use the time of flight information to calculate the distance traveled (e.g., the distances d1 and d2 of FIG. 1C) by each of the first and second audio chirps (block 1340). For example, the distances d1 and d2 traveled by the audio chirps may be determined by multiplying the time of flight for each audio chirp by the speed of sound. The distances d1 and d2 may be used to represent the proximity of the PPM 104 to each of the base units 114. The operations of blocks 1338 and 1340 may be adapted to implement the operation of block 1306 described above in connection with FIG. 13A to determine the proximity of the PPM 104 to one or more base units 114.

The PPM 104 may then determine a propagation perimeter for each of the distances d1 and d2 and the intersection point within the room 115b of those propagation perimeters (block 1342). For example, the distances d1 and d2 traveled by the first and second audio chirps may be used by the PPM 104 to determine the propagation perimeters 174 and 176 shown in FIG. 1C. The propagation perimeters 174 and 176 are represented as circular patterns, each having a radius equal to one of the distances d1 and d2 and a center located at the position at which its associated base unit 114 is disposed. The PPM 104 may then determine, based on the known location of the base units 114 within the room 115b and the distances d1 and d2, that the propagation perimeters 174 and 176 intersect each other at the intersection point 178 within the room 115b as shown in FIG. 1C.

The PPM 104 then determines its location within a room (e.g., the room 115b) (block 1344). The PPM 104 may determine its location based on the distances d1 and d2 and the intersection of the propagation perimeters 174 and 176. For example, the PPM 104 may determine that location at which that the propagation perimeters 174 and 176 intersect with each other within the room 115b defines its location within the room 115b.

The example method described above may be performed in real-time by the PPM 104 and/or the base units 114. Alternatively, the information associated with audio chirps and the timestamps T1, T2, T3, and T4 may be stored in the PPM 104 and/or the base units 114 and communicated to another processing system (e.g., the home processing system 120 of FIG. 1A) in real-time or at a later time. The information may then be processed by the other processing system in a real-time process or in a post-process. Further, the techniques described hereinabove for determining the location of the PPM 104 using audio chirp signals emitted by one or more of the base units 114 disposed in the household 102 or a room (e.g., the room 115b of FIGS. 1A-1C) of the household 102 may, but need not be performed in connection with the base units that emit interference codes described above in connection with FIG. 13A. As will be appreciated by one having ordinary skill in the art, the techniques described hereinabove for determining the location of the PPM 104 using audio chirp signals emitted by one or more of the base units 114 may also be performed for the more general purpose of identifying the location of the PPM 104 for purposes of combating spillover associated with media presented anywhere in the household 102 or in any other indoor location, including, for example, any type of dwelling or residence, office space, retail location, etc.

FIG. 14A-14E are flow diagrams of example methods that may be used to enhance the accuracy of the location information detected using the PPM 104 by determining whether two sequentially detected locations that are associated with different rooms in the household are actually associated with movement of the audience member 106 between the two rooms or are instead caused by the imprecision of the location detection equipment installed in the PPM 104. More specifically, and referring also to FIG. 1B, location data collected by the PPM 104 while located at a first position near the wall 119 in a room (e.g., the room 115c) may, depending on the accuracy of the location detection equipment used, identify or represent a second position located on the opposite side of that wall 119 such that the location data erroneously indicates that the audience member 106 carrying the PPM 104 is located in a second room (e.g., the room 115a) that is adjacent to the first room 115c. Several techniques may be deployed to identify erroneous location data of this type including: 1) a technique involving an examination of individual location data values, 2) a technique involving the calculation of a rate of speed of a person carrying a PPM, 3) a technique involving the collective examination of several location data values to identify a direction of travel of the audience member 106 carrying the PPM 104, and 4) a technique involving the identification of sequentially collected location data that are clustered within a predefined distance from a wall that separates two adjacent rooms.

Figure 14A:
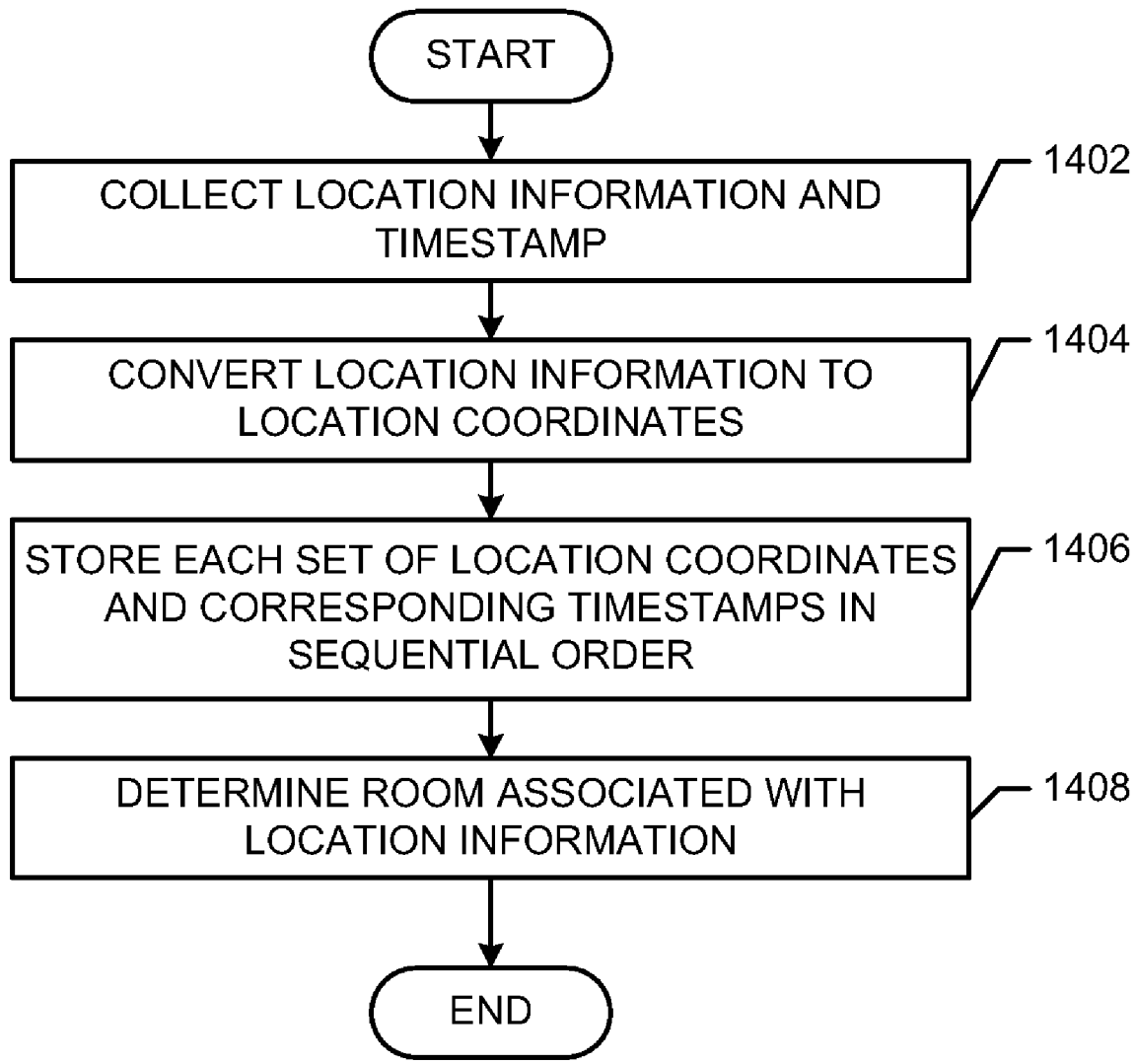
FIGS. 14A-14E are flow diagrams of example methods that may be used to enhance the accuracy of the location information detected using the PPM 104.

With reference to FIG. 14A, a technique involving an examination of individual location data values may involve, for example, processing location information to identify sequentially collected location data points that represent locations disposed in different rooms (e.g., the rooms 115a-c of FIGS. 1A and 1B) in a household (e.g., the household 102 of FIGS. 1A and 1B). Sequentially collected location data points meeting this criteria cause one or more subsequently collected location data points to be examined to determine whether the audience member 106 likely moved between the rooms (as indicated by the location data), thereby suggesting that the location data is erroneous. Depending on whether movement between the rooms likely occurred, the location data indicating a room change is treated as either accurate or erroneous and used by the PPM 104, the home processing system 120, and/or the server 126 (FIG. 1A) to accurately credit media exposure that occurred in either room, if any.

The method of FIG. 14A may be performed using any of a number of data processes and may be implemented using a PPM (e.g., the PPM 104 of FIG. 1A) or using a PPM in combination with a central processing system (e.g., the home processing system 120 or the server 126 of FIG. 1A) to process a set of sequentially-collected location information obtained by the PPM 104. The location information is converted into sets of location coordinates that are each used to identify the location of the PPM 104 within a home (e.g., the household 102 of FIG. 1A) at the time that each of the sets of location coordinates was obtained. Each of the sets of location coordinates are represented using two values, a first representing an X coordinate and a second representing a Y coordinate, wherein the floor plan of the household 102 is mapped to an XY grid as shown in FIG. 1B. A counting variable (n) is used to identify an index of each collected location coordinate indicating the order or sequence in which each of the sets of location coordinates are collected. For example, when n is equal to one, the coordinate set $(X_n, Y_n)$ represents the first of the sets of location coordinates in the sequence of collected location coordinates. Likewise, when n=2, the coordinate set $(X_n, Y_n)$ represents the second of the sets of location coordinates in the sequence, and so on. As discussed above, a timestamp reflecting the time at which a particular set of location coordinates was collected is stored in a memory and associated with the corresponding set of location coordinates. Referring still to FIG. 1B, each of the location coordinates is used to identify a room in which the PPM 104 was located at the time that the location coordinate was collected. The room corresponding to each location coordinate may be identified using, for example, a look-up table that relates each possible location coordinate with the room in which that location coordinate is disposed. Each set of location coordinates and its corresponding room is stored in a memory (e.g., the memory 204 of FIG. 2) along with the corresponding timestamp at which the set of location coordinates was collected. Sequentially collected location coordinates and their corresponding rooms are then compared to determine whether the sequentially collected location coordinates indicate that the audience member 106 has moved from one room (e.g., the first room 115c) in the household 102 to another room (e.g., the second room 115a) in the household during the time elapsing between the collection of the sequentially collected sets of location coordinates.

In the example method of FIG. 14A, the processing begins with the collection of the location information and timestamps (block 1402). For example, the location information may be collected from a location information system such as the RF tower 108, the satellite 110, and/the base units 114 (FIG. 1A). The timestamps may also be collected from the location information systems or may be generated by the PPM 104. The location information is converted to sets of location coordinates (block 1404) and the sets of location coordinates are stored in a memory (e.g., the memory 204 of FIG. 2) (block 1406). Each set of location coordinates is also stored or associated with information representing the sequential order in which the set of location coordinates was collected relative to the other collected sets of location coordinates and with a respective timestamp reflecting the time at which each set of location coordinates was collected (block 1406). The stored information may then be used to determine a room associated with the location information collected at block 1402 (block 1408). For example, the room may be determined by inputting the stored information into a method for determining or inferring if two sets of sequentially collected location coordinates accurately reflect the actual position of the PPM 104 or instead reflect the position of the PPM 104 offset by a precision error associated with the location equipment installed in the PPM 104.

Figure 14B:
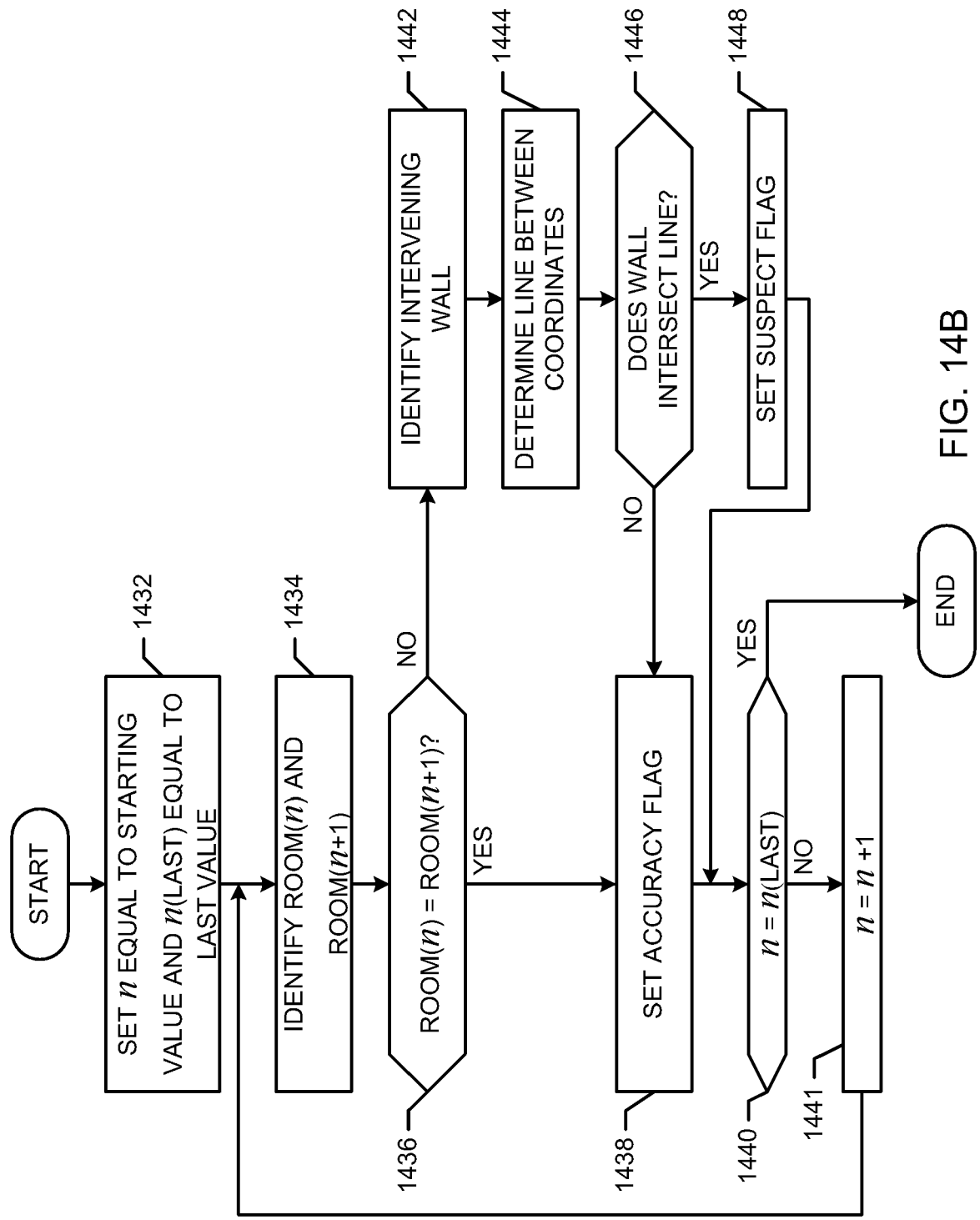
Figure 14C:
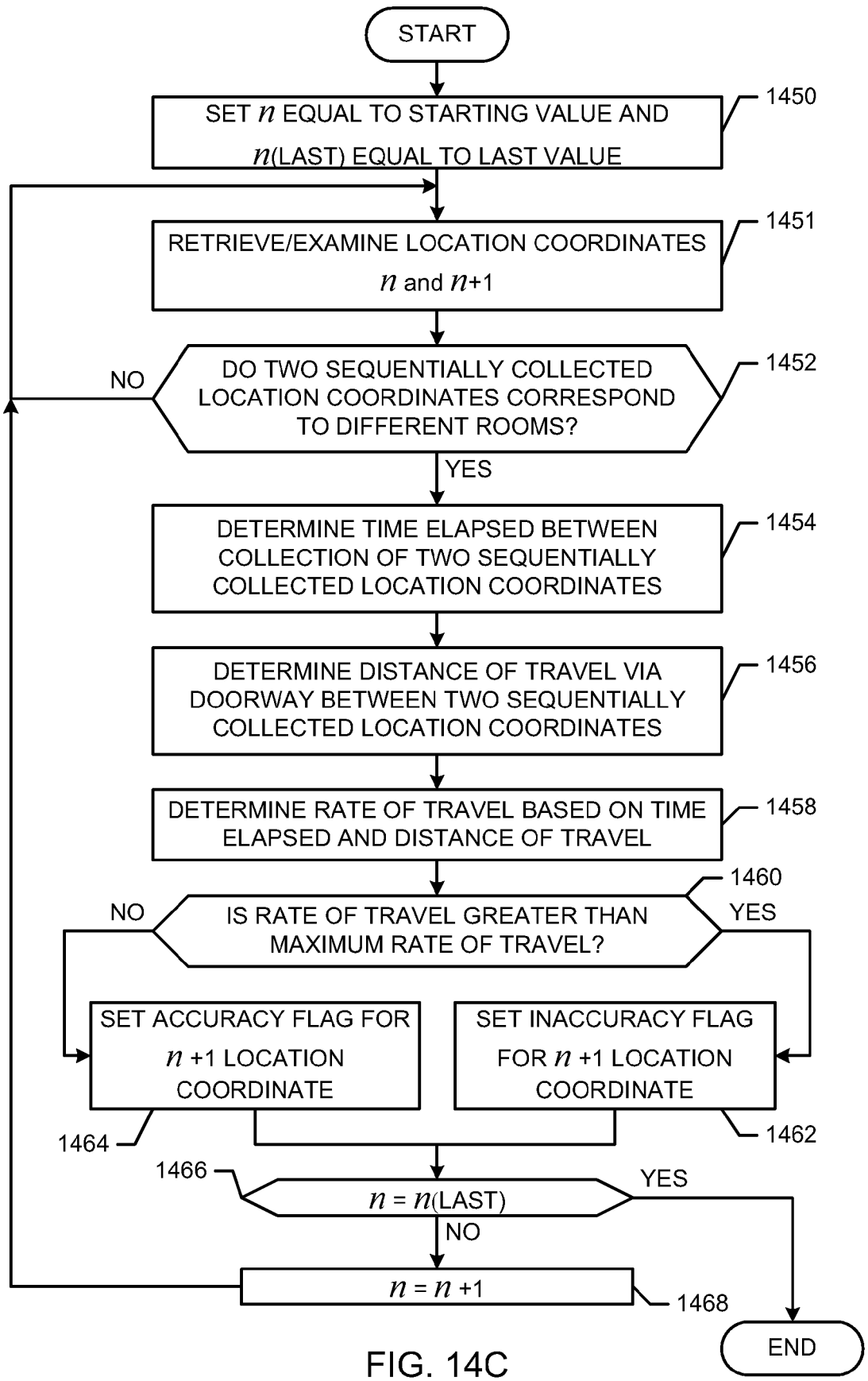

An example method shown by the flow diagram of FIG. 14B may be used to determine or infer the accuracy of the location information by identifying a set of location coordinates of interest. Initially, the counting variable n is set equal to a starting index value and a last coordinate variable $n_{last}$ equal to a last index value (block 1432). For example, if one thousand location coordinates are collected, the second half of the location coordinates may be analyzed by setting the counting variable n equal to the index value five hundred and the last coordinate variable $n_{last}$ equal to the index value one thousand. Next, the rooms associated with the n-th set of location coordinates and the set of location coordinates n+1, are identified (block 1434) using, for example, the look-up table described above, and the rooms are then compared (block 1436). If the comparison indicates that the rooms are the same (i.e., $room_n = room_{n+1}$) then the audience member 106 is assumed to have remained in the same room between a time $T_n$ at which the n-th set of location coordinates was collected and a time $T_{n+1}$ at which the n+1 set of location coordinates was collected. In addition, the rooms identified for each set of location coordinates are assumed to accurately reflect the location of the audience member 106 carrying the PPM 104. If the rooms are the same, an accuracy flag, or any other variable, is associated with the corresponding set of location coordinates and set to indicate that the data is accurate (block 1438).

The counting variable n is then compared to the last coordinate variable $n_{last}$ (block 1440) to determine if all of the location coordinates have been analyzed. If all of the location coordinates have not been analyzed (e.g., $n \neq n_{last}$), the counting variable n is incremented by one (i.e., n=n+1) (block 1441) and the process analyzes the next sequentially collected set of location coordinates by repeating the processing described in connection with blocks 1434, 1436, 1438, and 1440. However, if the all of the location coordinates have been analyzed (e.g., $n = n_{last}$), the process is ended.

If at block 1436 the rooms are different (i.e., room n≠room n+1), then the wall 119 separating the two rooms is identified as an intervening wall (block 1442) using, for example, a look-up table that includes entries identifying each set of adjacent rooms and the location coordinates associated with the wall (e.g., the wall 119) disposed between each set of adjacent rooms (e.g., the rooms 115a and 115c).

After the wall 119 separating the two rooms 115a and 115c is identified, the two sets of location coordinates $(X_n, Y_n)$ and $(X_{n+1}, Y_{n+1})$ are used in combination with a line equation y=Mx+b to determine a line (e.g., one of the lines 162 and 164 of FIG. 1B) extending between the two sets of coordinates (block 1444). The line equation is used to determine whether any of the coordinates associated with the wall 119 reside on the line extending between the two sets of coordinates. Any of a number of known algebraic methods may be used to determine whether the wall 119 intersects the line y=Mx+b, including for example, any method used to determine whether any of the sets of coordinates defining the location of the wall 119 are valid solutions to the line equation y=Mx+b (block 1446). The operation of block 1446 may be performed by, for example, iteratively inserting each of the sets of location coordinates that define the location of the wall 119 into the equation y=Mx+b until a valid solution is identified. If none of the sets of coordinates of the wall 119 reside on the line extending between the two sets of location coordinates $(X_n, Y_n)$ and $(X_{n+1}, Y_{n+1})$, then the line passes through a doorway (e.g., the doorway 166 of FIG. 1B) as illustrated by the line 164 of FIG. 1B. As a result, the process infers that the audience member 106 likely walked through the doorway 166 providing passage between the two rooms 115a and 115c. As a result, the two sequentially obtained sets of location coordinates $(X_n, Y_n)$ and $(X_{n+1}, Y_{n+1})$ are treated as accurately reflecting the location of the audience member 106 such that any media monitoring information associated with these location coordinates (i.e., collected at or at about the same time as the location information) are credited in accordance with the proximity (or lack thereof) of any media delivery devices at those locations. Because the data is determined or inferred to be accurate, an accuracy flag is set to a value of 1 (block 1438) that may be stored together with the location information or location coordinates in a memory. The accuracy flag may then be used by any subsequent processes used for crediting (or not) viewed media.

If it is determined at block 1446 that any of the coordinates of the wall 119 reside on the line, y=Mx+b, then the line passes through the wall 119 as illustrated by the line 162 of FIG. 1B. As a result, the process infers that one of the sequentially collected sets of location coordinates may be erroneous because the shortest distance between the two sequentially collected set of location coordinates (i.e., a straight line) suggests a path of travel through an intervening wall (e.g., the wall 119), an event that is not likely (barring a construction project in which the wall has been removed or impaired in some way). Thus, the positioning of the sequential sets of location coordinates relative to the intervening wall 119 causes the accuracy of the sets of location coordinates to be considered suspect and thereby causes a suspect flag to be set (block 1448). The suspect flag may be used by any subsequent processes for crediting (or not) media as having been viewed or the suspect flag may cause the initiation of a process for further evaluation of the sequentially collected sets of location coordinates. After the suspect flag is set at block 1448, control is passed back to block 1440.

Another example method for analyzing or evaluating the sequentially collected location coordinates is shown in the flow diagram of FIG. 14C. The example method of FIG. 14C may involve, for example, determining whether travel from the first set of location coordinates to the second set of location coordinates is possible in the duration of time elapsing between the collection of the sequential sets of location coordinates assuming a path of travel (e.g., the path line 168 of FIG. 1B) through a doorway (e.g., the doorway 170 of FIG. 1B) disposed in the intervening wall 119 (FIG. 1B). The additional processing used to perform this evaluation begins after two sequentially collected sets of location coordinates indicating a room change have been detected.

Initially, the counting variable n is set equal to a starting value and the last coordinate variable $n_{last}$ equal to a last value (block 1450). Two sets of sequentially collected location coordinates (e.g., $(X_n, Y_n)$ and $(X_{n+1}, Y_{n+1})$) are then retrieved and examined (block 1451) to determine if each of the two sets correspond to a different room. It is then determined if the examination or analysis at block 1451 indicate that the two sequentially collected sets of location coordinates each correspond to a different room (block 1452), thereby indicating that a room change has been detected. If the two sequentially collected sets of location coordinates do not correspond to different rooms, then control is passed back to block 1452 where the next two sets of sequentially collected location coordinates (e.g., $(X_{n+1}, Y_{n+1})$ and $(X_{n+2}, Y_{n+2})$) are retrieved and examined. However, if it is determined at block 1452 that two sets of sequentially collected location coordinates correspond to different rooms (e.g., the rooms 115b and 115c of FIG. 1B), then the elapsed time between the collection of the sets of location coordinates $(X_n, Y_n)$ and $(X_{n+1}, Y_{n+1})$ is determined by determining the time elapsed between the timestamps associated with each (e.g., $T_{elapsed} = T_{n+1} - T_n$) (block 1454).

Next, the distance of travel between the first and second sets of location coordinates is calculated assuming a path of travel (e.g., the path line 168 of FIG. 1B) through the doorway 170 providing passage between the first and second rooms 115b and 115c (block 1456). The distance of travel ($D_{total}$) may be calculated by adding the distance from the first set of location coordinates $(X_n, Y_n)$ to the center of the doorway 170 ($D_{XnYn\ to\ center}$) to the distance from the center of the doorway 170 to the second set of location coordinates ($D_{center\ to\ Xn+1Yn+1}$). An estimated rate of travel (R) may then be determined based on the time elapsed ($T_{elapsed}$) and the total distance ($D_{total}$) (block 1458). For example, the total distance ($D_{total}$) may be divided by the time elapsed ($T_{elapsed}$) to obtain the estimated rate of travel (R). The rate of travel (R) may then be compared to a predefined, maximum expected rate of travel within the household ($R_{max}$) (block 1460). The predefined, maximum expected rate of travel may vary in accordance with the mobility characteristics of the inhabitants of the household 102.

If it is determined at block 1460 that the estimated rate of travel (R) exceeds a predetermined, maximum expected rate of travel ($R_{max}$) within the household 102, then an inaccuracy flag for the n+1 location coordinate $(X_{n+1}, Y_{n+1})$ may be set to indicate that the n+1 location coordinate is inaccurate or erroneous (block 1462) because it is unlikely that the audience member 106 traveled between the first and second sets of location coordinates within the elapsed time ($T_{elapsed}$). As described above, sets of location coordinates that are identified as inaccurate or suspect are used to inform the crediting process, to prevent or limit inaccurate crediting.

If, instead, it is determined at block 1460 that the estimated rate of travel (R) is not greater than the predefined, maximum expected rate of travel within the household, then an accuracy flag for the n+1 location coordinate $(X_{n+1}, Y_{n+1})$ may be set to indicate that the n+1 location coordinate is accurate (block 1464). As described above, sets of location coordinates that are identified as accurate are used by the system to credit any media exposure occurring at the times at which the sets of location coordinates were collected.

The counting variable n is then compared to the last coordinate variable $n_{last}$ (block 1466) to determine if all of the location coordinates have been analyzed. If all of the location coordinates have not been analyzed, the counting variable n is incremented by one (i.e., n=n+1) (block 1468) and control is passed back to block 1451. However, if the all of the location coordinates have been analyzed (e.g., n=$n_{last}$), the process is ended.

Figure 14D:
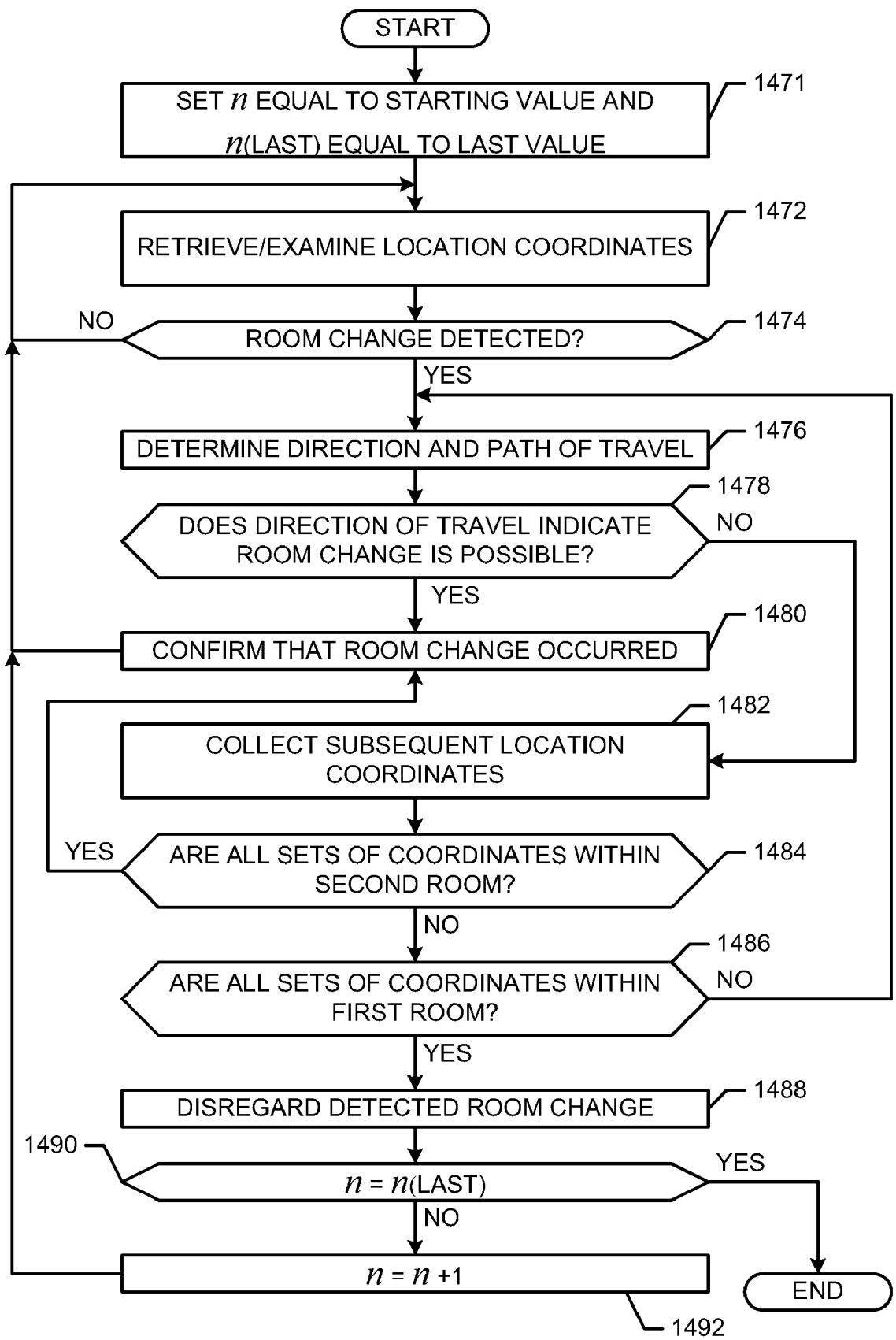

An example method shown in FIG. 14D may be implemented by analyzing or processing a plurality of neighboring sets of location coordinates in a collective manner to identify a path of travel of the audience member 106. The resulting information may be used to either supplant or support the conclusions reached about the accuracy of the collected data formed using the location by location comparison/analysis described in connection with FIGS. 14A-14C. For example, after a room change has been detected, the example method of FIG. 14D may be used to process location coordinates collectively to identify the movement of the audience member 106 using several sequentially collected sets of location coordinates. The number of sets of location coordinates used to identify the movement of the audience member 106 is preferably a sufficient number to determine whether the audience member 106 is moving in a particular direction. Identifying movement in a particular direction, in turn, requires that the movement of the audience member 106 be tracked for a sufficient period of time.

The period of time sufficient to track movement in a particular direction will vary depending on the frequency at which the PPM 104 collects location information and the anticipated average rate of movement expected of the audience member 106. For example, if the PPM 104 collects location information every second, then six such collections can be used to identify the movement of the audience member 106 over a sufficient amount of time (e.g., six seconds) for the audience member 106 to traverse a small room. If, instead, the PPM 104 collects location information six times per second, then six such collections of location information can be used to reflect the movement of the audience member 106 over one second of time. However, one second may be an insufficient amount of time for an average person to have moved a large enough distance to be able to identify any particular direction of movement.

For purposes of clarity in describing the example method of FIG. 14D, assume that the PPM 104 collects location information at a rate of once per second and that six seconds is a sufficient length of time for an average person to traverse across, or halfway across, an average sized room. Initially, the counting variable n is set equal to a starting value and a last coordinate variable $n_{last}$ equal to a last value (block 1471). For example, the counting variable n may be set to an index value corresponding to a first location coordinate to be retrieved. The last coordinate value $n_{last}$ may be set to an index value equal to the last index value to which the counting variable n should be equal when the example method of FIG. 14D has analyzed all of the desired location coordinates. For example, if groups of six location coordinates are to be analyzed at a time and there are one thousand (e.g., 1-1000) location coordinates to be analyzed, the last coordinate value $n_{last}$ should be set equal to one thousand minus five (e.g., $n_{last}$=1000−5).

A set of location coordinates (e.g., ($X_n$, $Y_n$) and ($X_{n+1}$, $Y_{n+1}$)) are then retrieved and examined (block 1472) to determine if a room change has possibly occurred. It is then determined if the examination or analysis of block 1472 indicates that a room change from a first room (e.g., the room 115b of FIGS. 1A and 1B) to a second room (e.g., the room 115c of FIGS. 1A and 1B) is detected (block 1474). If a room change is not detected, control is passed back to block 1472. If a room change is detected, a group (e.g., six sets) of location coordinates (e.g., ($X_{n+2}$, $Y_{n+2}$) through ($X_{n+7}$, $Y_{n+7}$)) collected immediately subsequent to the detection of the room change are then analyzed to determine whether they indicate a particular direction and path of travel or motion (block 1476). It is then determined whether that particular direction of travel or motion confirms that a room change is possible and/or likely occurred (block 1478).

If the six sets of location coordinates indicate that the audience member 106 remained in the room 115c after detecting the room change (e.g., room change from the first room 115b to the second room 115c) and further indicate that the audience member 106 moved successively farther away from the first room 115b, then the audience member 106 is assumed to have actually moved from the first room 115b into the second room 115c. In this case, the occurrence of a room change is confirmed (block 1480) by, for example, setting a room change flag or setting accuracy flags for each of the sets of coordinates to indicate that the room change may be regarded as accurately reflecting the location of the audience member 106.

If the six sets fail to indicate a particular direction of travel or movement that proceeds successively farther away from the first room 115b, and instead indicate a path of travel that includes several movements over short distances in different directions, then additional processing may occur in an attempt to determine whether the audience member 106 actually moved between rooms. For example, the room associated with each of six subsequently collected sets of location coordinates may be identified. Specifically, six subsequent location coordinates may be collected (block 1482) and analyzed to determine the room with which the six subsequently collected location coordinates are associated. It is then determined the six sets of location coordinates are disposed in the second room 115c (block 1484). If it is determined that the six sets of location coordinates are disposed in the second room 115c, control is passed to block 1480 where it is confirmed that the detected movement between the rooms 115b and 115c is reflected by the location coordinates and may be treated as having actually occurred.

If the six sets of location coordinates are not within the second room 115c, it is determined if the six sets of location coordinates are all disposed in the first room 115b (block 1486). If the six sets of location coordinates are within the first room 115b, then the detected movement into the second room 115c may be treated as anomalous and may be disregarded (block 1488). If, instead, the six sets of location coordinates indicate that the audience member 106 was moving back and forth between the first and second rooms 115b and 115c, then the next six sets of sequentially collected location coordinates may be analyzed to determine whether a direction of movement can be discerned by passing control from block 1486 to block 1476.

The counting variable n is then compared to the last coordinate variable $n_{last}$ (block 1490) to determine if all of the location coordinates have been analyzed. If all of the location coordinates have not been analyzed (e.g., n≠$n_{last}$), the counting variable n is incremented by one (i.e., n=n+1) (block 1492) and control is passed back to block 1472. However, if all of the location coordinates have been analyzed (e.g., n=$n_{last}$), the process is ended.

Figure 14E:
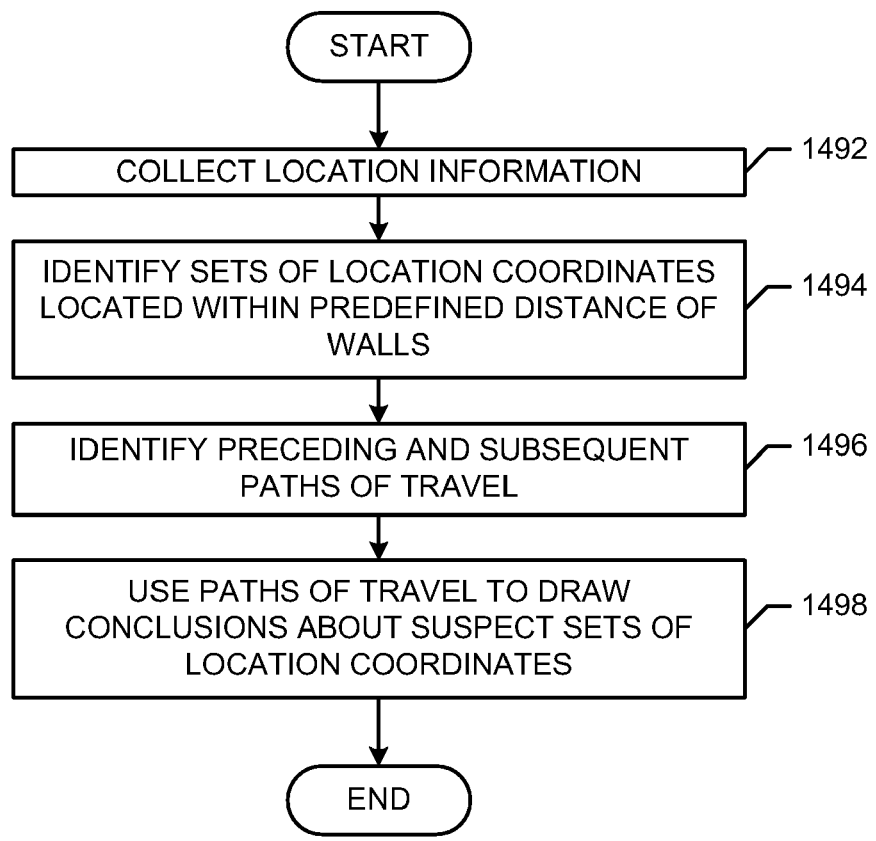

Alternatively, if the limitations of the accuracy of the location equipment installed in the PPM 104 are known, an example method of FIG. 14E may be used to treat, as suspect, all sets of location coordinates that indicate that the audience member 106 is located within a distance (e.g., the boundary zones 160a-160c of FIG. 1B) from any wall in the home (e.g., the household 102 of FIGS. 1A and 1B) that is less than the limits of accuracy of the equipment (e.g., the PPM 104 and/or the location information systems of FIG. 1A). Initially, location information is collected (block 1492). The location equipment having an accuracy of +/−six inches may be used to identify sets of location coordinates that are positioned within six inches of any wall in the household 102 and tag those location coordinates as suspect (block 1494). For example, a set of ten subsequently collected sets of location coordinates all positioned within six inches of a wall (e.g., within one of the boundary zones 160a-160c) located in a first room are labeled as suspect.

The suspect data may then be analyzed in light of location data collected before or subsequent to the suspect data (block 1496). For example, the ten location coordinates collected before and after the suspect set of location coordinates may be used to identify a path of travel taken by the audience member 106 before and after entering the region of error represented by the ten sets of location coordinates labeled as suspect.

The paths of travel may then be used to draw conclusions about suspect sets of location coordinates (block 1498). For example, if the path of travel preceding the suspect coordinates indicate that the audience member 106 entered the first room and the path of travel subsequent to the collection of the suspect coordinates indicates that the audience member 106 left the first room, then the process may conclude that the suspect points shall be credited as though the audience member 106 were located in the first room. In contrast, if the path of travel preceding the suspect coordinates labeled as suspect indicate that the audience member 106 entered a second room and the subsequently collected set of location coordinates indicate that the audience member left the second room, the process may conclude that the suspect points shall be credited as though the audience member 106 were located in the second room. If, instead, the location coordinates collected after the suspect location coordinates are also suspect because they are located within six inches of a wall (e.g., within the boundary zones 160a-160c) in the home, then the PPM 104 may be configured to reiteratively examine each of the next, sequentially collected location coordinates until a set of location coordinates representing a location positioned farther than six inches outside of the wall (e.g., outside of the boundary zones 160a-160c) is identified. The preceding and subsequent paths of travel may be used to draw a variety of conclusions about the suspect location data, depending on any number of factors including, the characteristics of the inhabitants of the household, the rooms in which movement is being detected, the placement of furniture within the rooms in which movement is detected, etc.

Figure 15:
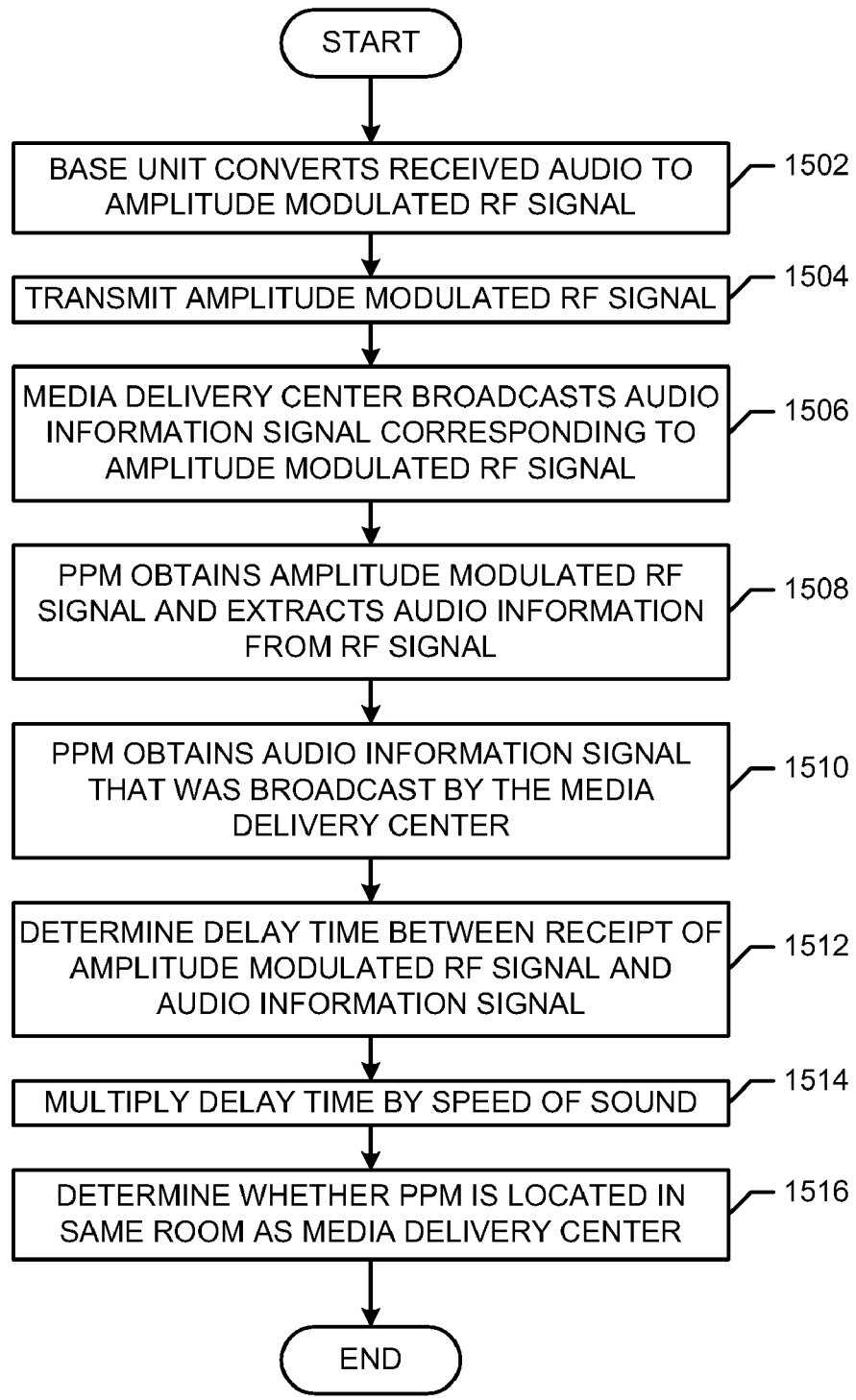
FIG. 15 is a flow diagram of another example method that may be used to manage spillover.

FIG. 15 is a flow diagram of another example method that may be used to manage spillover. In particular, the example method involves determining the spatial location of the PPM 104 (FIGS. 1 and 2) relative to any one of the media delivery centers 112 (FIG. 1A) by correlating time delays between received audio codes and received RF codes. In general, an RF transmitter is placed near, adjacent, or on one or more of the media delivery centers 112. The RF transmitter may be implemented using the PPM interface 308 (FIG. 3) of the base unit 114 (FIGS. 1 and 3) and the base unit 114 may be placed near, adjacent, or on the media delivery center 112. The base unit 114 may then be communicatively coupled to a media delivery device (e.g., a television) of the media delivery center 112 via, for example, the audio/video interface 316 to receive audio information from the media delivery center 112. Alternatively, the base unit 114 may be configured to receive audio information signals from speakers of the media delivery center 112 via the microphone 320 (FIG. 3).

The base unit 114 may convert the received audio information (i.e., the audio information received via the audio/video interface 316 and/or the microphone 320) into an AM modulated RF signal (block 1502) and transmit or broadcast the AM modulated RF signal via the PPM interface 308 (block 1504). The AM modulated RF signal is transmitted at substantially the speed of light. While the base unit 114 obtains the audio information from the media delivery center 112, the media delivery center 112 also broadcasts an identical or corresponding audio information signal via speakers to the surrounding area (block 1506). When the PPM 104 is in the vicinity of the base unit 114, the PPM 104 detects, receives, or otherwise obtains the AM-modulated RF signal and extracts the audio information (block 1508). The PPM 104 may then obtain the audio information signal that was broadcast by the media delivery center 112 (block 1510) via the audio sensor 218 (FIG. 2). However, because the audio signals transmitted by the speakers to the PPM 104 travel at the speed of sound and the AM modulated RF signal transmitted by the base unit 114 to the PPM 104 travels at the speed of light, there is a delay time between receipt of the AM modulated RF signal and receipt of the corresponding audio signal at the PPM 104.

The difference between the times at which the AM modulated RF signal and audio information signal are received may be used to determine the distance by which the PPM 104 is separated from the media delivery center 112. More specifically, after obtaining the audio information via the audio sensor 218 and via the AM modulated RF signal, a correlation can be performed between the two audio information signals to determine a delay time T (block 1512). The delay time T may then be multiplied by the speed of sound (e.g., about 1000 ft/sec) (block 1514) to determine the distance by which the PPM 104 is separated from the media delivery center 112. The distance information may then be used in combination with the example grid marker layouts illustrated in FIGS. 4 through 7 to determine whether the PPM 104 is located in the same room as the media delivery center 112 (block 1516).

Figure 16:
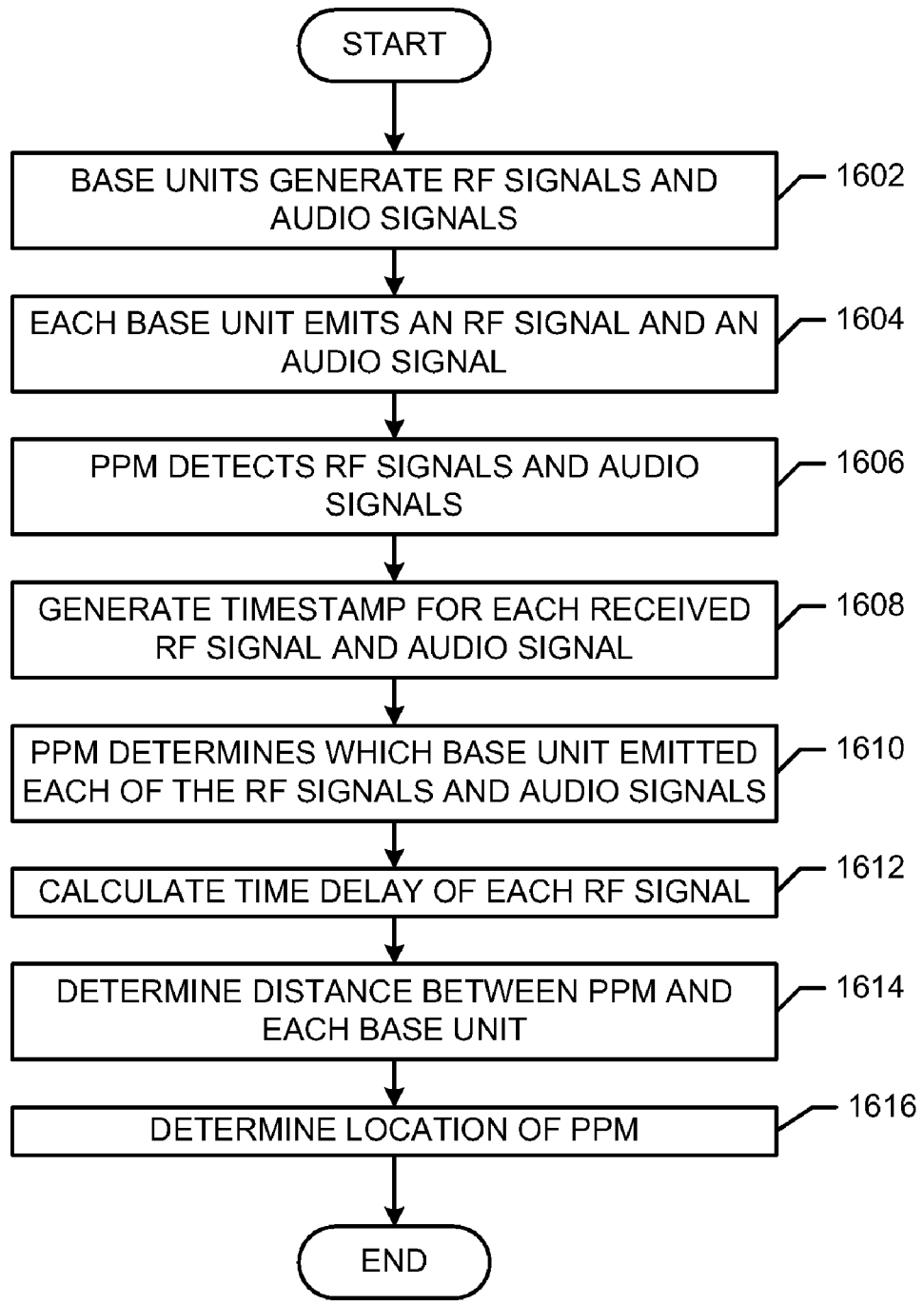
FIG. 16 is a flow diagram of another example method that may be used to manage spillover.

FIG. 16 is a flow diagram of another example method that may be used to manage spillover. In particular, instead of identifying a distance at which the PPM 104 (FIGS. 1A-1C and 2) is located from the media delivery center 112 (FIG. 1A), the system may be configured to calculate the location (e.g., the precise location) of the PPM 104 within the room or household (e.g., the household 102). Such a system includes two transmitters (e.g., two of the base units 114) disposed within the same room. For example, one of the base units 114 may be disposed on or near the media delivery center (e.g., one of the media delivery centers 112 of FIG. 1A) and the other one of the base units 114 may be disposed at a different location within the same room.

The base units 114 disposed within the same room are both configured to emit RF signals and/or optical signals (e.g., electromagnetic radiation signals, Wi-Fi® signals, radio waves, or infrared radiation signals) via, for example, the RF location interface 306 (FIG. 3) and/or the PPM interface 308 (FIG. 3) and emit audio signals via, for example, the speaker 318 (FIG. 3). The audio signals may be inaudible to the human ear so as to limit any annoyance to household members. The audio signals and the RF signals emitted by each of the base units 114 are uniquely associated with the base units 114 from which the signals originated. For example, each of the RF signals and audio signals may have codes embedded therein that identify from which of the base units 114 each of the signals was emitted.

Initially, each of the base units 114 generates an RF signal and an audio signal (block 1602). The base units 114 may generate timestamps (e.g., the timestamps T1 and T2 described above in connection with FIG. 15) and embed the timestamps into the RF signals and the audio signals. The timestamps represent the time at which the RF signals and the audio signals are emitted by the base units 114. The base units 114 then emit the RF signals and the audio signals generated at block 1602 (block 1604). Each of the base units 114 may emit the RF signal and the audio signal at (or about) substantially the same time. To avoid overlap, each of the base units 114 may emit an RF signal and an audio signal at a time that is offset from the time at which the other one of the base units 114 emits an RF signal and an audio signal.

The PPM 104 then detects the RF signals and the audio signals (block 1606). The PPM 104 may generate a timestamp (e.g., the timestamps T3 and T4 described above in connection with FIG. 15) for each received RF signal and audio signal (block 1608). The timestamps may be used to represent the time at which each RF signal and audio signal was received by the PPM 104. The PPM 104 then determines which base unit 114 emitted each of the RF signals and audio signals (block 1610). The PPM 104 is programmed with information (e.g., base unit identification information in a look-up table or database) that is used to identify the base unit 114 from which each signal originated.

The PPM 104 then calculates the propagation delay or time delay of each of the RF signals (block 1612). For example, the PPM 104 may subtract the timestamp corresponding to the time at which the PPM 104 received an RF signal from the timestamp corresponding to the time at which one of the base units 114 emitted the RF signal. The PPM 104 then determines the distance between the PPM 104 and each of the base units 114 (block 1614). Specifically, the PPM 104 multiplies each of the time delays by the speed of sound to determine the distance between the PPM 104 and the originating base units 114. This calculation assumes that the RF signal (traveling at or near the speed of light) is essentially received by the PPM 104 instantaneously such that the time delay between the receipt of the RF signal and the audio signal represents the time taken by the audio signal to travel to the PPM 104.

After determining a first distance between the PPM 104 and a first one of the base units 114 and a second distance between the PPM 104 and a second one of the base units 114, these distances can be combined with information about the location of the first and second base units 114 within the household 102 (FIG. 1A) to identify the location of the PPM 104 within the household 102 (block 1616). The location of the PPM 104 within the household 102 may be determined using the first and second distances in combination with, for example, a technique that is substantially similar or identical to the technique described above in connection with FIGS. 1C and 13B. Specifically, the first and second distances and the location of each of the base units 114 within the household 102 can be processed using a technique that is substantially similar to a triangulation technique to identify the location of the PPM 104 within the household 102.

The base units 114 configured to generate an audio signal and an RF signal may be adapted to generate such signals in a manner that is dependent on or in some way triggered by the emission of an audio signal by the media delivery center 112 (FIG. 1A) or may instead be adapted to generate such signals at periodic intervals or non-periodic intervals that are in no way connected to or triggered by audio signals emitted by the media delivery center 112.

Figure 17:
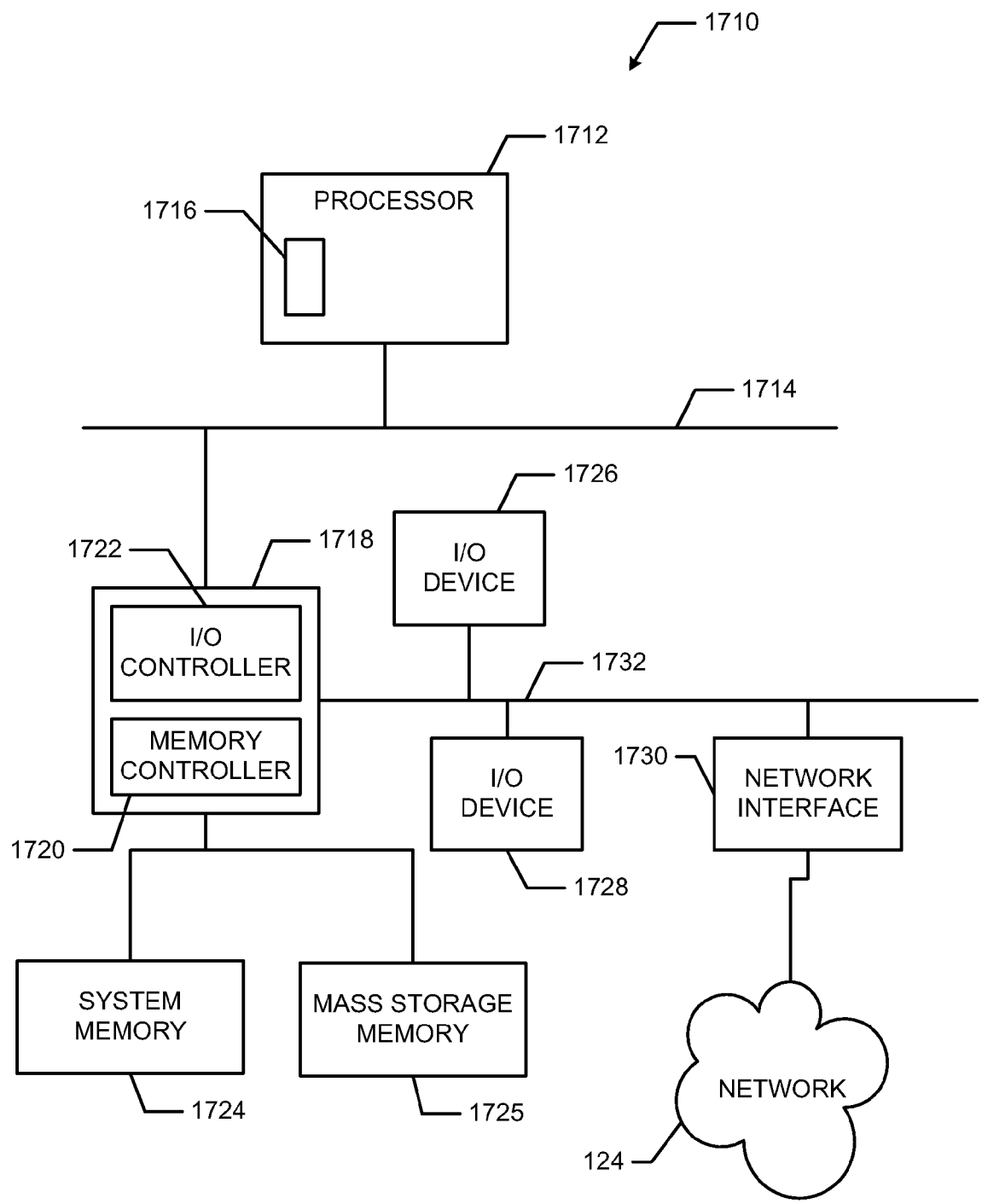
FIG. 17 is a block diagram of an example processor system that may be used to implement some or all of the example methods and apparatus described herein.

FIG. 17 is a block diagram of an example processor system 1710 that may be used to implement the apparatus and methods described herein. As shown in FIG. 17, the processor system 1710 includes a processor 1712 that is coupled to an interconnection bus 1714. The processor 1712 includes a register set or register space 1716, which is depicted in FIG. 17 as being entirely on-chip, but which could alternatively be located entirely or partially off-chip and directly coupled to the processor 1712 via dedicated electrical connections and/ or via the interconnection bus 1714. The processor 1712 may be any suitable processor, processing unit or microprocessor. Although not shown in FIG. 17, the system 1710 may be a multi-processor system and, thus, may include one or more additional processors that are identical or similar to the processor 1712 and that are communicatively coupled to the interconnection bus 1714.

The processor 1712 of FIG. 17 is coupled to a chipset 1718, which includes a memory controller 1720 and an input/output (I/O) controller 1722. As is well known, a chipset typically provides I/O and memory management functions as well as a plurality of general purpose and/or special purpose registers, timers, etc. that are accessible or used by one or more processors coupled to the chipset 1718. The memory controller 1720 performs functions that enable the processor 1712 (or processors if there are multiple processors) to access a system memory 1724 and a mass storage memory 1725.

The system memory 1724 may include any desired type of volatile and/or non-volatile memory such as, for example, static random access memory (SRAM), dynamic random access memory (DRAM), flash memory, read-only memory (ROM), etc. The mass storage memory 1725 may include any desired type of mass storage device including hard disk drives, optical drives, tape storage devices, etc.

The I/O controller 1722 performs functions that enable the processor 1712 to communicate with peripheral input/output (I/O) devices 1726 and 1728 and a network interface 1730 via an I/O bus 1732. The I/O devices 1726 and 1728 may be any desired type of I/O device such as, for example, a keyboard, a video display or monitor, a mouse, etc. The network interface 1730 is communicatively coupled to the network 124 and may be, for example, an Ethernet device, an asynchronous transfer mode (ATM) device, an 802.11 device, a DSL modem, a cable modem, a cellular modem, etc. that enables the processor system 1710 to communicate with another processor system.

While the memory controller 1720 and the I/O controller 1722 are depicted in FIG. 17 as separate functional blocks within the chipset 1718, the functions performed by these blocks may be integrated within a single semiconductor circuit or may be implemented using two or more separate integrated circuits.

Figure 18:
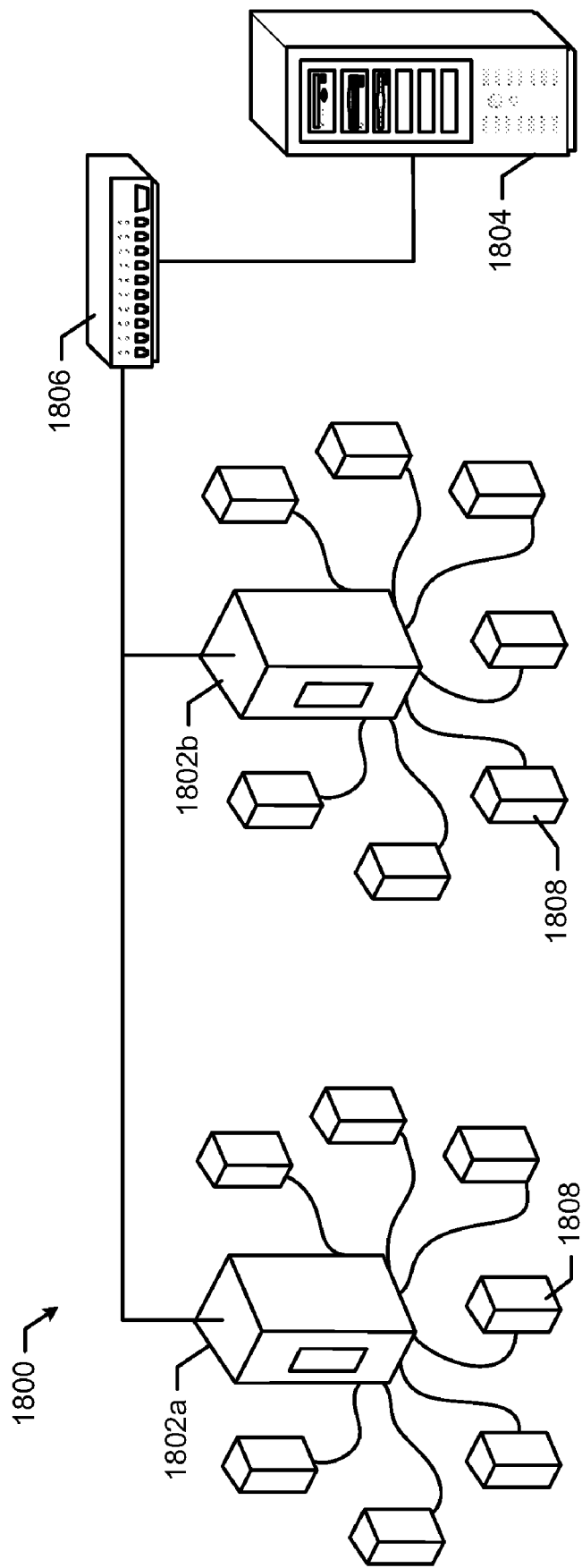
FIG. 18 is another example location monitoring system that may be used to implement the methods and apparatus described herein.

FIG. 18 is an example location monitoring system 1800 (i.e., the monitoring system 1800) that may be used to implement the methods and apparatus described herein. The monitoring system 1800 may be configured to work with the example PPM 104 (FIGS. 1A-2) to generate location information associated with the location of a person (e.g., the audience member 106 of FIGS. 1A-1C) within a household (e.g., the household 102 of FIGS. 1A-1C or the household 2200 of FIG. 22) as described below in connection with the example methods of FIGS. 23 and 24. The monitoring system 1800 or another processing system (e.g., the home processing system 120 or the server 126 of FIG. 1) may then use the location information in combination with media monitoring information collected by the PPM 104 to determine the media to which the audience member 106 was exposed as described below in connection with the example methods of FIGS. 23 and 25A-25B.

The monitoring system 1800 may be implemented using ultrasound technologies for detecting the location of the PPM 104 within the household 2200. In particular, as the PPM 104 moves from room to room, the monitoring system 1800 may obtain ultrasound signals emitted by the PPM 104, extract a PPM ID from the ultrasound signals and store the PPM ID with corresponding location identification codes (i.e., location ID's) for subsequent analyses.

As shown in FIG. 18, the monitoring system 1800 includes two base sensor units 1802a and 1802b communicatively coupled to a data collection unit 1804 via a network hub 1806. The base sensor units 1802a-b are communicatively coupled to a plurality of satellite sensor units 1808. The base sensor units 1802a-b and the satellites sensor units 1808 may include microphones or transducers (e.g., the microphone 320 of FIG. 3) that enable the sensor units 1802a-b and 1808 to detect PPM ID signals (e.g., PPM beacon signals) emitted by PPM's using acoustic frequencies such as, for example, ultrasound frequencies. Each of the base sensor units 1802a-b may have eight data acquisition channels numbered zero through seven. The microphone or transducer of each of the base sensor units 1802a-b may be coupled to data acquisition channel zero. Each of the satellite sensor units 1808 may be coupled to a respective one of the data acquisition channels one through seven of the base sensor units 1802a-b.

The base sensor units 1802a-b may be communicatively coupled to the data collection unit 1804 using any suitable networking standard (e.g., Ethernet, Token Ring, etc.). Although the base sensor units 1802a-b are shown as being coupled via wires to the data collection unit 1804, in an alternative implementation, the base sensor units 1802a-b may be communicatively coupled to the data collection facility 1804 using a wireless communication protocol. Each of the base sensor units 1802a-b may be assigned a unique IP address that enables the each of the base sensor units 1802a-b to communicate with the central data collection unit 1804. The data collection unit 1804 may store the location information received from the base sensor units 1802a-b in a database and/or communicate the location information to, for example, the central facility 122 (FIG. 1A).

The base sensor units 1802a-b may be powered by an alternating current (AC) source (e.g., a wall outlet) or a direct current (DC) source (e.g., an AC-DC converter plugged into a wall outlet). The satellite sensor units 1808 may be powered by the base sensor units 1802a-b. Specifically, a cable used to couple a satellite sensor unit 1808 to one of the base sensor units 1802a-b may include a data communication link that is coupled to one of the data acquisition channels zero through seven and a power link that is coupled to a power supply of the one of the base sensor units 1802a-b. As described below, the sensor units 1802a-b and 1808 may be placed throughout the household 2200 to detect the location of the PPM 104 as the PPM 104 moves from room to room. The base sensor units 1802a-b may communicate to the data collection unit 1804 any PPM information acquired by the satellite sensor units 1808 or the base sensor units 1802a-b. In some implementations, the data collection unit 1804 may be integral with the home processing system 120.

The sensor units 1802a-b and 1808 may be placed throughout the household 2200 and assigned a location ID corresponding to the room in which it is located. In some implementations or household floor plans, two or more of the sensor units 1802a-b and 1808 may be located in each room. The sensor units 1802a-b and 1808 may be placed within rooms as described below in connection with FIGS. 19-22 to substantially reduce or eliminate signal spillover effects. In this manner, the example system 1800 may be used to accurately determine in which room a person (e.g., the audience member 106 of FIG. 1) is located.

The example monitoring system 1800 may be used to determine the location of the audience member 106 within the household 2200 as the PPM 104 is moved from room to room. For example, as the PPM 104 emits PPM ID signals encoded with a PPM identification code (i.e., a PPM ID), the sensor units 1802a-b and 1808 may detect the PPM signals and extract the PPM ID from the PPM ID signals. After a sensor unit extracts the PPM ID, the sensor unit may generate location information by tagging the PPM ID with a timestamp and a location ID corresponding to the room of the household 2200 in which the sensor unit is located. The data collection unit 1804 or another processing system (e.g., the home processing system 120 or the server 126) may later use the location information to determine the room or rooms within which the audience member 106 was located. As described in greater detail below in connection with the example methods of FIGS. 23-25B, the location information may be used in combination with media monitoring information collected by the PPM 104 to determine the rooms in which the audience member 106 was located while consuming media.

Figure 19:
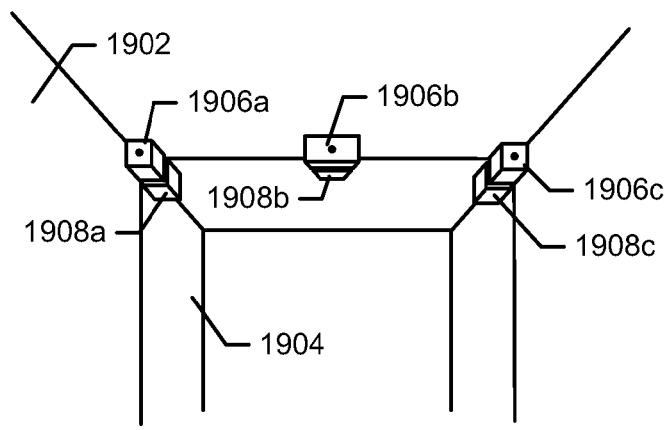
FIGS. 19-21 are example sensor placement configurations that may be used to place the sensor units of FIG. 18 throughout a household.
Figure 20:
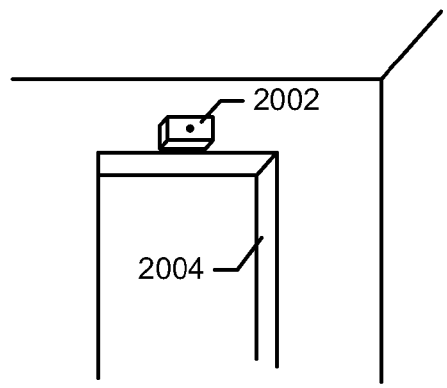
Figure 21:
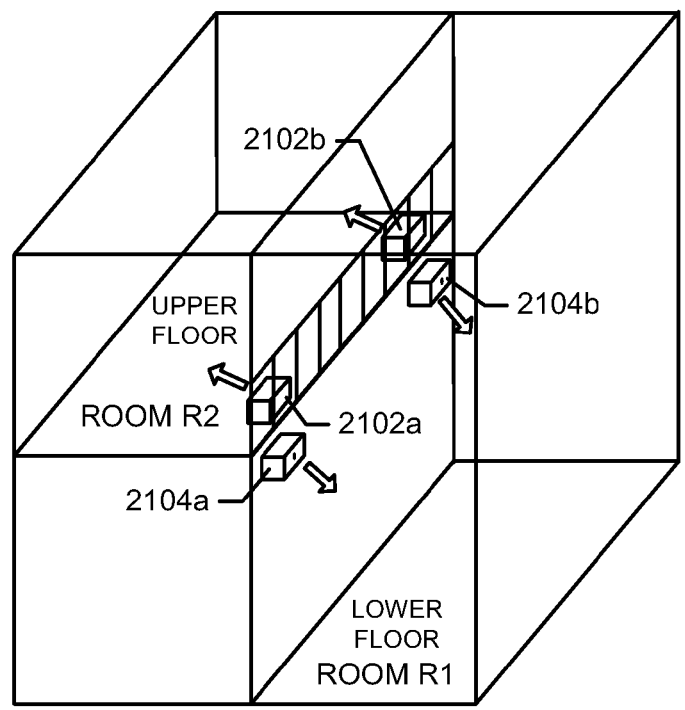
Figure 22:
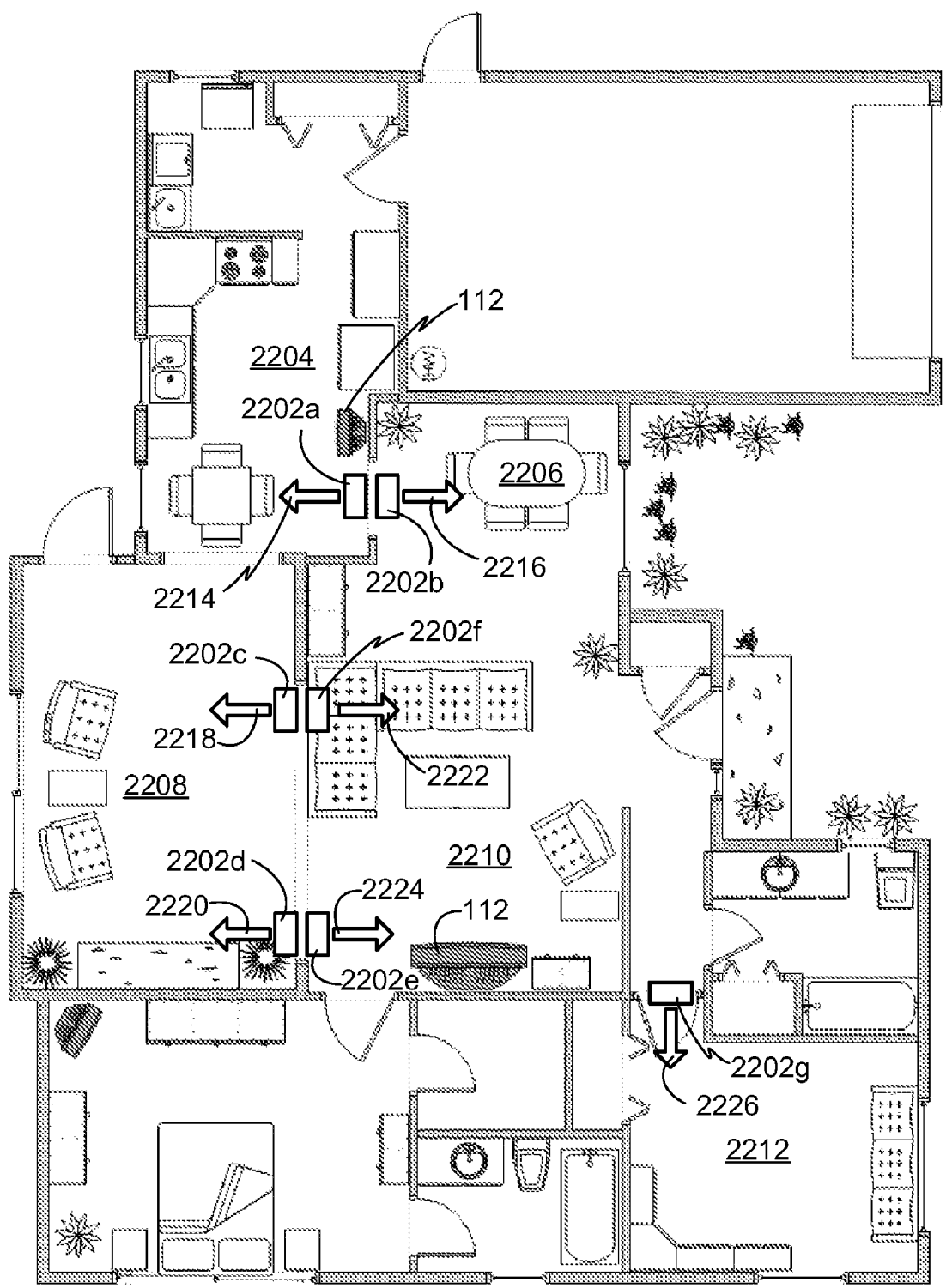
FIG. 22 is a floor plan view of an example household illustrating an example placement configuration for the sensor units of FIG. 18.

FIGS. 19-21 are example sensor placement configurations that may be used to place the sensor units 1802a-b and 1808 of FIG. 18 throughout a household (e.g., the household 2200 of FIG. 22). In particular, the placement configurations of FIGS. 19-21 substantially eliminate or reduce spillover effects when the PPM 104 is moved from room to room in the household 2200 and, thus, enable the monitoring system 1800 (FIG. 18) to generate relatively accurate location information for the PPM 104. The sensor units of FIGS. 19-21 are substantially similar or identical to the sensor units 1802a-b and 1808 of FIG. 18. The sensor units of FIGS. 19-21 may be placed in back-to-back configurations, near door ways, on opposing sides of first floor and second floor boundaries, etc. so that the strongest PPM signals detected by each of the sensor units 1802a-b and 1808 correspond to a PPM located in the respective room of each of the sensors 1802a-b and 1808.

FIG. 19 is an example sensor configuration that may be used to install sensor units in first and second rooms 1902 and 1904 that are not separated by a physical wall, but that are instead open to one another. A first set of sensor units 1906a-c are mounted to the ceiling of the first room 1902 facing the first room 1902. A second set of sensor units 1908a-c are mounted to the ceiling of the second room 1404 in a back-to-back configuration with the first set of sensor units 1906a-c and configured to face the second room 1904. When the PPM 104 is located within the first room 1904, the back-to-back configuration shown in FIG. 19 enables the first sensor units 1906a-c to detect relatively stronger PPM signals and the second sensor units 1908a-c to detect no PPM signals or substantially weaker PPM signals. In a similar manner, when the PPM 104 is located in the second room 1906, the second sensor units 1908a-c may detect relatively stronger PPM signals and the first sensor units 1906a-c may detect no PPM signals or relatively weaker PPM signals.

FIG. 20 is an example sensor configuration that may be used to install a sensor unit 2002 above a door 2004 of a room. The sensor unit 2002 is mounted to a wall above the door 2004 to enable the sensor unit 2002 to detect relatively strong PPM signals when the PPM 104 (FIGS. 1A-2) is moved into the room and to detect no PPM signals or relatively weak PPM signals from the PPM 104 when the PPM 104 is moved out of the room.

FIG. 21 is an example sensor configuration that may be used to install sensor units in adjacent upper and lower floors.

In a multi-level home configuration as shown in FIG. 21, location sensor units may be placed in substantially opposing directions. In this manner, when the PPM 104 is located on the upper floor, upper floor sensor units 2102a-b detect relatively stronger PPM signals and lower floor sensor units 2104a-b to detect no PPM signals or relatively weak PPM signals from the PPM 104.

FIG. 22 is a floor plan view of the example household 2200 illustrating an example placement configuration for the sensor units 1802a-b and 1808 of FIG. 18. The example monitoring system 1800 of FIG. 18 may be installed in the example household 2200 to collect location information associated with the rooms of the household 2200 in which a person (e.g., the audience member 106 of FIGS. 1A-1C) performs daily activities such as media consumption. Specifically, sensor units shown in FIG. 22 and indicated generally by reference numerals 2202a-g may be placed throughout the household 2200 using the placement configurations described above in connection with FIGS. 19-21 to substantially reduce or eliminate spillover effects associated with PPM ID signals that spillover or leak from one room to another. The sensor units 2202a-g are substantially similar or identical to the sensor units 1802a-b and 1808 of FIG. 18.

As shown in FIG. 22, a first sensor unit 2202a and a second sensor unit 2202b are placed in the household 2200 to enable monitoring for PPM signals in a kitchen 2204 and a dining room 2206. Third and fourth sensor units 2202c-d are placed in the household 2200 to monitor a sitting room 2208. Fifth and sixth sensor units 2202e-f are placed in the household 2200 to monitor an entertainment room 2210. A seventh sensor unit 2202g is placed in the household 2200 to monitor a bedroom 2212.

The first and second sensor units 2202a-b may be placed on opposing sides of a wall above a door (e.g., the door 2004 of FIG. 20) separating the kitchen 2204 and the dining room 2206 as shown in FIG. 20, for example. The first sensor unit 2202a is positioned or configured to direct the PPM signal sensing capabilities (e.g., the signal sensing or pick up capabilities of a microphone) of the first sensor unit 2202a toward the area of the kitchen 2204 as generally indicated by arrow 2214. The second sensor unit 2202b is positioned or configured to direct the PPM signal sensing capabilities of the second sensor unit 2202b toward the area of the dining room 2206 as generally indicated by arrow 2216. In this manner, PPM signals emitted by PPM's within the kitchen 2204 will be relatively stronger when detected by the first sensor unit 2202a than spillover PPM signals emitted by PPM's in the dining room 2206. Similarly, PPM signals emitted by PPM's within the dining room 2206 will be relatively stronger when detected by the second sensor unit 2202b than PPM signals emitted by PPM's in the kitchen 2204 that spill over into the dining room 2206. As described below in connection with the example method of FIG. 24, a sensor unit (e.g., one of the sensors 2202a-g) or a processing system (e.g., the data collection unit 1804 of FIG. 18, the home unit 120 of FIG. 1A, the server 126 of FIG. 1A, etc.) may differentiate between PPM signals that correspond to PPM's located within their respective rooms from PPM signals that correspond to PPM's located in other rooms based on signal strength.

The sitting room 2208 and the entertainment room 2210 are not separated by a wall or a door. Instead the sitting room 2208 and the entertainment room 2210 are open to one another. In this case the third and fourth sensor units 2202c-d and the fifth and sixth sensor units 2202e-f may be arranged in back-to-back configurations as described above in connection with FIG. 19. The third and fourth sensor units 2202c-d are positioned or configured to direct the PPM signal sensing capabilities of the third and fourth sensor units 2202c-d toward the area of the sitting room 2208 as generally indicated by arrows 2218 and 2220. The fifth and sixth sensor units 2202e-f are positioned or configured to direct the PPM signal sensing capabilities of the fifth and sixth sensor units 2202e-f toward the area of the entertainment room 2210 as generally indicated by arrows 2222 and 2224. In this configuration, the sensor units 2202c-f detect PPM signals emitted by PPM's located in respective rooms as being relatively stronger than spillover PPM signals emitted by PPM's in other rooms.

The seventh sensor unit 2202g may be mounted to an upper wall of a door way separating the bedroom 2212 from a hallway as shown in FIG. 20. The seventh sensor unit 2202g is positioned or configured to direct the PPM signal sensing capabilities of the seventh sensor unit 2202g toward the area of the bedroom 2212 as generally indicated by arrows 2226.

FIGS. 23 through 25B are example methods that may be used to manage media signal (e.g., audio code) spillover associated with an audience monitoring system (e.g., the example location monitoring system 1800 of FIG. 18). The example methods may be implemented in software, hardware, and/or any combination thereof. For example, the example methods may be implemented in software that is executed on the PPM 104 of FIGS. 1A-2, the base units 114 of FIGS. 1A and 3, the example monitoring system 1800 of FIG. 18, the home processing system 120 of FIG. 1A, and/or at the central facility 122 of FIG. 1A. Although, the example methods are described below as a particular sequence of operations, one or more operations may be rearranged, added, and/or removed to achieve the same or similar results as those described herein.

Figure 23:
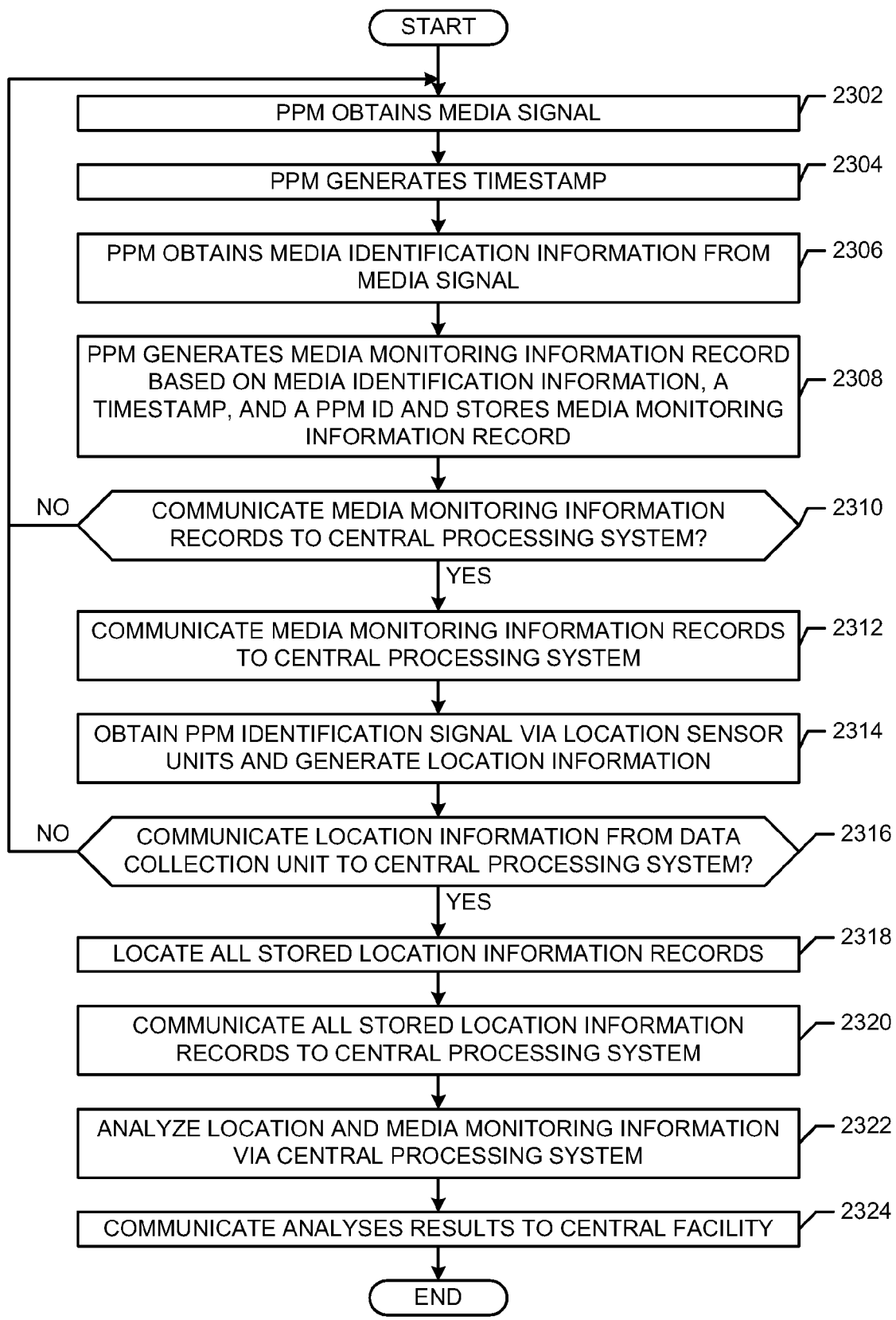
FIG. 23 is an example method that may be used to collect, manage and analyze media monitoring information and location information associated with media consumption activities of an audience member using the example location monitoring system of FIG. 18.

FIG. 23 is an example method that may be used to collect, manage, and analyze media monitoring information and location information associated with media consumption activities of an audience member (e.g., the audience member 106 of FIG. 1A) using the example location monitoring system 1800 of FIG. 18. The example method of FIG. 23 may be implemented using a sensor unit configuration or layout as described above in connection with FIG. 22 or any other sensor unit layout.

Initially, the PPM 104 obtains a media signal (block 2302). For example, the PPM 104 may detect audio emitted by a media delivery center (e.g., any of the media delivery centers 112 of FIG. 22). The PPM 104 then generates a timestamp associated with the time at which the PPM 104 obtained the media signal (block 2304). The PPM 104 then obtains media identification information (e.g., an audio code, an audio signature, etc.) from the media signal (block 2306). For example, the PPM 104 may extract an ancillary audio code from the media signal or may generate an audio signature based on the media signal.

The PPM 104 then generates a media monitoring information record by tagging the media identification information with the timestamp and a PPM ID corresponding to the PPM 104 and stores the media monitoring information record in a memory (e.g., the memory 204 of FIG. 2) (block 2308). For example, the PPM 104 may generate media monitoring information by storing the media identification information in a media ID database entry and storing the timestamp in a timestamp database entry and the PPM ID in a PPM ID database entry, both corresponding to the media ID entry in which the PPM 104 stored the media identification information. Alternatively, the PPM 104 may generate media monitoring information by concatenating the media ID signal, the timestamp, and the PPM ID and storing the media monitoring information in the memory 204.

The PPM 104 may then determine whether to communicate the media monitoring information to a central processing system (e.g., the home processing system 120 of FIG. 1) (block 2310). For example, the PPM 104 may be configured to communicate the stored media monitoring information to the home processing system 120 at predetermined times or when the PPM 104 has collected a certain amount of media monitoring information or when the memory 204 (FIG. 2) is full.

If the PPM 104 determines that it should communicate the media monitoring information to the home processing system 120, then the PPM 104 communicates the media monitoring information to the home processing system 120 (block 2312). For example, the PPM 104 may communicate the media monitoring information to the home processing system 120 using a wired or wireless communication protocol via the communication interface 206 (FIG. 2).

A location sensor unit (e.g., one of the sensor units 2202*a*-*g* of FIG. 22) may obtain a PPM ID signal and the example monitoring system 1800 (FIG. 18) may generate location information records based on the PPM ID signal (block 2314). For example, as the PPM 104 is moved between rooms of the household 2200 the PPM 104 periodically emits a PPM ID signal that one or more of the sensor units 2202*a*-*g* may detect. The location sensor unit may then generate location information by extracting a PPM ID from the PPM ID signal and tagging the PPM ID with a location ID of the room corresponding to the location sensor unit. The operation of block 2314 may be implemented as described below in connection with the example method of FIG. 25 for generating location information. As described below in connection with the example method of FIG. 25, the location sensor unit may communicate the location information to the data collection unit 1804 (FIG. 18) for subsequent analyses. The operation of block 2314 may be performed by the location sensor unit at substantially the same time as the PPM 104 performs the operations of blocks 2302, 2304, 2306, 2308, 2310, and 2312 or at any other time.

The example monitoring system 1800 may then determine whether to communicate the location information via the data collection unit 1804 to a central processing system (e.g., the home processing system 120 of FIG. 1) (block 2316). For example, the data collection unit 1804 may communicate the location information at predetermined times or in response to a request by the home processing system 120.

If the example monitoring system 1800 determines not to communicate the location information to the home processing system 120, control is returned to block 2302. However, if the example monitoring system 1800 determines at block 2316 that it should communicate the location information to the home processing system 120, then the data collection unit 1804 locates all location information records (block 2318). The data collection unit 1804 then communicates all the location information records to the home processing system 120 (block 2320). The home processing system 120 may then analyze the location and media monitoring information (block 2322). The home processing system 120 may then communicate the analyses results and/or the location and media monitoring information to the central facility 122 (FIG. 1) (block 2324). For example, the home processing system 120 may communicate the analyses results and information records to the central facility 122 according to a predetermined schedule (e.g., once per day at midnight).

Figure 24:
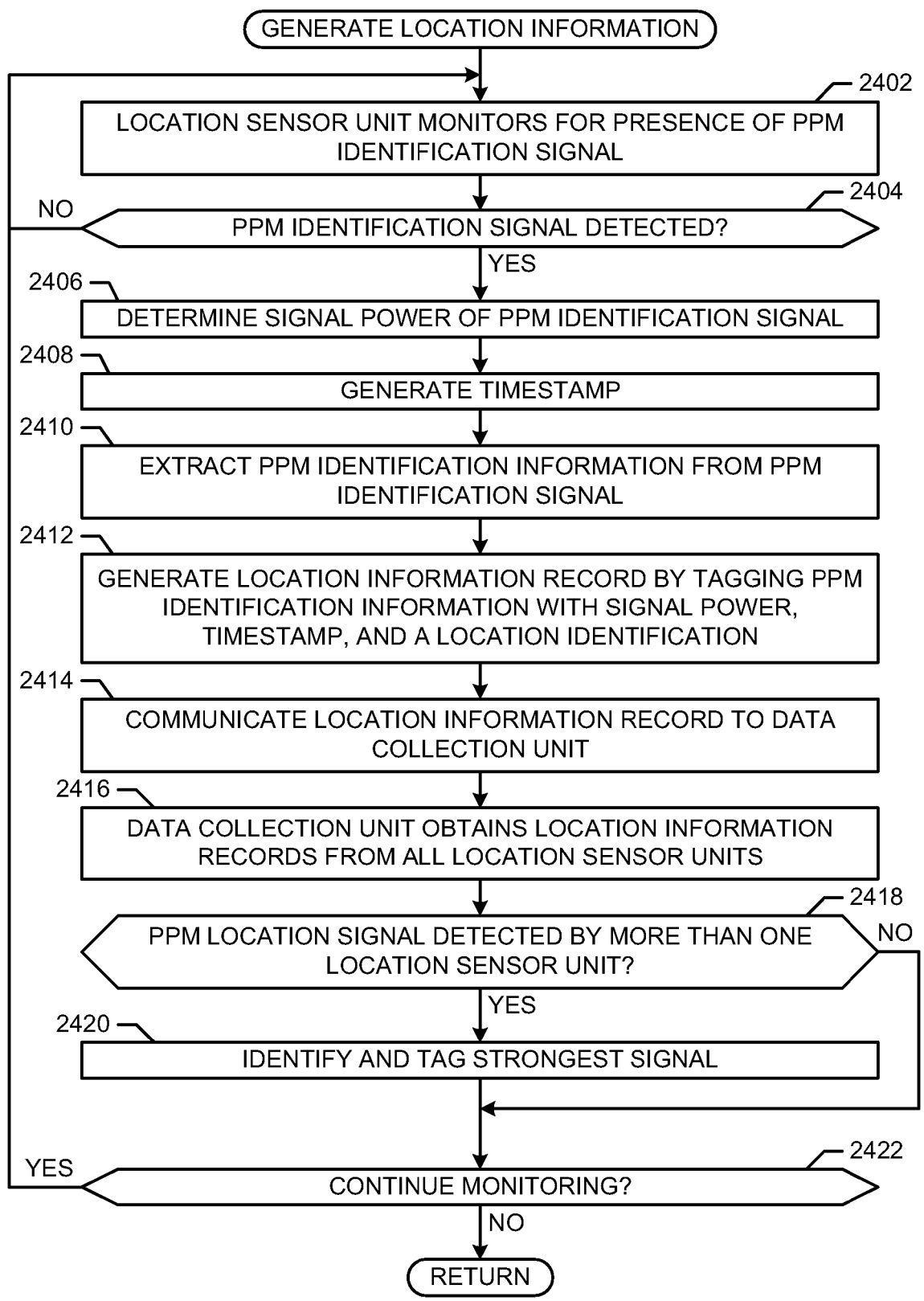
FIG. 24 is an example method that may be implemented in combination with the example method of FIG. 23 and used to generate location information via the example monitoring system of FIG. 18.

FIG. 24 is an example method that may be implemented in combination with the example method of FIG. 23 and used to generate location information via the example monitoring system 1800 of FIG. 18. The example method of FIG. 24 may be implemented using location sensors (e.g., the sensor units 2202*a*-*g*) located throughout a household (e.g., the household 2200 of FIG. 22) as described above in connection with FIG. 22. The example method of FIG. 24 may be used to implement the operation of block 2314 described above in connection with the example method of FIG. 23.

Initially, a location sensor unit (e.g., the location sensor unit 2202*a* of FIG. 22) monitors for the presence of a PPM ID signal (block 2402). For example, the location sensor unit 2202*a* may monitor for the presence of a PPM ID signal using an ultrasonic microphone or transducer. The location sensor unit 2202*a* then determines if it has detected a PPM ID signal (block 2404). For example, the location sensor unit 2202*a* may detect a PPM ID signal when the PPM 104 is moved into the kitchen 2204 (FIG. 2). If the location sensor unit 2202*a* does not detect a PPM ID signal, control is returned to block 2402.

If the location sensor unit 2202*a* detects a PPM ID signal, the location sensor unit 2202*a* may determine the signal power of the PPM ID signal (block 2406) by, for example, measuring the amplitude of the PPM ID signal. The location sensor unit 2202*a* may then generate a timestamp associated with the time at which the location sensor unit 2202*a* received the PPM ID signal (block 2408). The location sensor unit 2202*a* may then extract a PPM ID from the PPM ID signal (block 2410). The location sensor unit 2202*a* then generates a location information record by tagging the PPM ID with the signal power determined at block 2406, the timestamp generated at block 2408, and a location ID associated with the room (e.g., the kitchen 2202*a*) in which the location sensor unit 2202*a* is located (block 2412).

The location sensor unit 2202*a* then communicates the location information record generated at block 2412 to the data collection unit 1804 (block 2414). The data collection unit 1804 obtains location information records from all the location sensor units 2202*a*-*g* (FIG. 22) (block 2416). For example, the data collection unit 1804 may obtain location information records from the sensor units 2202*a*-*g* in real time. In other words, each of the location sensor units 2202*a*-*g* may communicate a location information record to the data collection unit 1804 immediately after it obtains a PPM ID signal and generates the location information record. The data collection unit 1806 then determines if the PPM ID signal received by the location sensor unit 2202*a* at block 2404 was detected by another one or more of the other location sensor units 2202*b*-*g* (block 2418). For example, the data collection unit 1804 may compare the timestamp of the location information record generated at block 2412 by the location sensor unit 2202*a* with timestamps of location information records generated by others of the location sensor units 2202*b*-*g*. The data collection unit 1804 may select all location information records having a timestamp that is substantially similar or identical (e.g., based on a particular time threshold value) to the timestamp of the location information record received from the location sensor unit 2202*a*. The data collection unit 1804 may then extract the PPM ID's from the selected location information records and compare the PPM ID's to the PPM ID received from the location sensor unit 2202*a*. The data collection unit 1804 determines that at least one of the other location sensor units 2202*b*-*g* received the same PPM ID as the location sensor unit 2202*a* received at block 2404 if at least one of the other PPM ID's is equal to the PPM ID received from the location sensor unit 2202*a*. In this case, the data collection unit 1804 identifies and tags the location information record having the strongest signal power (block 2420). For example, the data collection unit 1804 may identify the location information record having the strongest signal power by comparing the signal power determined at block 2406 with the signal powers of the other location information records identified at block 2418. The data collection unit 1804 may tag the location information record associated with the strongest signal power by ranking it higher than all the other location information records identified at block 2418, by placing it first in a list of the location information records, by discarding or disregarding all the other location information records, or by any other suitable manner. After tagging the location information records having the strongest signal power or if the data collection unit determines at block 2418 that none of the other location sensor units 2202b-g detected the same PPM ID signal, the example monitoring system 1800 determines whether it should continue to monitor for PPM ID signals (block 2422). If the example monitoring system 1800 determines that it should continue monitoring, then control is passed back to block 2402. Otherwise, control is returned to, for example, a calling function or process such as the example method of FIG. 23.

Figure 25A:
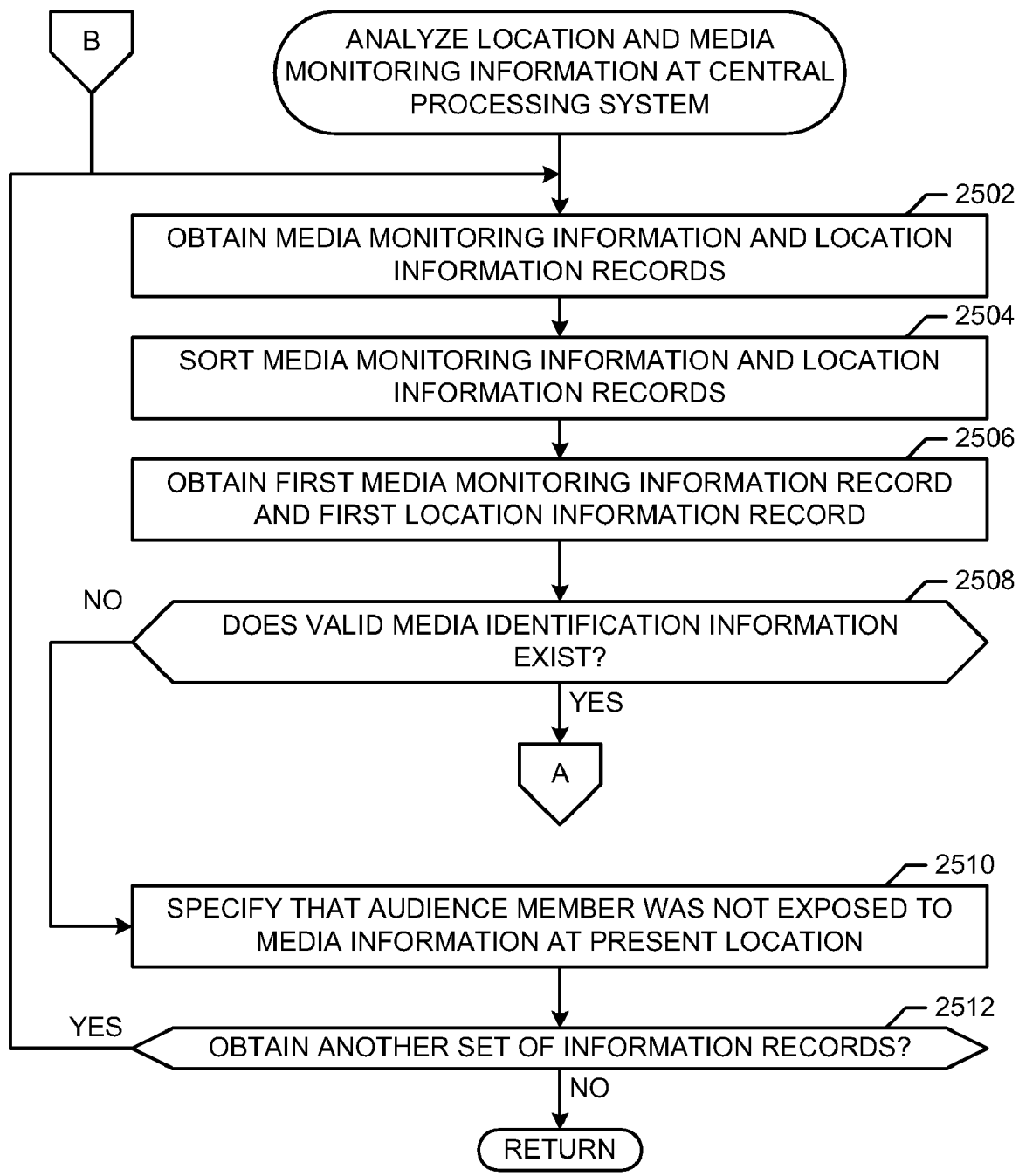
FIGS. 25A-25B illustrate an example method that may be implemented in combination with the example method of FIG. 23 and used to analyze location and media monitoring information via a central processing system.
Figure 25B:
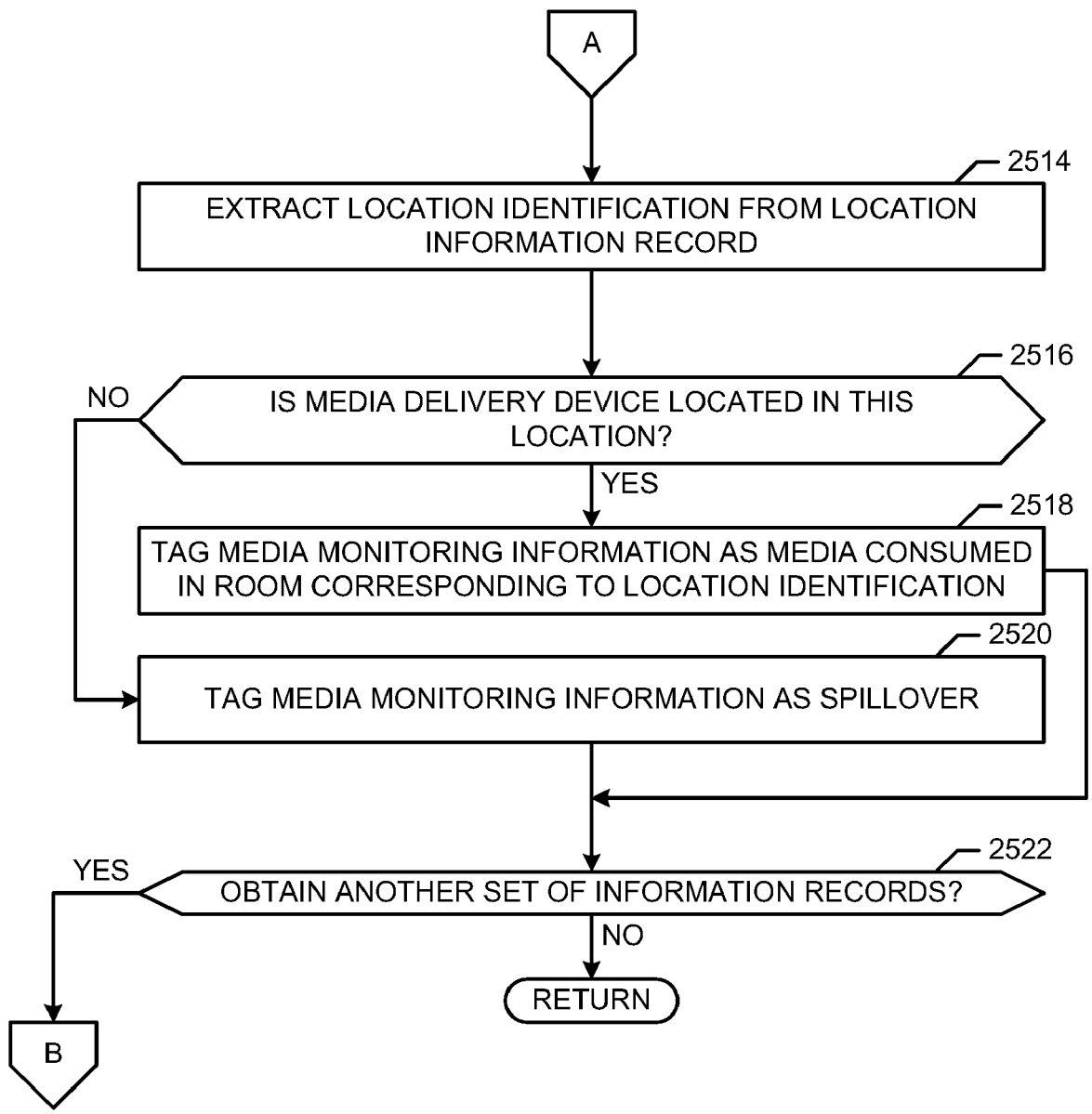

FIGS. 25A-25B illustrate an example method that may be implemented in combination with the example method of FIG. 23 and used to analyze location and media monitoring information via a central processing system (e.g. home processing system 120 of FIG. 1A). In particular, the example method of FIGS. 25A-25B may be used to implement the operation of block 2322 of FIG. 23. The example method is described below as a series of operations executed or performed by the home processing system 120. However, the operations of the example method may be executed or performed by any other processing system such as, for example, the server 126 (FIG. 1) or the data collection unit 1804 (FIG. 18).

Initially, the home processing system 120 obtains media monitoring information records and location information records (block 2502). For example, the home processing system 120 may obtain the media monitoring information records from the PPM 104 (FIGS. 1A-2) that are communicated by the PPM 104 at the operation of block 2312 described above in connection with FIG. 23. Additionally, the home processing system 120 may obtain the location information records from the data collection unit 1804 that are communicated by the data collection unit 1804 at the operation of block 2320 (FIG. 23). The home processing system 120 may store all of the media monitoring information and location information records in a memory such as, for example, the mass storage memory 1725 (FIG. 17).

The home processing system 120 may then sort the media monitoring information and location information records obtained at block 2502 (block 2504). For example, the home processing system 120 may sort the information records based on timestamps and PPM ID's. The home processing system 120 may generate a PPM ID data table for each PPM ID associated with a particular household. The home processing system 120 may sort the information records into corresponding PPM ID data tables based on the PPM ID's stored in the information records at block 2308 (FIG. 23) and block 2412 (FIG. 24). Additionally, for each PPM ID data table, the home processing system 120 may pair the media monitoring information records with corresponding location information records based on substantially similar, identical, or otherwise corresponding timestamps. The example methods of FIGS. 25A-25B are described with respect to one of the PPM ID data tables. However, the information records in all of the PPM ID data tables may be processed or analyzed in a substantially similar or identical manner.

The home processing system 120 obtains a first media monitoring information record and a first location information record (block 2506). For example, the home processing system 120 may obtain from the mass storage memory 1725 a first one of the media monitoring information records and a first one of the location information records from a PPM ID data table generated at block 2504. The home processing system 120 then determines if valid media ID information exists in the media monitoring information record (block 2508). For example, if the PPM 104 is configured to periodically generate a media monitoring information record, during times when the PPM 104 is not be exposed to media presentations, the PPM 104 may generate a filler or a dummy media monitoring information record having no valid media ID information (e.g., an ancillary audio code, an audio signature, etc.). If the home processing system 120 determines that valid media ID information does not exist in the media monitoring information record, then the home processing system 120 may specify that the audience member 106 (FIG. 1) was not exposed to any media presentations or media information when the audience member 106 was located in the room corresponding the location information record retrieved at block 2506 (block 2510). For example, the home processing system 120 may tag the location information record as not being associated with any media information and may store that analysis information in an analyses results database. The home processing system 120 may then determine whether to obtain another set of media monitoring and location information records (block 2512). If the home processing system 120 determines that it should obtain another set of information records, control is passed back to block 2502. Otherwise, control is returned to, for example, a calling function or process such as the example method of FIG. 23.

If at block 2508 the home processing system 120 determines that the media monitoring information record includes valid media ID information (e.g., an ancillary audio code, an audio signature, etc.), then the home processing system 120 extracts a location ID from the location information record (block 2514). The home processing system 120 may extract from the location information record the location ID that was tagged or added to the location information record at block 2412 of FIG. 24. The home processing system 120 then determines if a media delivery device (e.g., one of the media delivery devices 112 of FIG. 22) is located within the room corresponding to the location ID extracted at block 2514 (block 2516). For example, the home processing system 120 may have a media delivery device look-up table or database stored in the mass storage memory 1725 (FIG. 17) that includes a list of location ID's and which of the location ID's are associated with the media delivery devices 112. The home processing system 120 may use the media delivery device look-up table or database to determine which rooms of the household 2200 include one of the media delivery devices 112. The look-up table or database may also include the type of media delivery device (e.g., radio, television, DVD player, CD player, etc.) that is located within the rooms corresponding to the location ID's.

If the home processing system 120 determines at block 2516 that one of the media delivery devices 112 is located in the room corresponding to the location ID, then the home processing system 120 tags the media monitoring information record as being associated with media that was consumed in the room corresponding to the location ID (block 2518). For example, the home processing system 120 may add a non-spillover code to the media monitoring information record and/or the location information record.

Otherwise, if the home processing system 120 determines at block 2516 that one of the media delivery devices 112 is not located in the room corresponding to the location ID, then the home processing system 120 may tag the media monitoring information record as spillover or otherwise specify that the media associated with the media monitoring information was spilled over to the room associated with the location ID (block 2520). For example, the home processing system 120 may add a spillover code to the media monitoring information record and/or the location information record.

After the home processing system 120 tags the information records as non-spillover at block 2518 or as spillover at block 2520, the home processing system 120 determines whether to obtain another set of media monitoring and location information records (block 2522). If the home processing system 120 determines that it should obtain another set of information records, control is passed back to block 2502. Otherwise, control is returned to, for example, a calling function or process such as the example method of FIG. 23.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to determine the location of an audience member to generate media monitoring information, comprising:
    receiving a portable metering device signal via a first sensor located in a first location and a second sensor located in a second location;
    associating first location information with receiving the portable metering device signal via the first sensor and second location information with receiving the portable metering device signal via the second sensor;
    generating media monitoring information based on at least the first location information; and
    identifying the media monitoring information as being associated with a spillover signal in response to determining that a media delivery device is not located in a first room indicated by the first location information, wherein the spillover signal is indicative of a media presentation presented in a second room and detected by a portable metering device located in the first room, and wherein the media monitoring information being associated with the spillover signal indicates that an audience member associated with the portable metering device was not sufficiently exposed to the media presentation to indicate consumption of the media presentation.

2. A method as defined in claim 1, wherein generating the media monitoring information includes generating media identification information.

3. A method as defined in claim 2, wherein the media identification information identifies at least one of a video presentation or an audio presentation.

4. A method as defined in claim 3, wherein the media identification information includes at least one of an ancillary code embedded in the video presentation or the audio presentation or a signature corresponding to the video presentation or the audio presentation.

5. A method as defined in claim 1, further comprising determining a first signal characteristic associated with receiving the portable metering device signal via the first sensor and a second signal characteristic associated with receiving the portable metering device signal via the second sensor.

6. A method as defined in claim 5, wherein generating the media monitoring information based on the first location information comprises comparing the first signal characteristic to the second signal characteristic and selecting the first location information based on the comparison.

7. A method as defined in claim 6, wherein the first and second signal characteristics are signal power values.

8. A method as defined in claim 1, further comprising obtaining portable metering device identification information from the portable metering device signal and generating the media monitoring information based on the portable metering device identification information.

9. A method as defined in claim 1, wherein the portable metering device signal is an ultrasound signal.

10. A method as defined in claim 1, wherein the media delivery device is a television or a radio.

11. A method as defined in claim 1, further comprising receiving the portable metering device signal via the first and second sensors substantially simultaneously.

12. A method as defined in claim 1, wherein the media monitoring information is indicative of the audience member's exposure to the media presentation.

13. A system to determine the location of an audience member to generate media monitoring information, comprising:
    a first sensor in a first location to receive a portable device signal;
    a second sensor in a second location to receive the portable device signal;
    a data collector coupled to the first and second sensors and configured to receive first location information associated with receiving the portable device signal via the first sensor and second location information associated with receiving the portable device signal via the second sensor and to select one of the first location information or the second location information; and
    a processor to generate media monitoring information based on the selected location information, wherein the processor is configured to identify the media monitoring information as spillover in response to determining that a media delivery device is not located in a first room indicated by the selected location information, wherein the spillover is indicative of a media presentation presented in a second room and detected by a portable device located in the first room, and wherein the spillover indicates that an audience member associated with the portable device was not sufficiently exposed to the media presentation to indicate consumption of the media presentation.

14. A system as defined in claim 13, wherein the processor is configured to receive media identification information from the portable device and generate the media monitoring information based on the media identification information.

15. A system as defined in claim 14, wherein the media identification information identifies at least one of a video presentation or an audio presentation.

16. A system as defined in claim 15, wherein the media identification information includes at least one of an ancillary code embedded in the video presentation or the audio presentation or a signature corresponding to the video presentation or the audio presentation.

17. A system as defined in claim 13, wherein the first sensor is configured to determine a first signal characteristic associated with receiving the portable device signal and the second sensor is configured to determine a second signal characteristic associated with receiving the portable device signal.

18. A system as defined in claim 17, wherein the data collector is configured to compare the first signal characteristic with the second signal characteristic and select one of the first location information or the second location information based on the comparison.

19. A system as defined in claim 18, wherein the first and second signal characteristics are signal power values.

20. A system as defined in claim 13, wherein the first and second sensors are configured to obtain first portable device identification information from the portable device signal, and wherein the processor is configured to associate the selected location information with media identification information received from the portable device based on the first portable device identification information and second portable device identification information associated with the selected location information and generate the media monitoring information based on the associated location information and media identification information.

21. A system as defined in claim 13, wherein the media delivery device is a television or a radio.

22. A system as defined in claim 13, wherein the portable device signal is an ultrasound signal.

23. A system as defined in claim 13, wherein the data collector is to select one of the first location information or the second location information by:
- comparing a first signal strength associated with receiving the portable device signal via the first sensor to a second signal strength associated with receiving the portable device signal via the second sensor; and
- selecting the one of the first location information or the second location information associated with the stronger signal strength; and
- wherein the processor is configured to indicate consumption of the media presentation in response to determining that the media presentation was presented in the first room indicated by the selected location information when the portable device signal was received via the first and second sensors.

24. A system as defined in claim 13, wherein the first and second sensors receive the portable device signal substantially simultaneously.

25. A system as defined in claim 13, wherein the media monitoring information is indicative of the audience member's exposure to the media presentation.

26. A machine accessible medium having instructions stored thereon that, when executed, cause a machine to:
- receive first location information associated with receiving a portable device signal via a first sensor in a first location and second location information associated with receiving the portable device signal via a second sensor in a second location;
- select one of the first location information or the second location information;
- generate media monitoring information based on the selected location information; and
- identify the media monitoring information as spillover in response to determining that a media delivery device is not located in a first room indicated by the selected location information, wherein the spillover is indicative of a media presentation presented in a second room and detected by a portable device located in the first room, and wherein the spillover indicates that an audience member associated with the portable device was not sufficiently exposed to the media presentation to indicate consumption of the media presentation.

27. A machine accessible medium as defined in claim 26 having instructions stored thereon that, when executed, cause the machine to receive media identification information from the portable device and generate the media monitoring information based on the media identification information.

28. A machine accessible medium as defined in claim 27 wherein the media identification information includes at least one of an ancillary code embedded in a video presentation or an audio presentation or a signature corresponding to the video presentation or the audio presentation.

29. A machine accessible medium as defined in claim 26 having instructions stored thereon that, when executed, cause the machine to:
- select one of the first location information or the second location information by:
  - comparing a first signal strength associated with receiving the portable device signal via the first sensor to a second signal strength associated with receiving the portable device signal via the second sensor; and
  - selecting the one of the first location information or the second location information associated with the stronger signal strength; and
- indicate consumption of the media presentation in response to determining that the media presentation was presented in the first room indicated by the selected location information when the portable device signal was received via the first and second sensors.

* * * * *